US012663820B2

(12) United States Patent
Zhang et al.

(10) Patent No.: US 12,663,820 B2
(45) Date of Patent: Jun. 23, 2026

(54) CONTROL METHOD, CONTROL SYSTEM, AND NON-TRANSIENT COMPUTER-READABLE STORAGE MEDIUM

(71) Applicant: Rockwell Automation Technologies, Inc., Mayfield Heights, OH (US)

(72) Inventors: Matthew Sikai Zhang, Shanghai (CN); Benfeng Tang, Shanghai (CN); Xuyuan Xiao, Shanghai (CN); Da Huo, Shanghai (CN); Zhengchun Gao, Shanghai (CN)

(73) Assignee: ROCKWELL AUTOMATION TECHNOLOGIES, INC., Mayfield Heights, OH (US)

( * ) Notice: Subject to any disclaimer, the term of this patent is extended or adjusted under 35 U.S.C. 154(b) by 402 days.

(21) Appl. No.: 18/357,328

(22) Filed: Jul. 24, 2023

(65) Prior Publication Data

US 2024/0329668 A1 Oct. 3, 2024

(30) Foreign Application Priority Data

Mar. 27, 2023 (CN) .......................... 202310309039.0

(51) Int. Cl.
*G05D 7/06* (2006.01)

(52) U.S. Cl.
CPC .................................. G05D 7/0623 (2013.01)

(58) Field of Classification Search
CPC .............. G05D 7/0623; F05D 2260/81; F05D 2260/821; F05D 2270/20; F05D 2270/3061; F04D 15/0066; F04D 15/0088; F04D 15/0218; F04D 13/16; F04B 49/065
See application file for complete search history.

(56) References Cited

U.S. PATENT DOCUMENTS

2007/0166169 A1* 7/2007 Venkatachari ...... F04D 15/0218
417/20
2010/0254825 A1* 10/2010 Stiles, Jr. ................ F04B 49/06
417/20
2022/0326666 A1* 10/2022 Ubert ...................... F04B 23/02

OTHER PUBLICATIONS

Martin Schwarz, "Method for the optimized operation of a pumping station, in particular for wastewater" (ip.com machine translation for application DE102013007026A1), Oct. 30, 2014, ip.com machine translations (Year: 2014).*

(Continued)

*Primary Examiner* — Christopher W Carter

(74) *Attorney, Agent, or Firm* — Amin, Turocy & Watson, LLP

(57) ABSTRACT

A control method, a control system, and a non-transient computer-readable storage medium are provided. The control method is applicable to a pumping station comprising one or more pumps. The method may include: comparing an inflow rate of the pumping station with a flow rate for optimal energy consumption of the pumping station; determining, based on whether the inflow rate of the pumping station is greater than or equal to, or less than or equal to, the flow rate for optimal energy consumption of the pumping station, a corresponding constraint that indicates whether a target outflow rate of the pumping station is to be greater than or equal to, or less than or equal to, the flow rate for optimal energy consumption of the pumping station; and setting a target outflow rate that meets the constraint, for constant flow rate control of the pumping station.

20 Claims, 34 Drawing Sheets

(56) References Cited

OTHER PUBLICATIONS

Rinas et al., "Sedimentation of Raw Sewage: Investigations for a Pumping Station in Northern Germany under Energy-Efficient Pump Control", Water, vol. 11, No. 40, 2019, pp. 1-16.

* cited by examiner

| Current pump state | First switching rule | Second switching rule |
|---|---|---|
| Pump state $BS_i$ | Pump state $BS_{i,1}$ | Pump state $BS_{i,2}$ |

FIG. 19

CONTROL METHOD, CONTROL SYSTEM, AND NON-TRANSIENT COMPUTER-READABLE STORAGE MEDIUM

CROSS-REFERENCE TO RELATED APPLICATION

This application claims priority to Chinese Patent Application No. 202310309039.0, filed on Mar. 27, 2023, and entitled "CONTROL METHOD, CONTROL SYSTEM, AND NON-TRANSIENT COMPUTER-READABLE STORAGE MEDIUM," the entirety of which is incorporated herein by reference.

TECHNICAL FIELD

This application relates to the field of industrial control, and in particular to a control method, a control system, and a non-transient computer-readable storage medium that are conducive to improving control of a pumping station

BACKGROUND ART

Pumping stations are widely used in sewage treatment plants, hydraulic power stations, water supply stations, and the like, which consume a large amount of electrical energy. There are more than 10,900 pumping stations distributed in urban sewage treatment plants of 129 countries.

At present, operation of a pump in a pumping station is typically based on human experience, and energy-saving requirements under different situations are not specifically considered. For example, a conventional method for optimizing energy consumption of a pumping station is the Best Efficiency Point (BEP) method, by which an outflow rate of the pumping station is constantly controlled at a flow rate corresponding to a best efficiency point of the pump. However, the BEP method is only applicable to a pump operating at a stable inflow rate (also known as inlet flow rate). Otherwise, a tank level may exceed an upper limit or lower limit due to an imbalance between the inflow rate and the outflow rate.

In view of the above, it is desired to propose a control method applicable to different situations for achieving energy-saving and other aims.

BRIEF DESCRIPTION

A brief summary of the present disclosure is provided below, in order to provide a basic understanding of certain aspects of the present disclosure. It should be understood that this summary is not an exhaustive overview of the present disclosure, and is not intended to identify key or essential parts of the present disclosure or to limit the scope of the present disclosure. This section is provided to present some concepts in a simplified form as a prelude to the more detailed description discussed later.

An objective of at least one aspect of the present disclosure is to provide a control method, a control system, and a non-transient computer-readable storage medium that are applicable to different environmental conditions for achieving energy-saving, thereby improving control of a pumping station.

According to an aspect of the present disclosure, a control method is provided. The method is applicable to a pumping station including one or more pumps. The method may include: comparing an inflow rate of the pumping station with a flow rate for optimal energy consumption of the pumping station; determining, based on whether the inflow rate of the pumping station is greater than or equal to, or less than or equal to, the flow rate for optimal energy consumption of the pumping station, a corresponding constraint that indicates whether a target outflow rate of the pumping station is to be greater than or equal to, or less than or equal to, the flow rate for optimal energy consumption of the pumping station; and setting a target outflow rate that meets the constraint, for constant flow rate control of the pumping station.

According to another aspect of the present disclosure, a control system applicable to a pumping station including one or more pumps is provided. The control system includes an electronic device. The electronic device includes processing circuitry configured to: compare an inflow rate of the pumping station with a flow rate for optimal energy consumption of the pumping station; determine, based on whether the inflow rate of the pumping station is greater than or equal to, or less than or equal to, the flow rate for optimal energy consumption of the pumping station, a corresponding constraint that indicates whether a target outflow rate of the pumping station is to be greater than or equal to, or less than or equal to, the flow rate for optimal energy consumption of the pumping station; and set a target outflow rate that meets the constraint, for constant flow rate control of the pumping station.

According to yet another aspect of the present disclosure, a non-transient computer-readable storage medium is provided. The storage medium stores executable instructions. The executable instructions, when executed by a processor, cause the processor to execute the control method or various functions of the control system (such as functions of the electronic device in the control system).

According to other aspects of the present disclosure, computer program code and a computer program product for implementing the method according to the present disclosure are further provided.

According to at least one aspect of the embodiments of the present disclosure, based on a comparison between the inflow rate of the pumping station and the flow rate for optimal energy consumption of the pumping station, a corresponding constraint that a target outflow rate of the pumping station should meet is determined, and the target outflow rate that meets the constraint is set for the constant flow rate control of the pumping station. In this way, a control scheme beneficial to energy-saving or liquid level stability is realized for different inflow rates, and control of the pumping station is improved.

In the following sections of the specification, other aspects of embodiments of the present disclosure are provided, in which preferred embodiments for fully disclosing the embodiments are described in detail without imposing limitations thereon.

BRIEF DESCRIPTION OF THE DRAWINGS

The drawings are described herein for illustrating selected embodiments rather than all possible embodiments, and are not intended to limit the scope of the present disclosure.

FIG. 19 is a schematic diagram illustrating an example of a first switching rule and a second switching rule recorded for a current pump state.

Figure 1:
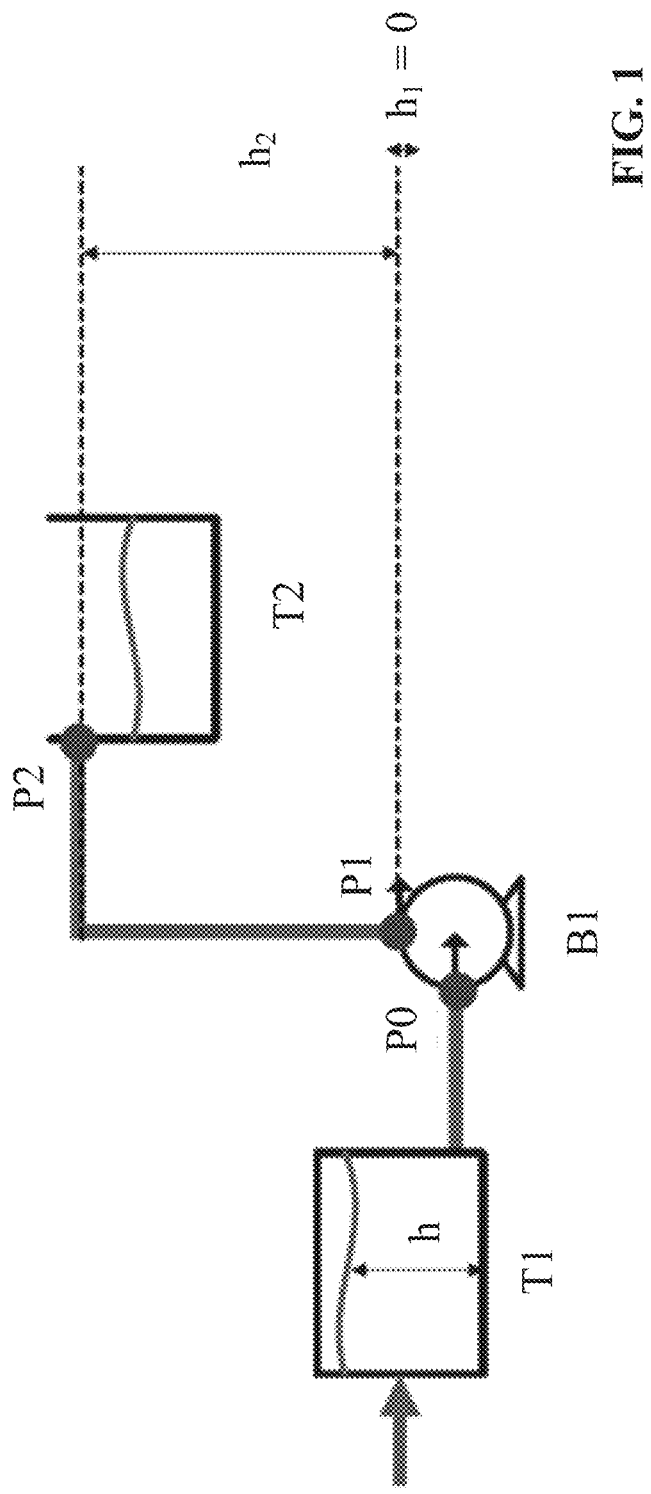
FIG. 1 is a schematic diagram showing a pump and a water tank in a pumping station.

Although the present disclosure is susceptible to various modifications and alternatives, specific embodiments of the present disclosure are shown in the drawings by way of examples and are described in detail herein. However, it should be understood that description of the specific embodiments herein is not intended to limit the present disclosure to the specific forms disclosed, but to cover all modifications, equivalents and alternatives that fall within the spirit and scope of the present disclosure. It should be noted that same or similar reference numerals throughout the drawings indicate the same or like components.

DETAILED DESCRIPTION

The embodiments of the present disclosure are described completely with reference to the drawings. The following description is merely exemplary, and is not intended to limit the present disclosure and application or use thereof.

Exemplary embodiments are provided so that the present disclosure is thorough and fully convey the scope thereof to those skilled in the art. Numerous specific details, such as examples of specific components, devices, and methods, are set forth to provide a comprehensive understanding of the embodiments of the present disclosure. It is apparent to those skilled in the art that the exemplary embodiments may be implemented in many different forms without specific details, and should be construed as limiting the scope of the present disclosure. In some exemplary embodiments, well-known processes, well-known structures, and well-known technologies are not described in detail.

The description is presented in the following order:

1. Overview
    1.1 Related Models
    1.2 1.2 SEC Response Surface
    1.3 Comparison of Control Schemes
    1.4 Control Schemes disclosed in the present disclosure
2. Embodiments of Apparatus and Method in Control System
    2.1 Exemplary Configuration and Process of Electronic Device
    2.2 Exemplary Configuration and Process of Controller

1. Overview

As mentioned above, the conventional operation of a pump in a pumping station is usually based on human experience, and energy-saving requirements under different situations (such as changes in inflow flow) are not specifically considered. Therefore, it is desired to propose an improved control method which can satisfy an energy-saving requirement of the pumping stations in different situations.

The inventors propose multiple models for studying specific energy consumption (SEC) of a pump in a pumping station at different liquid levels and pump speeds, and study different control schemes in terms of an operating path, energy consumption, speed and safety of reaching a target liquid level. Thereby, an improved control scheme is provided.

[1.1 Related Models]

As a preface, hereinafter discussed are models for a pump proposed in order to improve control of a pumping station.

(Energy Consumption Model)

An energy consumption model for estimating specific energy consumption of a pump based on a liquid level and a pump speed is proposed. The model may be obtained through machine learning by using historical data related to the pump. Here, the historical data of the pump may include, for example, a historical liquid level and pump speed of the pump, and historical specific energy consumption corresponding to the historical liquid level and pump speed.

Preferably, the energy consumption model may be a gray-box model obtained through physics-informed machine learning. The energy consumption model may fit a higher-order polynomial function of a liquid level and a pump speed that represents the specific energy consumption. Coefficients of the higher-order polynomial are determined through machine learning. The function has a form of equation (1) as follows:

$$E_s = \beta_7 n^4 + \beta_6 n^3 + \beta_5 hn^2 + \beta_4 hn + \beta_3 n^2 + \beta_2 n + \beta_1 h + \beta_0 \quad (1)$$

In equation (1), $E_s$ represents the specific energy consumption, n represents the pump speed (rotational speed), h represents the liquid level of a tank where the pump is located, and $\beta_0$ to $\beta_7$ are coefficients determined through machine learning. The equation (1) may be characterized by using a regression model, and it may be trained by using a loss function indicating a mean square error or mean absolute error between a model output and historical specific energy consumption, so as to obtain the coefficients. Specific form and training process of the regression model may be implemented appropriately through various existing methods, and are not described in detail here.

Hereinafter, reference is made to FIG. 1 to obtain principle of equation (1) from an exemplary description of a pump as shown in FIG. 1. FIG. 1 is a schematic diagram showing a pump B1, a lower tank T1 and an upper tank T2 in a pumping station.

A power P of the pump B1 shown in FIG. 1 may be calculated based on the following equation:

$$P = \frac{q \Delta p}{\eta} \quad (2)$$

In equation (2), q represents a flow rate of the pump, $\Delta P$ represents a delivery pressure of the pump, which is equal to a difference between a pressure $p_1$ at a pump outlet point P1 and a pressure $p_{00}$ at a pump inlet point P0, and $\eta$ represents an efficiency of the pump. By dividing q on both sides of equation (2), an equation for calculating a SEC based on the $E_s$ is obtained as follows:

$$E_s = \frac{\Delta p}{\eta} \quad (3)$$

Based on the Bernoulli equation, an equation can be derived as follows:

$$p_1 = \rho g h_1 + \frac{1}{2} \rho v^2 = p_2 + \rho g h_2 + \frac{1}{2} \rho v^2 + kq^2 \quad (4)$$

In equation (4), k is a constant, $kq^2$ represents a power loss, $\rho$ represents a liquid density, g represents the gravitational constant, $h_1$ and $p_1$ represent a height and pressure measured at the outlet P1 of the pump B1 (which is also a pipeline inlet) in the lower tank T1, and $h_2$ and P2 represent a height and pressure measured at a pipeline outlet P2 in the upper tank T2. It is assumed that a liquid flow velocity v at the pipeline inlet P1 is the same as that at the pipeline output P2. In addition, the pipeline outlet P2 in the upper tank T2 is communicated to the air, having $p_2 = p_0$ ($p_0$ represents an atmospheric pressure). Here, the outlet P1 of the pump B1 is taken as a baseline, having $h_1 = 0$; and $h_2$ is a constant obtained through measurement. Given that the inlet pressure $p_{00}$ of the pump B1 satisfies $p_{00} = \rho gh + p_0$, there has outlet pressure $p_1 = \rho gh + p_0 + \Delta p$. Here, h represents a liquid level in the lower tank T1, which is also the liquid level of the pumping station discussed in the context of the present disclosure (a height of the pump itself is ignored in the discussion). Therefore, equation (4) may be rewritten as:

$$\Delta p = pg(h_2 - h) + kq^2 \quad (5)$$

By substituting the equation (5) into equation (3), and approximating $1/\eta$ with a quadratic polynomial of q, the equation (3) is rewritten as:

$$E_s = \left( f_1(h; 1) + kq^2 \right) f_2(q; 2) \quad (6)$$

According to the affinity law, the flow rate q of the pump is directly proportional to the pump speed (rotational speed) n. Therefore, q may be represented with n. Thereby, the high-order polynomial for estimating the SEC in a form of equation (1) $(E_s = \beta_7 n^4 + \beta_6 n^3 + \beta_5 hn^2 + \beta_4 hn + \beta_3 n^2 + \beta_2 n + \beta_1 h + \beta_0)$ can be obtained based on (6).

Alternatively, the energy consumption model may be a black box model obtained through machine learning. The black box is to estimate the specific energy consumption based on the liquid level and the pump speed without any physical information. For example, the black box model may be obtained based on a deep neural network through training by using historical data, which is not repeated here. (Flow Rate Model)

A flow model for estimating a flow rate of a pump based on a liquid level and a pump speed is further proposed. The model may be obtained through machine learning by using historical data related to the pump. Here, the historical data of the pump may include, for example, a historical liquid level and pump speed of the pump, and historical flow rate corresponding to the historical liquid level and pump speed.

Preferably, the flow rate model may be a gray-box model obtained through physics-informed machine learning. The flow rate model may fit a second-order polynomial function of a liquid level h and a pump speed n that represents a flow rate q. Coefficients of the second-order polynomial are determined through machine learning. The function has a form of equation (7) as follows:

$$q = \sqrt{\beta_1 n^2 + \beta_2 h + \beta_0} \quad (7)$$

In equation (7), $\beta_0$ to $\beta_1$ represent coefficients determined through machine learning. The equation (7) may be characterized by using a regression model, and it may be trained by using a loss function indicating a mean square error or mean absolute error between a model output and a historical flow rate, so as to obtain the coefficients. Specific form and training process of the regression model may be implemented appropriately through various existing methods, and are not described in detail here.

The equation (7) is obtained through the following steps. In the equation (5) $(\Delta p = \rho g(h_2 - h) + kq^2)$ discussed in the energy consumption model section, $\Delta p$ is represented by using $n^2$ (a square of the pump speed n) (since $\Delta p$ is in direct proportion to $n^2$ according to the affinity law). Thereby, there has $q^2 = \beta_1 n^2 + \beta_2 h + \beta_0$. The equation (7) is then obtained by simply extracting a square root on both sides of the equation, which is not repeated here.

Alternatively, the flow rate model may be a black box model obtained through machine learning. For example, the black box module may be obtained based on a deep neural network through training by using historical data, which is not repeated here.

(Pump Speed Model)

A pump speed model for estimating a pump speed (optimal pump speed) for optimal energy consumption of a pump based on a liquid level is further provided. The pump speed may be obtained through the following methods.

A first derivative of the equation (1) representing the specific energy consumption is calculated, so as to obtain the following equation:

$$\frac{\partial E_s}{\partial n} = 4\beta_7 n^3 + 3\beta_6 n^2 + (2h\beta_5 + 2\beta_3)n + (h\beta_4 + \beta_2) = 0 \qquad (8)$$

Numerical solutions of the cubic equation (8) with respect to the pump speed n are obtained for different liquid levels h. Here, different values of h correspond to different parameters of the cubic equation, and different numerical solutions of n can be obtained. The numerical solutions of n thus obtained, along with corresponding values of the liquid level h, can be used as the training data for training the pump speed model.

In an example, the pump speed model may be a black box model obtained through machine learning. For example, the black box model may be obtained based on a deep neural network through training by using historical data, which is not repeated here.

[1.2 SEC Response Surface]

By using the trained energy consumption model, a SEC response surface with respect to liquid levels and pump speeds can be obtained for a given pump.

Figure 2:
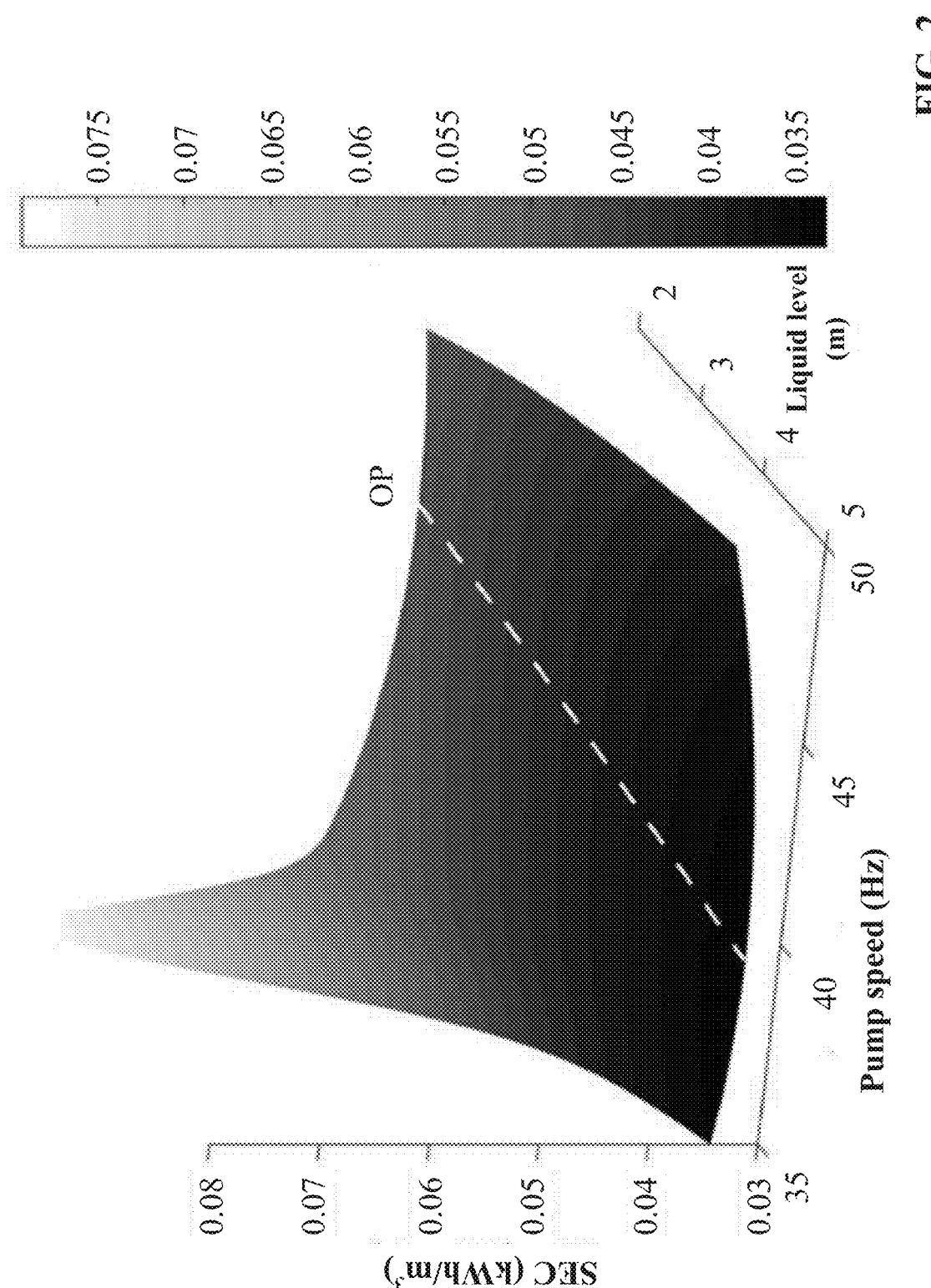
FIG. 2 is an example of a specific energy consumption (SEC) response surface of a pump obtained by using an energy consumption model.

FIG. 2 shows an example of a SEC response surface of an exemplary pump obtained by using the energy consumption model. On the SEC response surface as shown in FIG. 2, a lighter grayscale indicates a higher SEC, and a darker grayscale indicates a lower SEC. An OP line shown as a dashed line indicates a line connecting points at which the SEC is lowest at different liquid levels on the SEC response surface (the line is referred to as an optimal energy consumption line). In other words, points on the OP line correspond to optimal pump speeds (pump speeds for optimal energy consumption) at respective liquid levels and the lowest SECs at such optimal pump speeds. As shown in FIG. 2, the SEC response surface has an approximately U-shaped form near the OP line that is substantially symmetrical about the OP line, and the SEC response surface has a peak at a position where the pump speed is low and the liquid level is low (see upper left in FIG. 2), indicating that the SEC has a maximum value at the peak.

In addition, with the trained flow model, a flow rate of the given pump can be determined based on the liquid level and the pump speed. It is found by the inventor that flow rates of respective points on the optimal energy consumption line (that is, the OP line) calculated by using the flow rate model based on the liquid levels and pump speeds at the point are constant, and the flow rate is approximately equal to a best efficiency point (BEP) flow rate of the pump. The BEP flow rate may be obtained, for example, from a pump efficiency curve or pump performance curve provided by a pump manufacturer, which is not described in detail here. Hence, the principles and calculations of the energy consumption model and the flow rate model proposed in the present disclosure are reasonable and accurate. In the example as shown in FIG. 2, the flow rate corresponding to the OP line is approximately 10000 ($m^3$/h).

Figure 3:
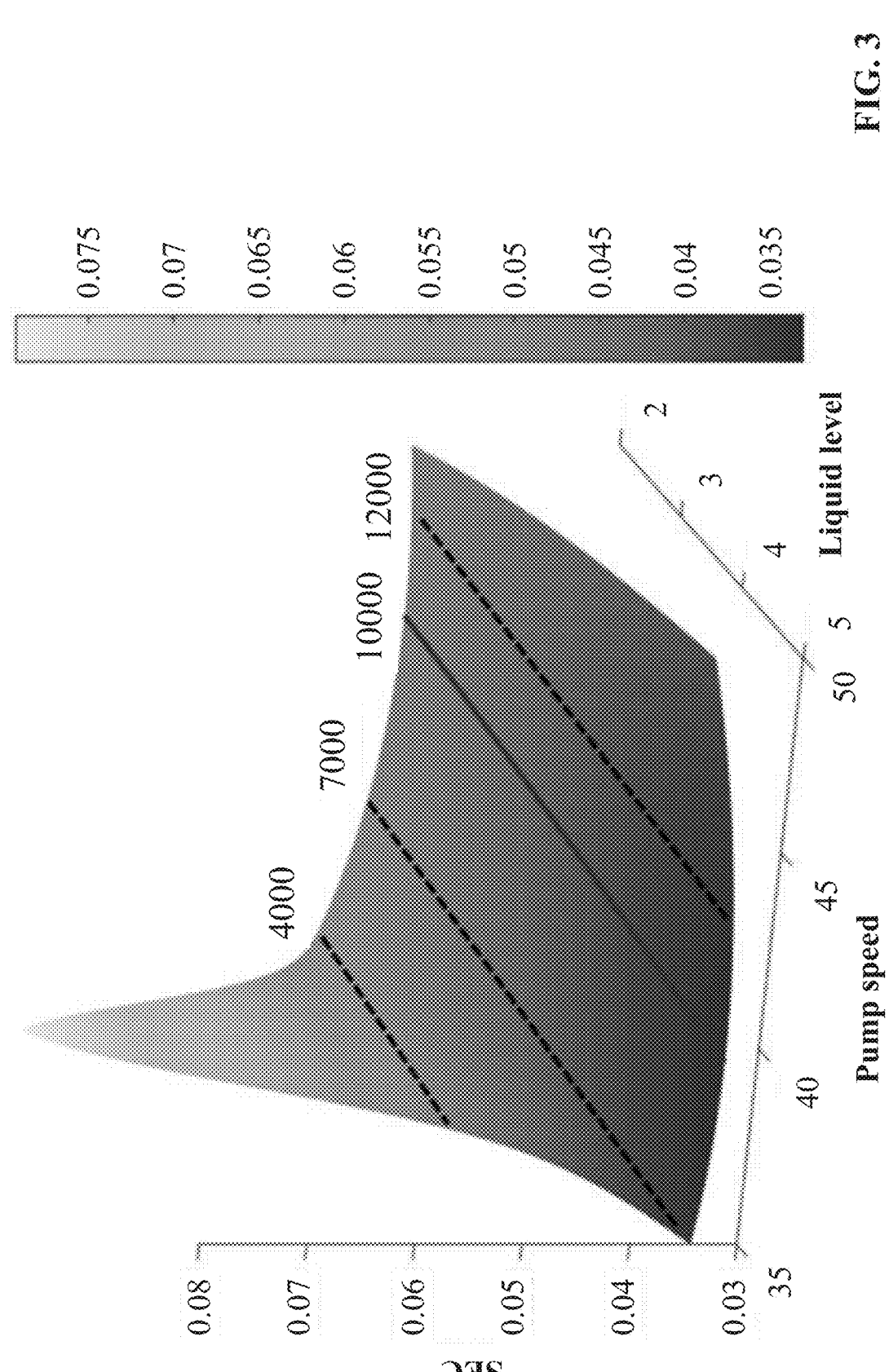
FIG. 3 schematically illustrates equal flow rate lines on a SEC response surface.

In addition, multiple equal flow rate lines on the SEC response surface as shown in FIG. 3 are obtained by calculating different flow rates at different liquid levels and pump speeds for a given pump based on the flow model. FIG. 3 schematically illustrates an example of equal flow lines on a SEC response surface. In FIG. 3, multiple lines parallel with each other are marked on the SEC response surface shown in FIG. 2 to represent multiple equal flow lines corresponding to different liquid levels and pump speeds. As shown in FIG. 3, from left to right on the SEC response surface, the respective equal flow lines indicate an increase in the flow rate of the pump from 4000 ($m^3$/h) to 12000 ($m^3$/h). Here, the OP line in FIG. 2 corresponds to an equal flow line having a flow rate of 10000 ($m^3$/h).

[1.3 Comparison of Control Schemes]

(Operation Path of Control Schemes)

Before describing comparison between different control schemes for a pumping station, the control schemes and operating paths thereof are introduced. Here, a situation where only one pump is included in the pumping station is taken as an example for description in order to simplify the discussion. The content discussed herein can be similarly applied to other situations where multiple pumps are included in the pumping station, which is not described here. Constant Speed Control and Operating Path for the Constant Speed Control A conventional control method for a pumping station is to manually adjust a pump speed in the pumping station by an operator based on experience, and the pump operates constantly at the manually adjusted pump speed until a next manual adjustment on the pump speed. In the present disclosure, this control method may be abbreviated as a constant speed control, when appropriate.

For example, in a case that a current outflow rate of the pumping station is greater than an inflow rate of the pumping station, and a liquid level of the pumping station is higher than a target liquid level, the operator may manually reduce the pump speed of the pump in the pumping station and control the pump to operate at a constant speed for a period of time at the reduced pump speed, resulting in a decrease in the outflow rate and the liquid level of the pumping station. The operator may repeat the above operations until the outflow rate of the pumping station is close to the inflow rate and the liquid level is close to the target liquid level. In a case that the current outflow rate of the pumping station is less than the inflow rate and the liquid level is less than the target liquid level, the operator may manually increase the pump speed of the pump in the pumping station and control the pump to operate at a constant speed for a period of time at the increased pump speed, resulting in an increase in the outflow rate and the liquid level of the pumping station. The operator may repeat the above operations until the outflow rate of the pumping station is close to the inflow rate and the liquid level is close to the target liquid level.

The manual operation may be represented by calculating a flow rate setpoint that satisfies a liquid level limit by using a proportional control algorithm, adjusting the pump speed to make the flowrate reach the flow rate setpoint, and operating the bump constantly at the adjusted pump speed. The flow rate setpoint may be calculated by the following equation (9):

$$r_q(t) = C * (r_h - h(t)) + q_{in}(t) \qquad (9)$$

In equation (9), t represents time, $r_q(t)$ represents the flow rate setpoint of the pumping station (a setpoint for the outflow rate), C is a control coefficient which is a negative constant (used as a gain factor for proportional control), $r_h$ represents the target liquid level of the pumping station (which may be pre-set, for example), h(t) represents a real-time liquid level of the pumping station, and $q_{in}(t)$ represents a real-time inflow rate of the pumping station.

Figure 4A:
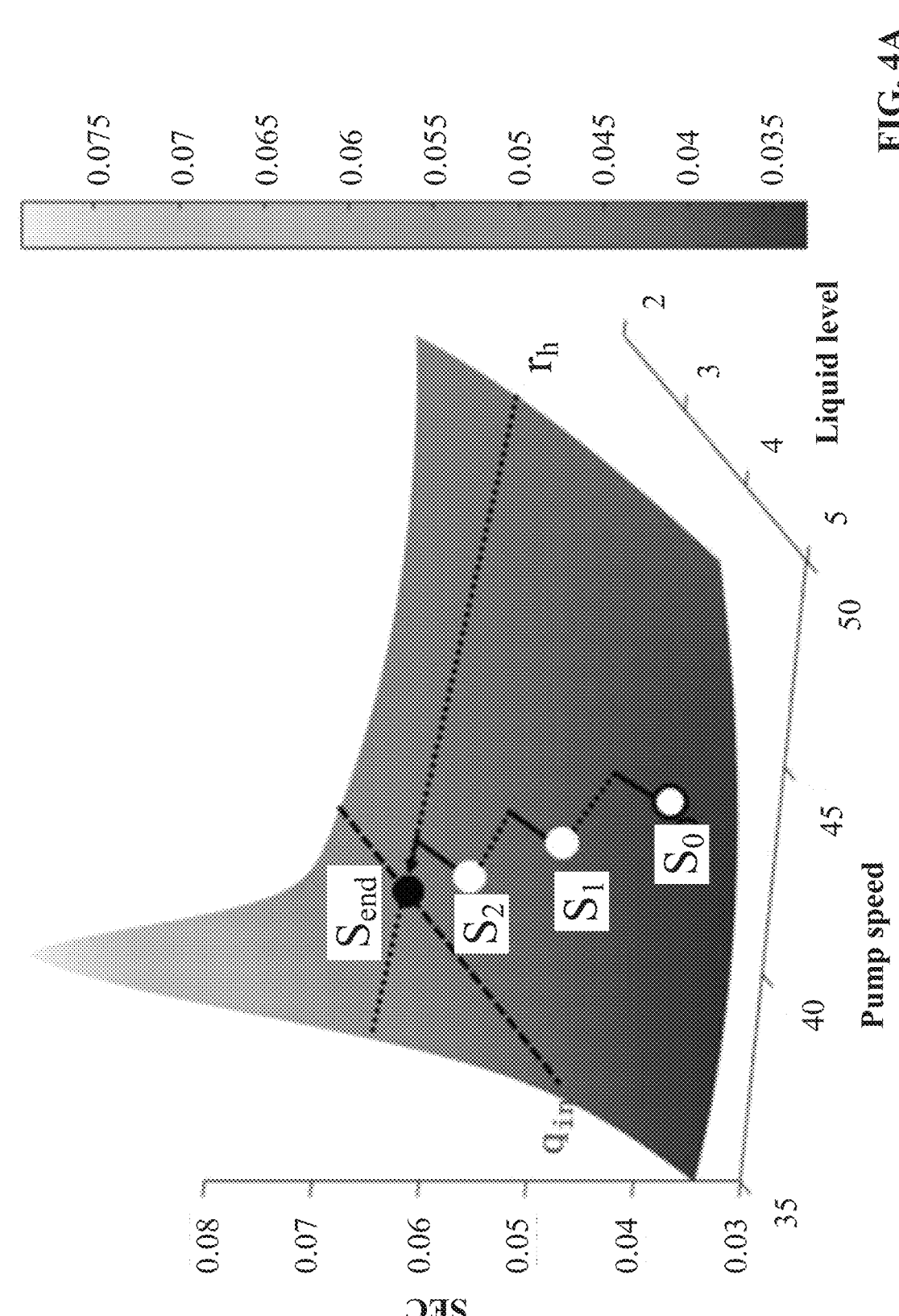
FIGS. 4A and 4B schematically illustrate operating paths for constant speed control of a pump and constant flow rate control of a pump, respectively, on a SEC response surface.

FIG. 4A schematically illustrates an example of an operating path for constant speed control of a pump on a SEC response surface. In FIG. 4A, a target liquid level $r_h$ and an inflow rate $q_{in}$ of the pumping station are marked, a final target operating point $S_{end}$ as an intersection of the target liquid level $r_h$ and the inflow rate $q_{in}$ is marked, and a zigzag operating path which starts from a current operating point $S_0$ of the pump, travels through operating points $S_1$ and $S_2$ respectively corresponding to flow rate setpoints set in middle, and ends at the final target operating point $S_{end}$ is marked.

Here, the current operating point $S_0$ is a point on the SEC response surface, which point corresponds to the current liquid level and the pump speed of the pump, where the current flow rate is greater than the inflow rate. The operating path from the current operating point $S_0$ to the operating point $S_1$ corresponding to a next flow rate setpoint is as follows. The pump is operated constantly at the current pump speed for a period of time, resulting in a decrease in the liquid level as shown by a solid line above $S_0$. Then, the pump speed is reduced manually by the operator, resulting in a decrease of the flow rate to a flow rate corresponding to the operating point $S_1$, as shown by the dashed line. The pump operates at the decreased pump speed from $S_1$. Since the target liquid level has not yet been reached, the above-mentioned control and operation of the pump are repeated, resulting in a similar operation path that travels through $S_1$, $S_2$ and $S_{end}$, until the final target operating point $S_{end}$ is reached or approached.

Constant Flow Rate Control and Operating Path for the Constant Flow Rate Control As an improved control based on the conventional constant speed control mentioned above, a constant flow rate control scheme is considered by the inventor as follows. This scheme adopts the flow rate setpoint calculated based on equation (9) in constant speed control. However, in a process of approaching the flow rate setpoint, the target pump speed is calculated based on the current flow rate and the flow rate setpoint by using a proportional integral control, so as to control the pump speed, and thereby achieve the flow rate setpoint with the target pump speed. In this scheme, the pump speed can be changed based on the flow rate setpoint to achieve a constant flow rate. The calculation of the target pump speed may be represented as:

$$n_q(t) = K_P e(t) + K_i \int_0^t e(\tau) d(\tau) \qquad (10)$$

In equation (10), t represents time, $n_q(t)$ represents the target pump speed of the pump, $K_p$ represents a control coefficient as a constant (used as a gain factor for proportional control), $K_i$ represents a constant used for integral control. There has $e(t) = r_q(t) - q(t)$, where $r_q(t)$ represents a flow rate setpoint of the pump, which is calculated based on equation (9), for example, and q(t) represents a real-time flow rate of the pump.

Figure 4B:
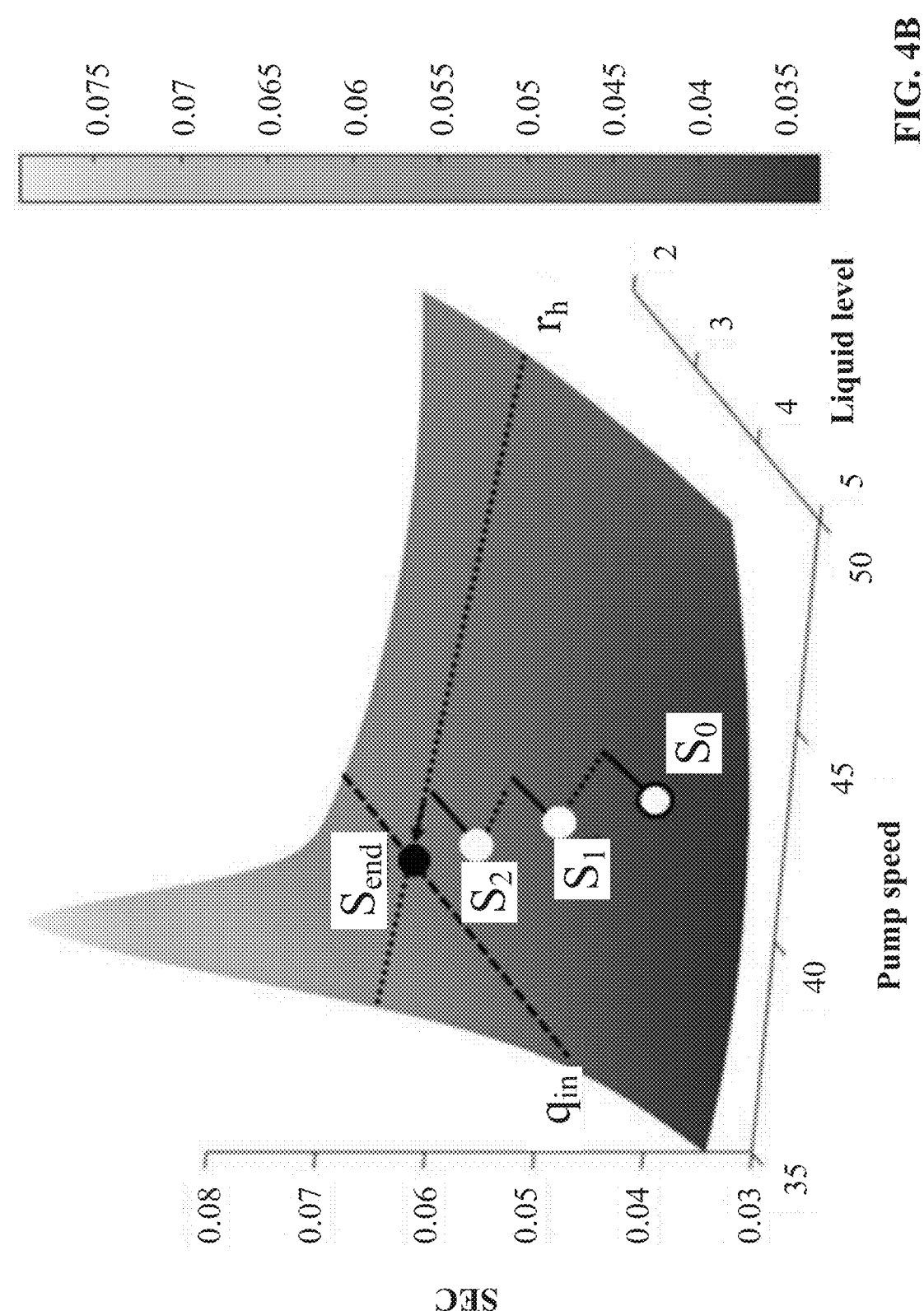

FIG. 4B schematically illustrates an example of an operating path for constant flow rate control of a pump on a SEC response surface. In FIG. 4B, similar to FIG. 4A, a target liquid level $r_h$ and an inflow rate $q_{in}$ of the pumping station are marked, a final target operating point $S_{end}$ is marked, and a zigzag operating path which starts from a current operating point $S_0$, travels through operating points $S_1$ and $S_2$ respectively corresponding to flow rate setpoints set in middle, and ends at the final target operating point $S_{end}$ is marked.

Similar to FIG. 4A, the current operating point $S_0$ in FIG. 4B is a point on the SEC response surface, which point corresponds to the current liquid level and the pump speed of the pump, where the current flow rate is greater than the inflow rate. The operating path from the current operating point $S_0$ to the operating point $S_1$ corresponding to a next flow rate setpoint is as follows. The pump is operated constantly at the current flow rate for a period of time, resulting in a decrease in the liquid level as shown by a solid line above $S_0$. Based on the decreased liquid level, a flow rate setpoint corresponding to $S_1$ that is less than the current flow rate is calculated (for example, through equation (9)). The flow rate is reduced, by adjusting a pump speed (the adjusted pump speed is calculated, for example, through equation (10)), to reach the operating point $S_1$, as shown by the dashed line. The pump operates at the decreased flow rate from $S_1$. Since the target liquid level has not yet been reached, the above-mentioned control and operation of the pump are repeated, resulting in a similar operation path that travels through $S_1$, $S_2$ and $S_{end}$, until the final target operating point $S_{end}$ is reached or approached.

Comparing FIG. 4A to FIG. 4B, it can be seen that although the current operating point $S_0$ and the final target operating point $S_{end}$ in the constant flow rate control is the same as those in the constant speed control, specific operating paths under the two control schemes are different (the zigzag paths are different in terms of specific shapes). Therefore, the two control schemes may result in different energy consumptions, which are further described later.

Operating Path in Different Quadrants

Hereinabove described, with reference to FIG. 4A and FIG. 4B, are the operating paths for the constant speed control and the constant flow rate control in a case that the current flow rate is greater than the inflow rate and the current liquid level is higher than the target liquid level. However, in practical control of the pumping station, an operating path may vary depending on different positions of the current operating point $S_0$.

FIG. 5A to FIG. 5D show control paths depending upon different positions of the current operating point. In these figures, the SEC response surface is partitioned into four quadrants based on an inflow rate $q_{in}$ and a target liquid level $r_h$. FIG. 5A to FIG. 5D show operating paths for controls when the current operating point $S_0$ is in the first quadrant (Quadrant 1) to the fourth quadrant (Quadrant 4), respectively. It is noted that in order to simplify the diagram, the zigzag path in the second quadrant or the fourth quadrant is omitted in FIG. 5A to FIG. 5D, and an overall direction of the operating path is schematically shown by a straight path.

The schematic operating paths in FIG. 5A to FIG. 5D are applicable to both the constant speed control and the constant flow rate control.

Figure 5A:
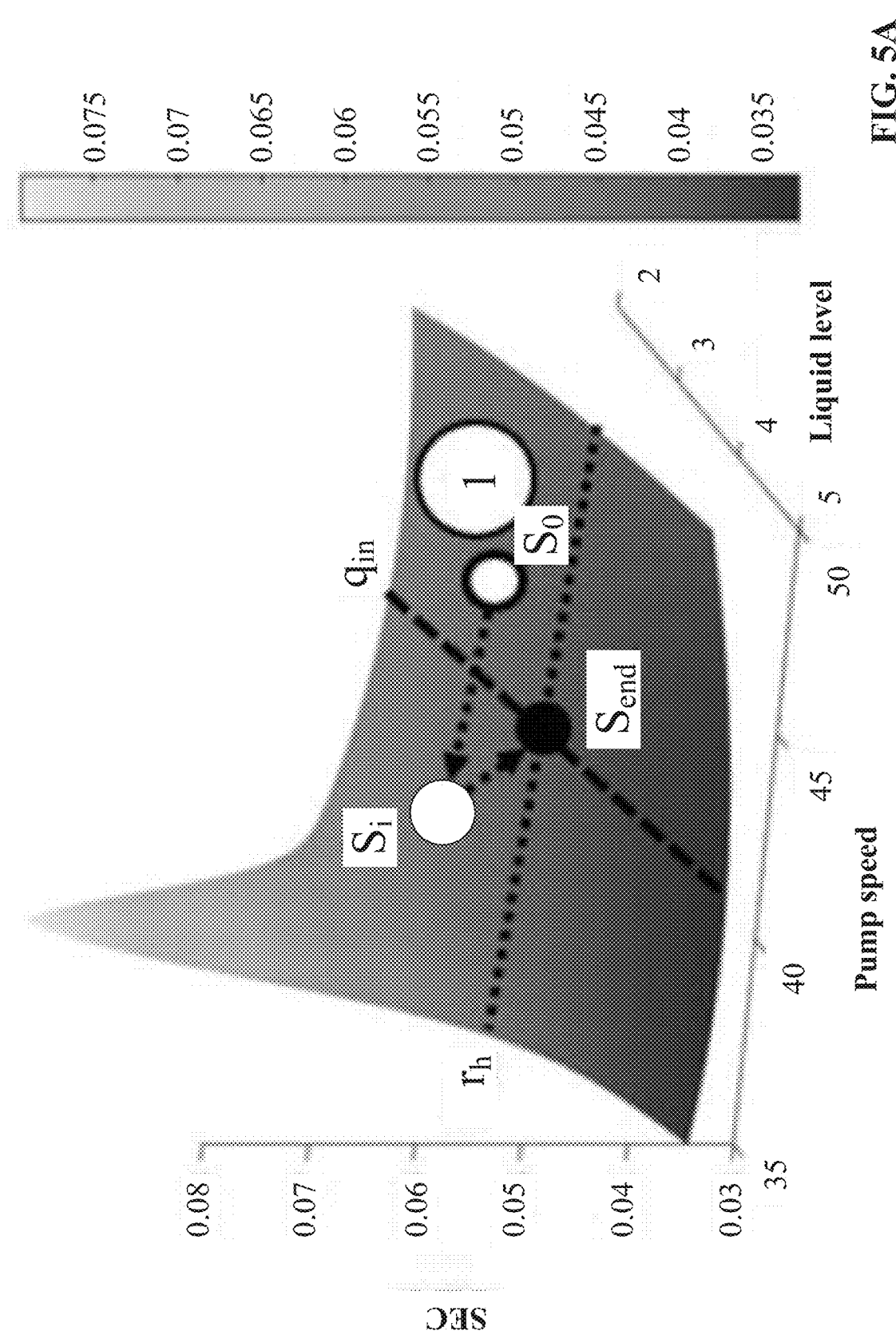
FIGS. 5A-5D schematically illustrate operation paths of controls in different quadrants on a SEC response surface.
Figure 5B:
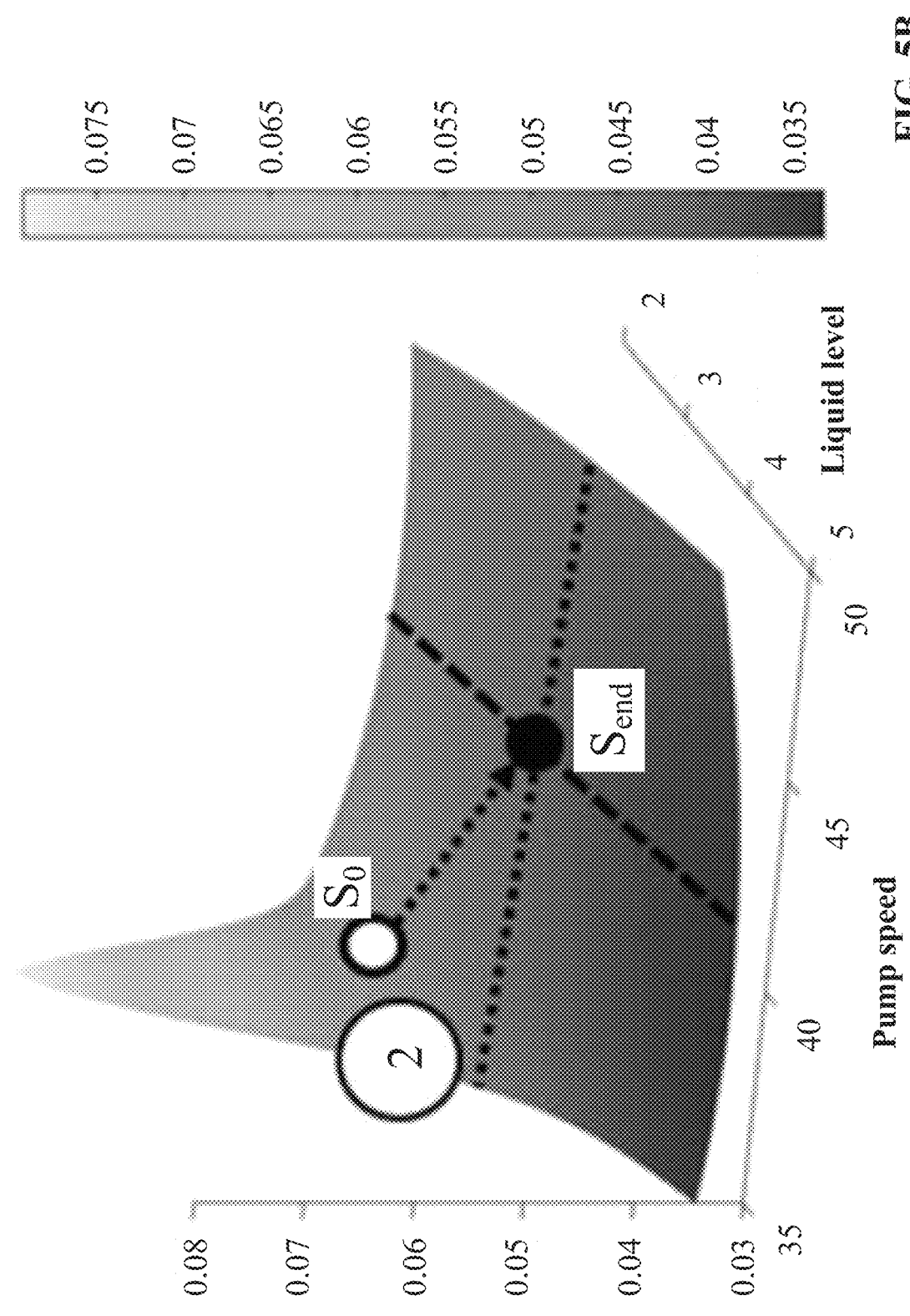
Figure 5C:
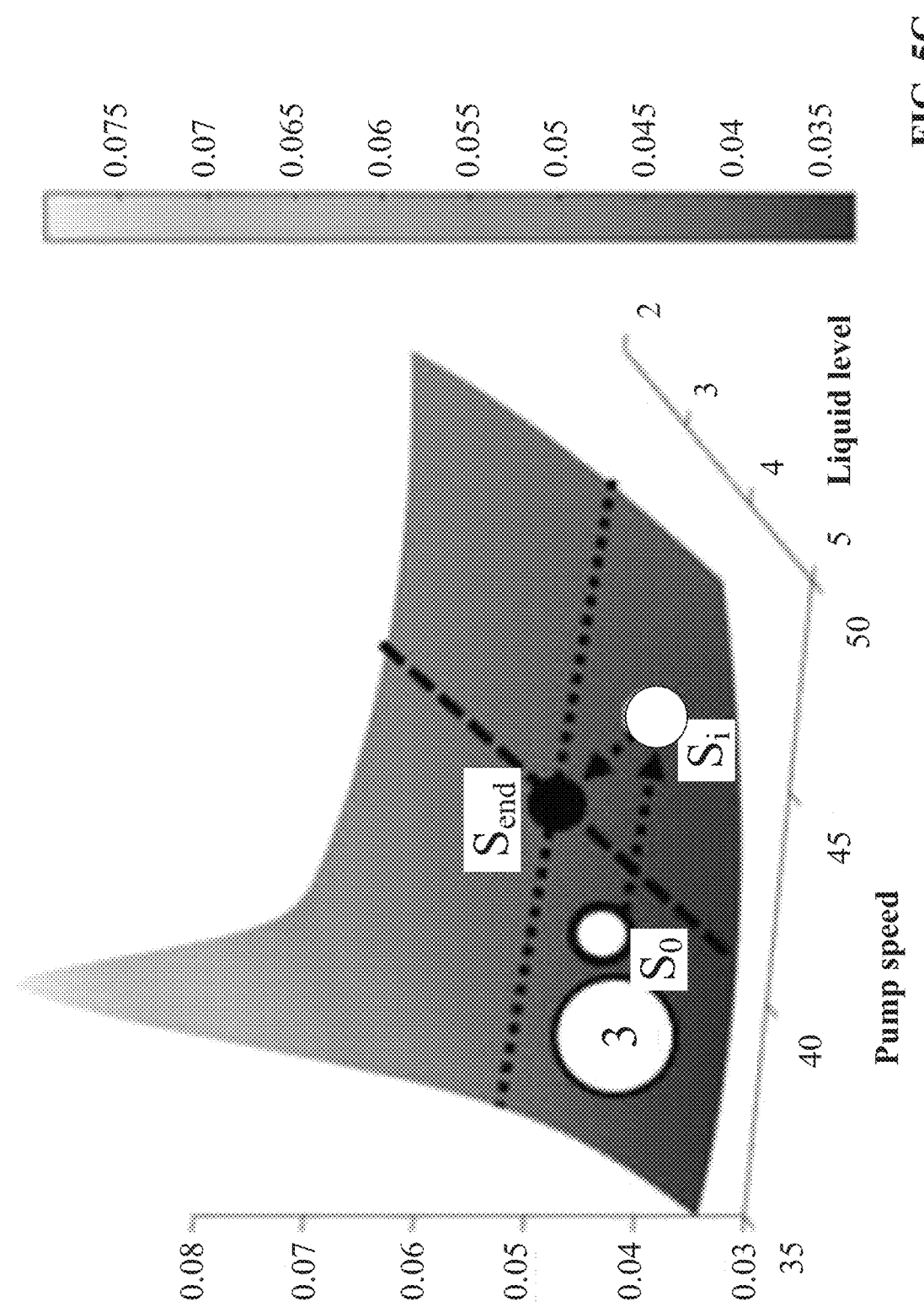
Figure 5D:
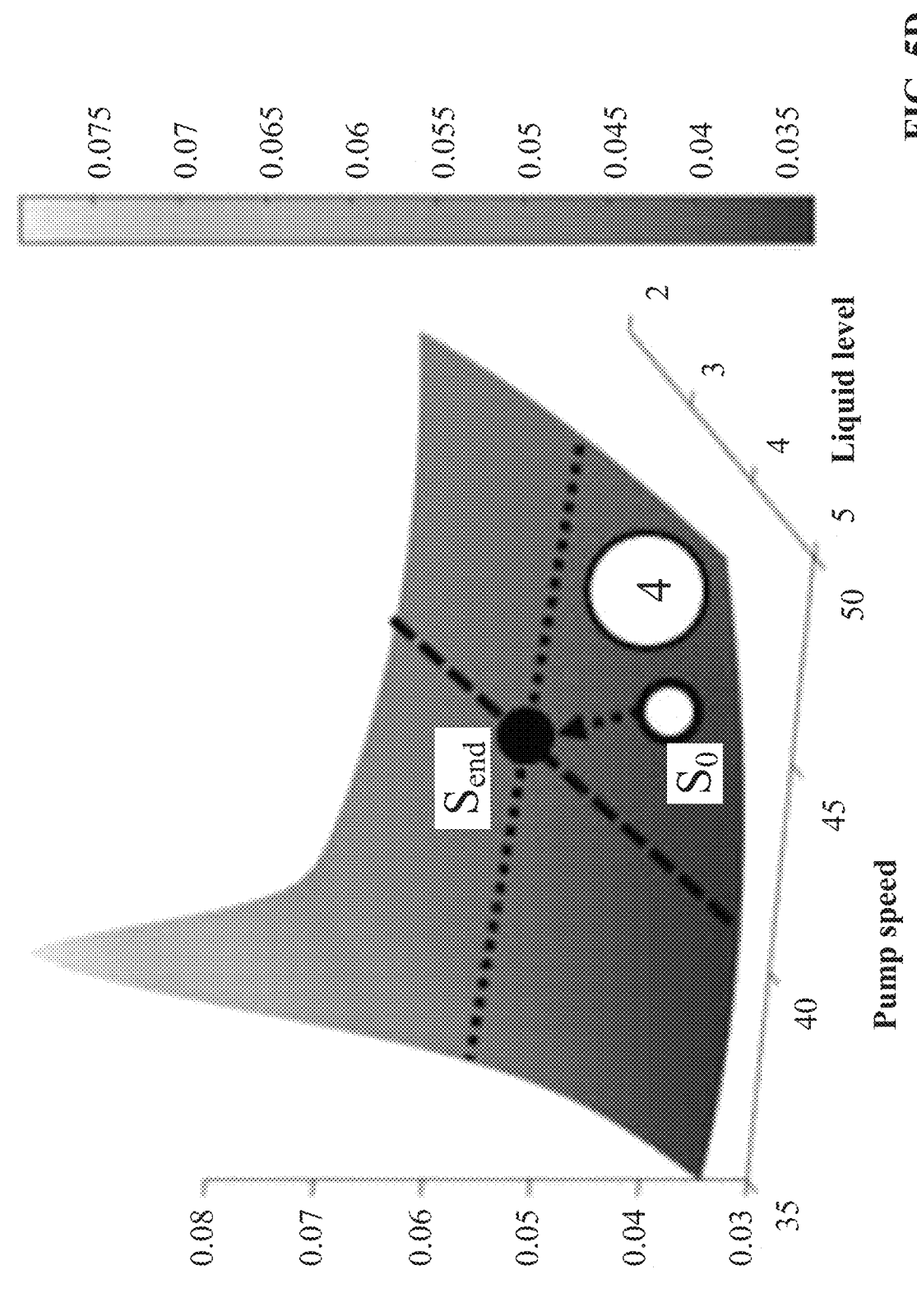

Reference is made to FIG. 5D. In FIG. 5D, the current operating point $S_0$ is in the fourth quadrant. The operating point may approach the final target operating point $S_{end}$ through a zigzag path as described above in conjunction with FIG. 4A and FIG. 4B. Similarly, when the current operating point $S_0$ is in the second quadrant (or Quadrant 2), as shown in FIG. 5B, the operating point may approach the final target operating point $S_{end}$ in a similar manner as in the fourth quadrant, for example, through a zigzag path.

However, when the current operating point $S_0$ is in the first quadrant as shown in FIG. 5A or in the third quadrant (Quadrant 3) as shown in FIG. 5C, it is necessary for the operating point to enter the second or fourth quadrant through intermediate operating point $S_i$ in the second or fourth quadrant, and then approach the final target operating point $S_{end}$ in the above-mentioned manner. The current operating point $S_0$ in the third quadrant as shown in FIG. 5C is taken as an example for the following description. In this case, at the current operating point $S_0$, a current flow rate is less than the inflow rate and a liquid level is greater than the target liquid level. Hence, a flow rate setpoint greater than the inflow rate, that is, an operating point $S_i$ corresponding to the fourth quadrant, is calculated based on equation (9). That is, compared to the current operating point $S_0$, only the pump speed or flow rate changes for the operating point $S_i$, and the liquid level remains unchanged, which is equivalent to a translation from the third quadrant to the fourth quadrant. Then, starting from the operating point $S_i$, the final target operating point $S_{end}$ can be approached along the operating path in the fourth quadrant. A situation where the current operating point $S_0$ is in the first quadrant, as shown in FIG. 5A, is similar to what described above and is no repeated here.

(Comparison of Control Schemes)

Based on the above-described operating paths for the constant speed control and the constant flow rate control, a comparison of energy consumption and other aspects of the two control schemes under different inflow rates is illustrated below with reference to FIG. 6A to FIG. 6D.

Comparison Regarding a Case that the Inflow Rate is Less than an OP

Figure 6A:
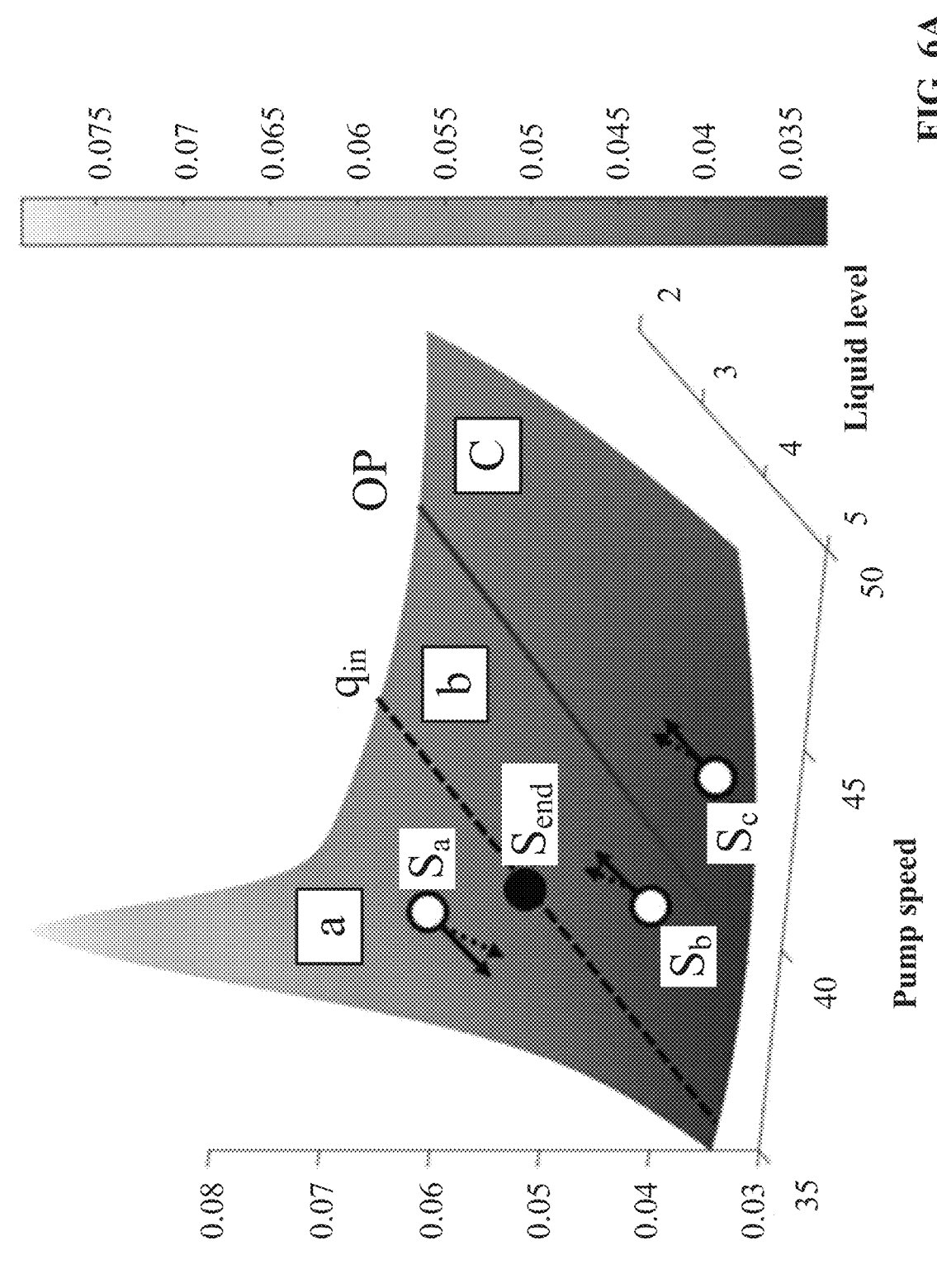
FIG. 6A schematically illustrates operation paths of two control schemes in different sections on a SEC response surface in a case that an inflow rate is less than a flow rate for optimal energy consumption.

Reference is made to FIG. 6A, which schematically illustrates operating paths for the two control schemes in different sections on a SEC response surface in a case that the inflow rate $q_{in}$ is less than a flow rate for optimal energy consumption OP.

As shown in FIG. 6A, the SEC response surface is partitioned into three sections based on the $q_{in}$ and OP, namely section a, section b, and section c. Section a is a section in which a flow rate is less than or equal to $q_{in}$; section c is a section in which a flow rate is greater than or equal to OP; and section b is a section in which a flow rate is in a range from $q_{in}$ to OP.

In FIG. 6A, for each of the current operating points $S_a$, $S_b$, and $S_c$ in the respective sections, paths from the current operating point towards the final target operating point $S_{end}$ (i.e., initial parts of the paths) under the constant speed control and the constant flow rate control are schematically shown as a dashed line and a solid line, respectively. Here, in order to simplify the illustration, the target liquid level is omitted and only the final target operating point $S_{end}$ determined based on the target liquid level and the inflow rate is shown. In addition, only a situation where the current operating point is in the second or fourth quadrant, of the four quadrants as shown in FIGS. 5A to 5D, is shown in FIG. 6A.

As shown in FIG. 6A, in a case where the current operating point $S_a$ is in section a, corresponding to a flow rate less than $q_{in}$, the constant flow rate control results in slight higher energy consumption than the constant speed control. However, since a smaller flow rate is maintained under the constant flow rate control than the constant speed control, the constant flow rate control can realize a faster increase of the liquid level, so that the target liquid level corresponding to $S_{end}$ can be reached faster, which is conducive to breaking away from a danger zone of a low liquid level.

Figure 6B:
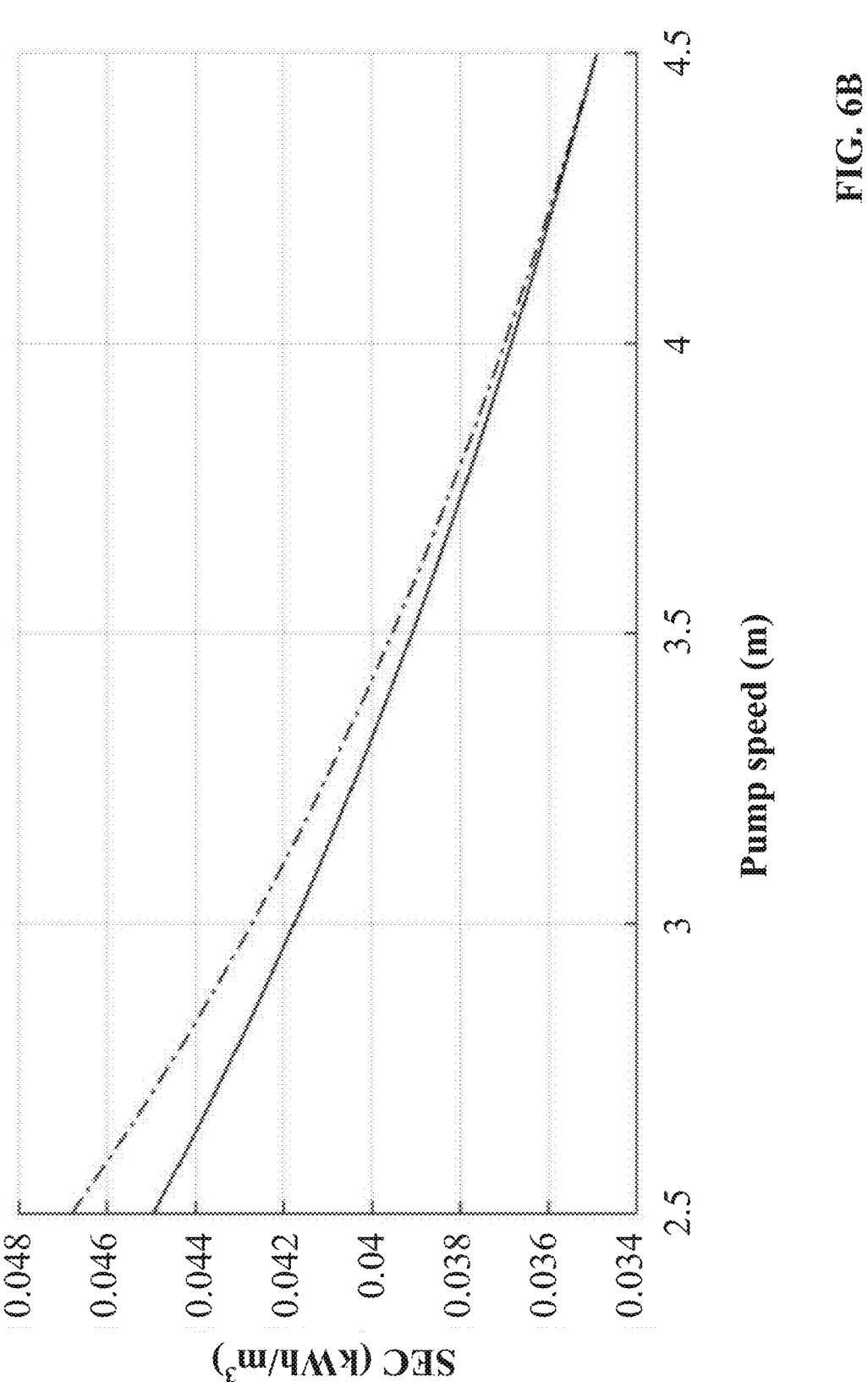
FIG. 6B schematically illustrates SECs for different liquid levels under two control schemes in a case as shown in FIG. 6A.

In addition, in a case where the current operating point $S_b$ is in section b, corresponding to a flow rate in a range from $q_{in}$ to OP, the constant flow rate control results in less energy consumption than the constant speed control (compared to a dashed path for the constant speed control, the solid path for the constant flow rate control corresponds to darker points on the SEC response surface). Additionally, a larger flow rate is maintained under the constant flow rate control than the constant speed control. Therefore, the constant flow rate control can realize a fast decrease of the liquid level, so that a time to reach the target liquid level can be reduced. That is, for section b, the constant flow rate control has multiple advantages over the constant speed control. FIG. 6B schematically shows an example of SECs for different liquid levels under two control schemes in the process of approaching the final target operating point $S_{end}$ from section b of FIG. 6A. In FIG. 6B, a solid line represents a SEC under the constant flow rate control, and a dashed line represents a SEC under the constant speed control. As shown in FIG. 6B, the constant flow rate control is superior to the constant speed control in terms of energy consumption.

However, as shown in FIG. 6A, in a case that the current operating point $S_c$ is in section c, corresponding to a flow rate greater than OP, the constant flow rate control results in greater energy consumption than the constant speed control.

Comparison Regarding a Case that the Inflow Rate is Greater than OP

Figure 6C:
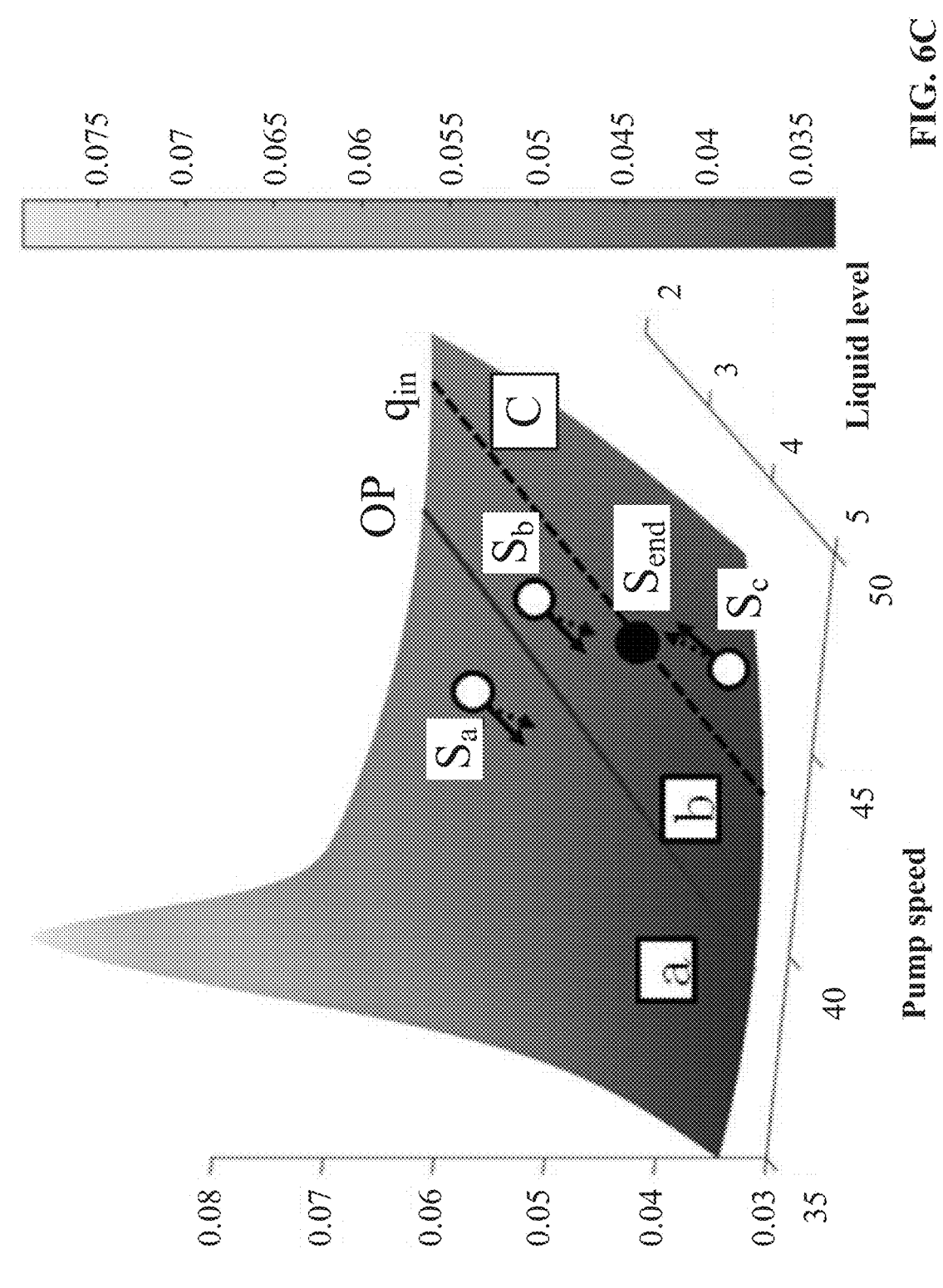
FIG. 6C schematically illustrates operation paths of two control schemes in different sections on a SEC response surface in a case that an inflow rate is greater than a flow rate for optimal energy consumption.

Reference is further made to FIG. 6C, which schematically illustrates operating paths for the two control schemes in different sections on a SEC response surface in a case that the inflow rate $q_{in}$ is greater than a flow rate for optimal energy consumption OP.

As shown in FIG. 6C, the SEC response surface is partitioned into three sections based on the $q_{in}$ and OP, namely section a, section b, and section c. Section a is a section in which a flow rate is less than or equal to OP; section c is a section in which a flow rate is greater than or equal to $q_{in}$; and section b is a section in which a flow rate is in a range from OP to $q_{in}$.

Similar to FIG. 6A, in FIG. 6C, for each of the current operating points $S_a$, $S_b$, and $S_c$ in the respective sections, paths from the current operating point towards the final target operating point $S_{end}$ (i.e., initial parts of the paths) under the constant speed control and the constant flow rate control are schematically shown as a dashed line and a solid line, respectively. Only a situation where the current operating point is in the second or fourth quadrant is shown in FIG. 6C.

As shown in FIG. 6C, in a case where the current operating point $S_c$ is in section c, corresponding to a flow rate greater than $q_{in}$, the constant flow rate control results in slight higher energy consumption than the constant speed control. However, since a larger flow rate is maintained under the constant flow rate control than the constant speed control, the constant flow rate control can realize a faster decrease of the liquid level, so that the target liquid level corresponding to $S_{end}$ can be reached faster, which is conducive to breaking away from a danger zone of a high liquid level.

Figure 6D:
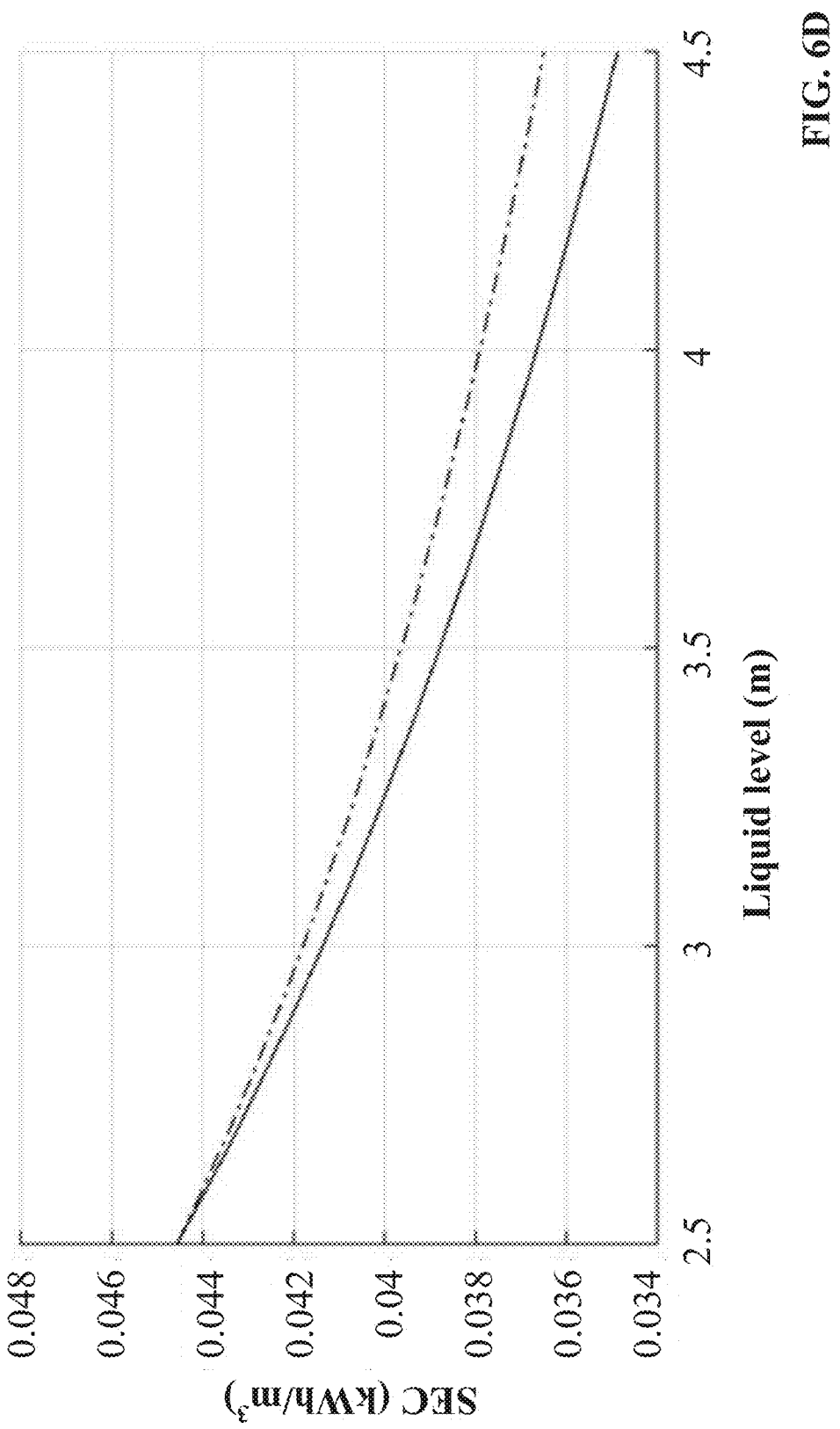
FIG. 6D schematically illustrates SECs for different water levels under two control schemes in a case as shown in FIG. 6C.

In addition, in a case where the current operating point $S_b$ is in section b, corresponding to a flow rate in a range from OP to $q_{in}$, the constant flow rate control results in less energy consumption than the constant speed control (compared to a dashed path for the constant speed control, the solid path for the constant flow rate control corresponds to darker points on the SEC response surface). Additionally, a smaller flow rate is maintained under the constant flow rate control than the constant speed control. Therefore, the constant flow rate control can realize a fast increase of the liquid level, so that a time to reach the target liquid level can be reduced. That is, for section b, the constant flow rate control has multiple advantages over the constant speed control. FIG. 6D schematically shows an example of SECs for different liquid levels under two control schemes in the process of approaching the final target operating point $S_{end}$ from section b of FIG. 6B. In FIG. 6D, a solid line represents a SEC under the constant flow rate control, and a dashed line represents a SEC under the constant speed control. As shown in FIG. 6D, the constant flow rate control is superior to the constant speed control in terms of energy consumption.

However, as shown in FIG. 6C, in a case that the current operating point $S_a$ is in section a, corresponding to a flow rate less than OP, the constant flow rate control results in greater energy consumption than the constant speed control.

[1.4 Control Scheme in this Disclosure]

Based on the comparison of control schemes with reference to FIG. 6A to FIG. 6D, a constant flow rate control scheme with a constraint is proposed in the present disclosure. In the scheme, based on whether the inflow rate of the pumping station is greater than or equal to, or less than or equal to, the flow rate for optimal energy consumption of the pumping station, a corresponding constraint indicating whether a target outflow rate of the pumping station is to be greater than or equal to, or less than or equal to, a flow rate for optimal energy consumption of the pumping station is determined. Then, a target outflow rate that meets the constraint can be set for constant flow rate control of the pumping station.

With the control scheme in the present disclosure, in a case that the inflow rate of the pumping station is less than the flow rate for optimal energy consumption of the pumping station, as shown in FIG. 6A, the constant flow rate control which is advantageous in section a and section b as shown in FIG. 6A (in which the constant flow rate control is superior to the constant speed control in terms of liquid level stability or energy consumption) can be applied. A disadvantage of the constant flow rate control in section c as shown in FIG. 6A can be avoided. That is, in a case as shown in FIG. 6A, a flow rate corresponding to an operating point for the constant flow rate control, that is, a flow rate setpoint (an example of the target outflow rate), can be constrained to be less than or equal to the flow rate for optimal energy consumption (OP). For example, the operating point $S_c$ in section c as shown in FIG. 6A can be translated to be on the OP line or on a left side of the OP line, so as to avoid the disadvantage of the constant flow rate control in section c.

Similarly, with the control scheme in the present disclosure, in a case that the inflow rate of the pumping station is greater than the flow rate for optimal energy consumption of the pumping station, as shown in FIG. 6C, the constant flow rate control which is advantageous in section c and section b as shown in FIG. 6C (in which the constant flow rate control is superior to the constant speed control in terms of liquid level stability or energy consumption) can be applied. A disadvantage of the constant flow rate control in section a as shown in FIG. 6C can be avoided. That is, in a case as shown in FIG. 6C, a flow rate corresponding to an operating point for the constant flow rate control, that is, a flow rate setpoint (an example of the target outflow rate), can be constrained to be greater than or equal to the flow rate for optimal energy consumption (OP). For example, the operating point $S_a$ in section a as shown in FIG. 6C can be translated to be on the OP line or on a right side of the OP line, so as to avoid the disadvantage of the constant flow rate control in section a.

In this way, the control scheme in the present disclosure is advantageous in energy consumption or liquid level stability, compared to the conventional constant speed control scheme, and can avoid operation of the constant flow rate control scheme in an unexpected section. It is to be noted that although various studies have been conducted from the perspective of energy consumption to propose the solution in the present disclosure, the solution can have different advantages in different operating sections, which is not limited to energy consumption.

Next, embodiments of a system/apparatus and method based on the improved control scheme are described.

2. Embodiments of Apparatus and Method in Control Systems

Figure 7:
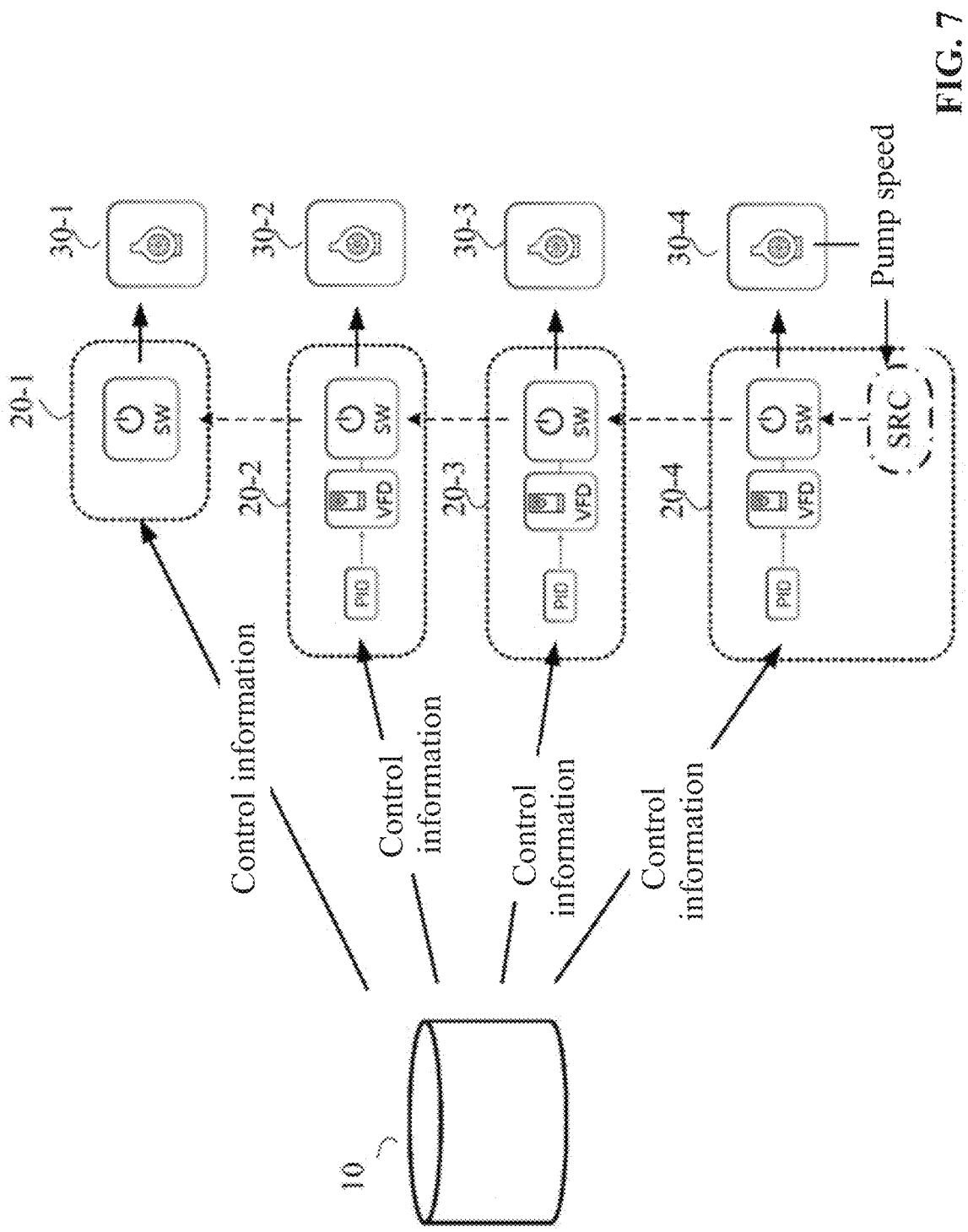
FIG. 7 is a schematic diagram illustrating an example of a control system to which the technique in the present disclosure can be applied.

FIG. 7 is a schematic diagram illustrating an example of a control system to which the technique in the present disclosure can be applied.

As shown in FIG. 7, a control system to which the technique in the present disclosure can be applied may include an electronic device 10 (which may be a gateway device such as an edge gateway or the like) and controllers 20-1 to 20-4 (which are collectively referred to as a controller 20 when it is not necessary to distinguish the controllers from each other).

The electronic device 10 may be configured to set, for a pumping station, a target outflow rate that meets a constraint, and provide control information determined based on the target outflow rate, for example, to the controllers 20-1 to 20-4. Each of the controllers 20-1 to 20-4 controls, based on the control information from electronic device 10, a pump speed and/or switch of a corresponding one of pumps 30-1 to 30-4 in the pumping station, so that an outflow rate of the pumping station (i.e., a sum of flow rates of the pumps) reaches and maintains at the target outflow rate of the pumping station.

To avoid unnecessary details blurring key points of the present disclosure, only devices closely related to the control scheme in the present disclosure are shown in the example in FIG. 7. The control system may include other devices and/or circuits. For example, although not shown in the figure, the control system may include sensors for various measurements, including but not limited to a rotation speed sensor for measuring a pump speed of one or more pumps (such as pump 30-4), a liquid level sensor for measuring a liquid level of the pumping station, a flow rate sensor for measuring an inflow rate or outflow rate of the pumping station, and the like. In addition, the control system may further include a programmable logic controller (PLC) for transmitting a control signal and/or data between the electronic device 10 and a pump, the controller and/or a sensor in a tank of the pumping station. The electronic device 10 can obtain various data required for processing, for example, from various sensors or controllers through the PLC. The data includes, but is not limited to, a liquid level, an inflow/outflow rate of the pumping station, a pump speed, a flow rate or switching state of each of the pumps, and the like, which are not described in detail here.

Next, taking the control system and various devices in FIG. 7 as an example, exemplary configuration and process (i.e., the control method according to the embodiments of the present disclosure) of the devices in the control system according to embodiments of the present disclosure are further described.

Next, taking the control system and various devices in FIG. 7 as an example, exemplary configuration and process (i.e., the control method according to the embodiments of the present disclosure) of the devices in the control system according to embodiments of the present disclosure are further described.

Figure 8:
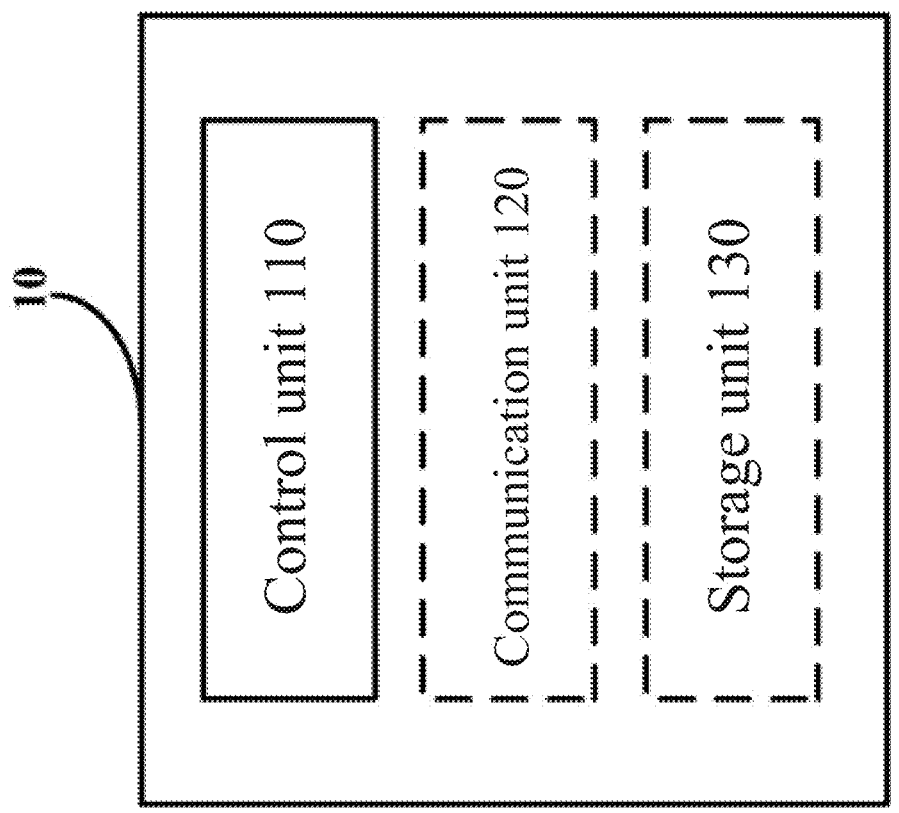
FIG. 8 is a block diagram showing a configuration example of an electronic device in a control system according to an embodiment of the present disclosure.

FIG. 8 is a block diagram showing a configuration example of an electronic device 10 in a control system according to an embodiment of the present disclosure.

As shown in FIG. 8, the electronic device 10 may include a control unit 110. Optionally, the electronic device 10 may further include, for example, a communication unit 120 for sending information to or receiving information from another device, and a storage unit 130 for storing various data, programs, and information.

Here, each unit of electronic device 10 may be included in processing circuitry. It should be noted that the electronic device 10 may include either a single processing circuit or multiple processing circuits. Furthermore, the processing circuitry may include various discrete functional units for performing various different functions and/or operations. It should be noted that the functional units may be physical entities or logical entities, and units with different names may be implemented by a same physical entity. The electronic device 10 may be a gateway device, such as an edge gateway, but is not limited thereto.

Figure 9:
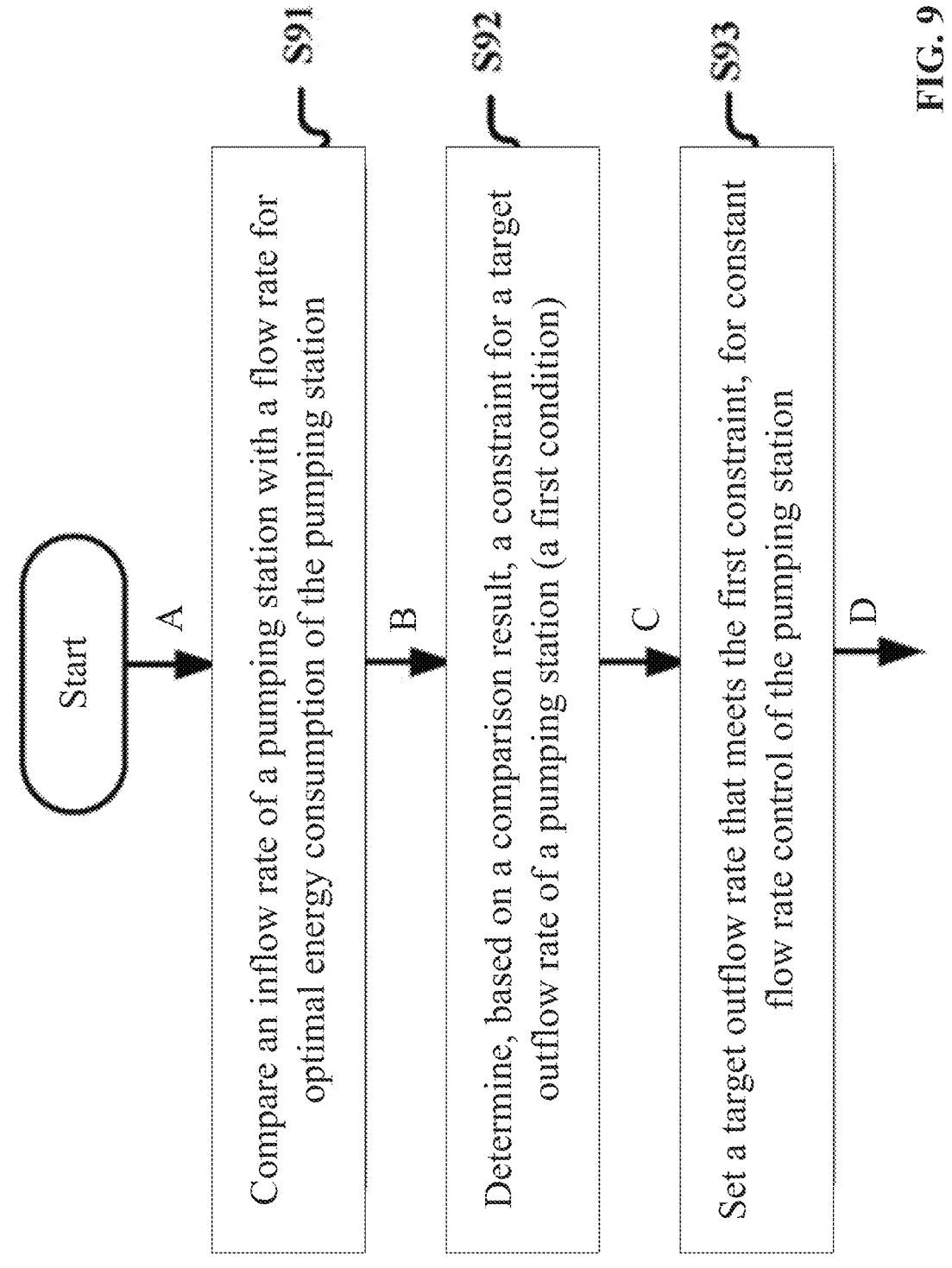
FIG. 9 is a flowchart of an exemplary process of a control method according to a first embodiment of the present disclosure.

According to an embodiment of the present disclosure, the control unit 110 of the electronic device 10 may be configured to implement the control method according to a first embodiment of the present disclosure, as shown in FIG. 9. The method is applicable to a pumping station including one or more pumps. The method includes: step S91, comparing an inflow rate of the pumping station with a flow rate for optimal energy consumption of the pumping station; step S92, determining, based on whether the inflow rate of the pumping station is greater than or equal to, or less than or equal to, the flow rate for optimal energy consumption of the pumping station, a corresponding constraint that indicates whether a target outflow rate of the pumping station is to be greater than or equal to, or less than or equal to, the flow rate for optimal energy consumption of the pumping station; and step S93, setting a target outflow rate that meets the constraint, for constant flow rate control of the pumping station.

Although not shown in FIG. 9, the control unit 110 of the electronic device 10 can generate control information based on the set target outflow rate, and send the control information to the controller 20 through the communication unit 120. Thereby, the controller 20 may control a pump speed and/or switch of a corresponding pump based on the control information, so as to perform constant flow rate control of the pumping station. Details of the controller 20 are described later in a section about controllers.

Next, examples of various related processes performed by the control unit 110 of the electronic device 10 in executing the method according to the first embodiment are described with reference to FIG. 9 and in conjunction with subsequent accompanying drawings. It should be noted that one or more reference signs such as A to D, C1, C00, C01, are added to some flowcharts, including FIG. 9, to indicate operational nodes in the process and relationships between different flowcharts, which would not be specifically explained in the following description.

(Process Related to Flow Rate Comparison)

Process of Obtaining Inflow Rate

As an example, the control unit 110 of the electronic device 10 may obtain the inflow rate of the pumping station for step S91, for example, based on sensor data received from an inflow rate sensor in a tank of the pumping station through the communication unit 120.

Alternatively, without the use of an inflow flow sensor, the control unit 110 can obtain the inflow rate of the pumping station for step S91 through calculation based on, for example, other data (such as an area of the tank, a liquid level, and an outflow rate) pre-stored in a storage unit 130 or obtained through the communication unit 120.

More specifically, assuming that a reservoir in front of the pumping station has a cylindrical or rectangular body, a liquid volume V(t) may be calculated by multiplying an area A by a height, i.e., a liquid level h(t):

$$V(t) = A \cdot h(t) \tag{11}$$

Since a volume change of liquid in the tank per unit time is equal to a difference between an inflow rate $q_{in}(t)$ and an outflow rate $q_{out}(t)$, the inflow rate $q_{in}(t)$ may be estimated as:

$$q_{in}(t) = \frac{V(t) - V(t - \Delta t)}{\Delta t} + q_{out}(t) \tag{12}$$

In equation (12), $\Delta T$ represents an interval for sampling time instants.

In a case that the tank has a large area, estimation of the inflow rate is sensitive to a noise in measurement of the liquid level. To avoid impact of the noise, a moving average filter may be applied to calculate an estimation $\hat{q}_{in}(t)$ of the inflow rate based on values of the inflow rate at the latest N sampling time instants (N is a natural number greater than 1) through the following equation:

$$\hat{q}_{in}(t) = \frac{1}{N}(q_{in}(t) + q_{in}(t - \Delta t) + \ldots + q_{in}(t - (N - 1)\Delta t)) \tag{13}$$

Process of Obtaining the Flow Rate for Optimal Energy Consumption

The control unit 110 of the electronic device 10 may obtain the flow rate for optimal energy consumption of the pumping station for step S91 through various appropriate processes.

Figure 10:
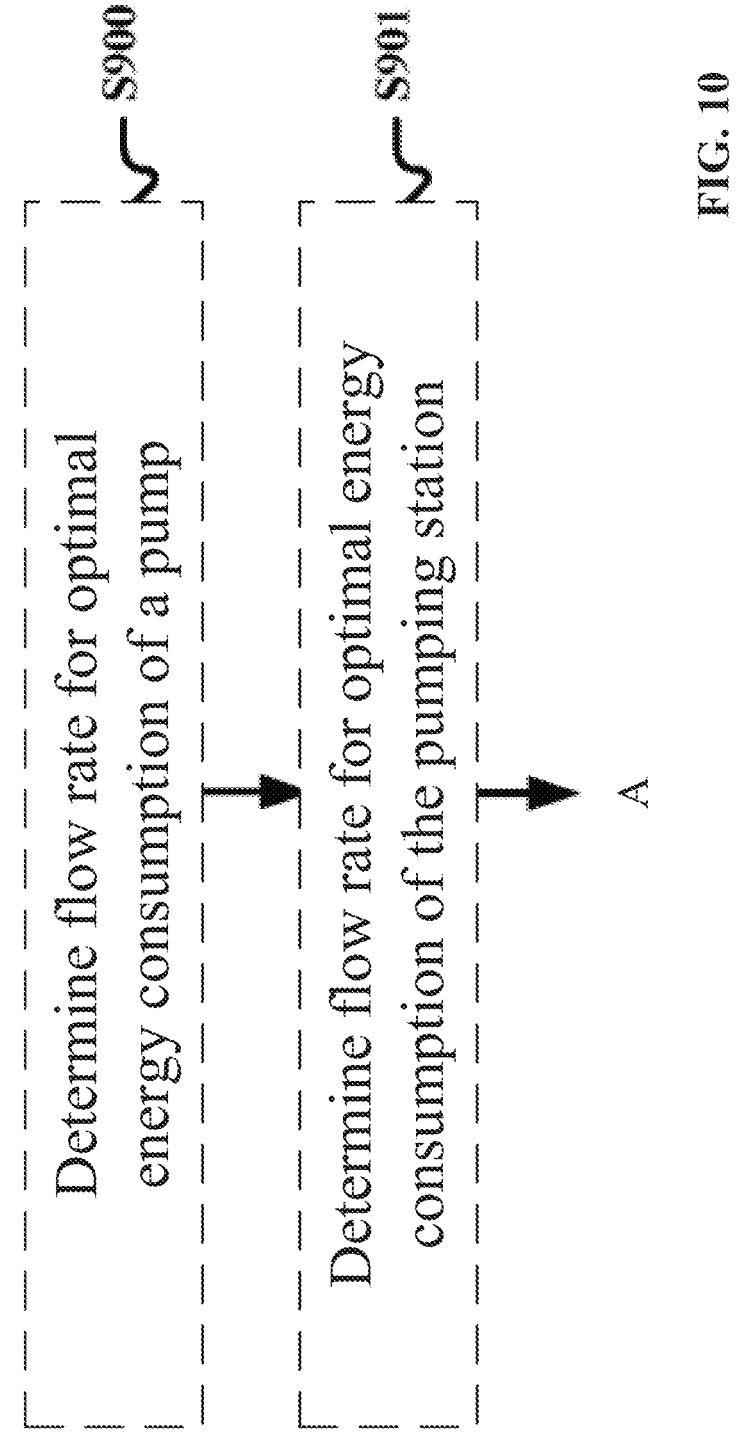
FIG. 10 is a flowchart of an exemplary process of obtaining a flow rate for optimal energy consumption of a pumping station.

FIG. 10 shows an exemplary process of obtaining the flow rate for optimal energy consumption of the pumping station by the control unit 110. The process includes: step S900, determining a flow rate for optimal energy consumption of a pump in the pumping station; and step S901, determining the flow rate for optimal energy consumption of the pumping station based on the flow rates for optimal energy consumption of the pumps. The above process may be a part of the control method in this embodiment and performed before step S91 shown in FIG. 9 (before an operating node A).

In an example, in step S900, the control unit 110 may determine, for each of the pumps, a flow rate at a best efficiency point (BEP) for the pump as the flow rate for optimal energy consumption of the pump. The control unit 110 may determine the BEP flow rate through various existing ways, which are not described in detail here.

In an alternative example, in step S900, the storage unit 130 may pre store a pump speed model and a flow rate model of each pump (such as each of pumps 30-1 to 30-4 in FIG. 7) in the pumping station, as those models described in the "Related Models" section of the "Overview". The speed model of the pump is to estimate a pump speed for optimal energy consumption based on a liquid level. The flow rate model of the pump is to estimate a flow rate based on a liquid level and a pump speed. The speed model and the flow rate model of the pump are each obtained through machine learning using corresponding historical data related to the pump, which is not repeated here. In this case, in step S900, the control unit 110 may determine the flow rate for optimal energy consumption of each pump by: determining, for each of the pumps, a pump speed for optimal energy consumption of the pump at a current liquid level by using a speed model for the pump; and determining, for each of the pumps, the flow rate for optimal energy consumption of the pump by using a flow rate model for the pump based on the current liquid level and the pump speed for optimal energy consumption of the pump.

In step S901, the control unit 110 may then determine the flow rate for optimal energy consumption of the pumping station based on the flow rates for optimal energy consumption of the pumps obtained in step S900. For example, the control unit 110 may determine a sum of the flow rates for optimal energy consumption of running ones of the pumps (pumps 30-1 to 30-4) in the pumping station as the flow rate for optimal energy consumption of the pumping station.

After the inflow rate of the pumping station and the flow rate for optimal energy consumption of the pumping station are obtained, for example, in the above manner, the control unit 110 may compare the inflow rate with the flow rate for optimal energy consumption, as in step S91 of FIG. 9.

(Process of Determining First Constraint)

As shown in FIG. 9, after the comparison in step S91, the control unit 110 may perform a process of determining a first constraint in step S92. That is, the control unit 110 may determine, based on a comparison result from step S91 of whether the inflow rate is greater than or equal to, or less than or equal to, the flow rate for optimal energy consumption of the pumping station, a corresponding constraint (also referred to as a first constraint herein) that indicates whether a target outflow rate of the pumping station is to be greater than or equal to, or less than or equal to, the flow rate for optimal energy consumption of the pumping station.

For example, in a case that the comparison result in step S91 indicates that the inflow rate is less than or equal to the flow rate for optimal energy consumption of the pumping station, as shown in FIG. 6A, the first constraint determined by the control unit 110 indicates that the target outflow rate of the pumping station is to be less than or equal to the flow rate for optimal energy consumption. Hence, an unexpected operation in section a is avoided. In a case that the comparison result in step S91 indicates that the inflow rate is greater than or equal to the flow rate for optimal energy consumption of the pumping station, as shown in FIG. 6C, the first constraint determined by the control unit 110 indicates that the target outflow rate of the pumping station is to be greater than or equal to the flow rate for optimal energy consumption. Hence, an unexpected operation in section c is avoided.

(Process of Setting Target Outflow Rate)

As shown in FIG. 9, after the first constraint is determined in step S92, the control unit 110 may perform a process of setting the target outflow rate in step S93. That is, the control unit 110 sets a target outflow rate that meets the first constraint, for constant flow rate control of the pumping station.

Figure 11:
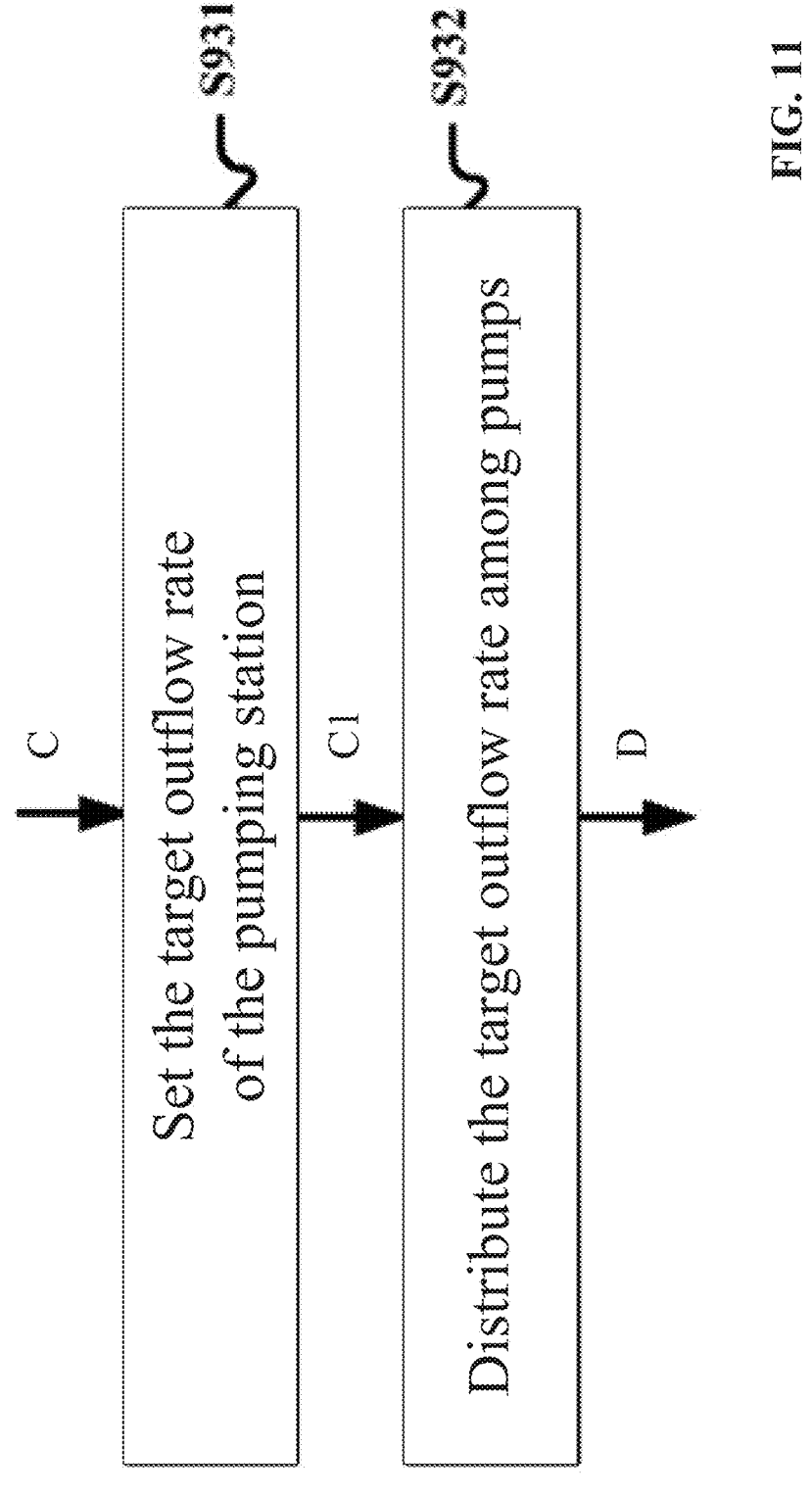
FIG. 11 is a flowchart of an exemplary process of setting a target outflow rate satisfying a constraint.

FIG. 11 is a flowchart showing an exemplary process of setting a target outflow rate that meets the first constraint. In FIG. 11, an example of the process by the control unit 110 in step S93 is shown. As shown in FIG. 11, the process of setting the target outflow rate by the control unit 110 may include: step S931, setting the target outflow rate of the pumping station; and step S932, distributing the set target outflow rate appropriately among the pumps in the pumping station. Exemplary processes in the steps are described below.

A first process for setting the target outflow rate of the pumping station and a second process involving an improvement based on the first process are described first.

First Process of Setting Target Outflow Rate of Pumping Station

Figure 12:
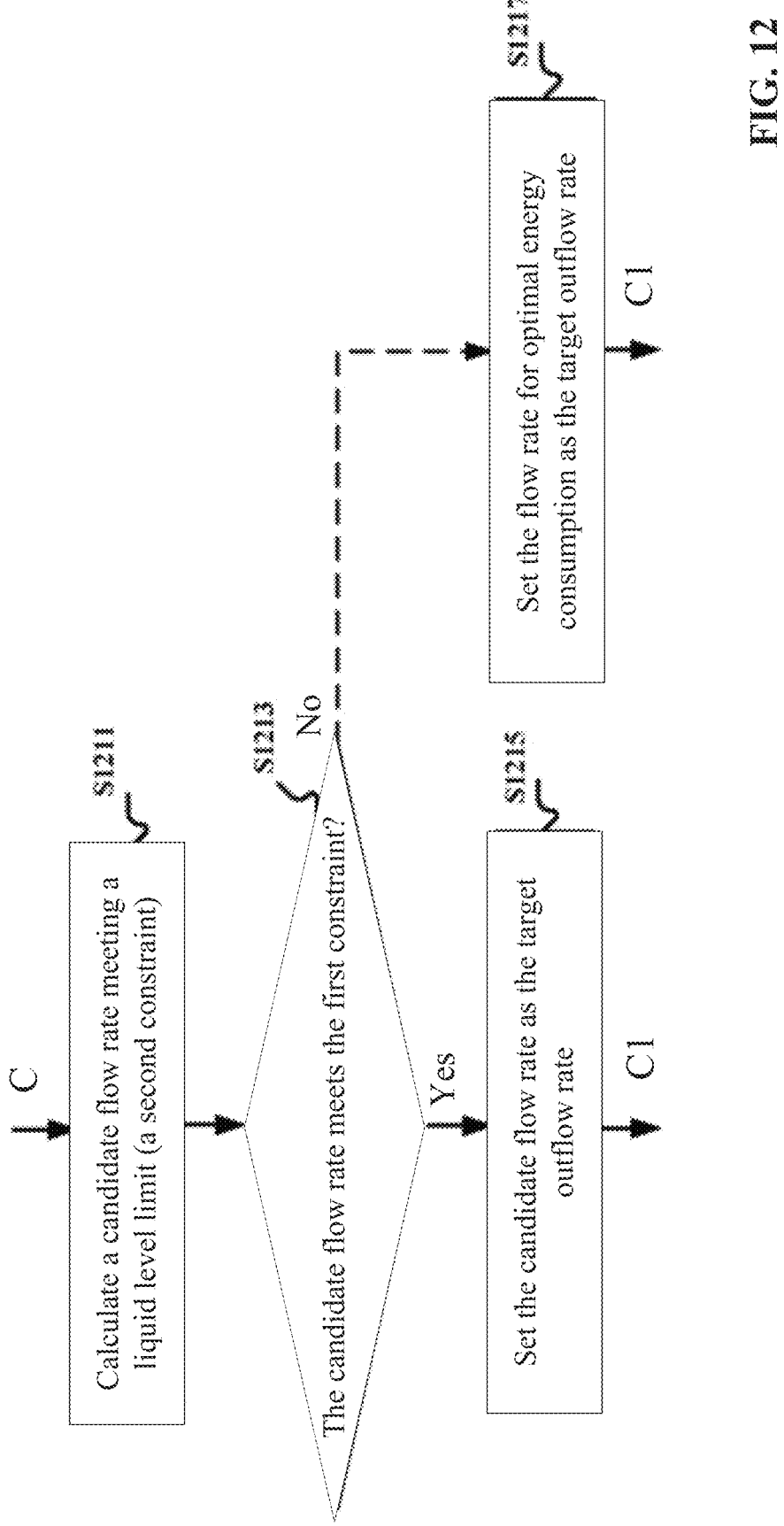
FIG. 12 is a flowchart of an exemplary process of setting a target outflow rate of a pumping station.

FIG. 12 shows a first process of setting a target outflow rate of a pumping station by the control unit 110.

As shown in FIG. 12, this process may include: step S1211, calculating a candidate flow rate that meets a pre-set liquid level limit (also referred to as a second constraint hereinafter) based on a current inflow rate and a current liquid level of the pumping station; step S1213, determining whether the candidate flow rate meets the first constraint determined previously (which first constraint indicates whether the candidate flow rate is to be greater than or equal to, or less than or equal to, the flow rate for optimal energy consumption); and step S1215, setting the candidate flow rate as the target outflow rate of the pumping station, in a case that the candidate flow rate meets the first constraint. This process may further include an optional step S1217 of setting the flow rate for optimal energy consumption of the pumping station as the target outflow rate of the pumping station, in a case that the candidate flow rate does not meet the first constraint.

As an example, the control unit 110 may calculate a candidate value $r_q(t)$ of the outflow rate of the pumping station in step S1211 by using the equation (9) as described above:

$$r_q(t) = C * (r_h - h(t)) + q_{in}(t) \qquad (9)$$

In equation (9), t represents time, C represents a control coefficient as a negative constant (as a gain factor for proportional control), $r_h$ represents a target liquid level of the pumping station (which may be pre-set, for example), h(t) represents a real-time liquid level of the pumping station, and $q_{in}(t)$ represents a real-time inflow rate of the pumping station. The candidate flow rate calculated in this way meets the constraint for the liquid level (also referred to as the liquid level constraint or liquid level limit) imposed by the target liquid level of the pumping station. Thereby, the flow rate is controlled based on a difference between the current liquid level of the pumping station and the target liquid level of the pumping station, so that the liquid level of the pumping station is controlled to close to the target liquid level.

The control unit 110 may determine, subsequently in step S1213, whether the candidate flow rate $r_q(t)$ meets the first constraint indicating that it is to be greater than or equal to, or less than or equal to, the OP. The process proceeds to step S1215 or S1217 based on a determination result, to set the target outflow rate, which is not further described here.

With the process shown in FIG. 12, the control unit 110 can ensure that a finally-set target outflow rate meets the first constraint. Thereby, advantages of different operating sections described with reference to FIG. 6A and FIG. 6C are achieved.

Next, a first example and a second example of the first process shown in FIG. 12 under different inflow rates are described in conjunction with FIG. 13A to FIG. 13C and FIG. 14A to FIG. 14C. It is to be noted that, in order to simplify the description, it is assumed in the first example and the second example that only one pump is currently running in the pumping station. Therefore, the flow rate of the pump is the outflow rate of the pumping station, and the flow rate setpoint (the target outflow rate) and operating point for the constant flow rate control of the pump can be discussed based on the SEC response surface of the pump. First Example of First Process (in a case of $q_{in} \leq OP$)

Figure 13A:
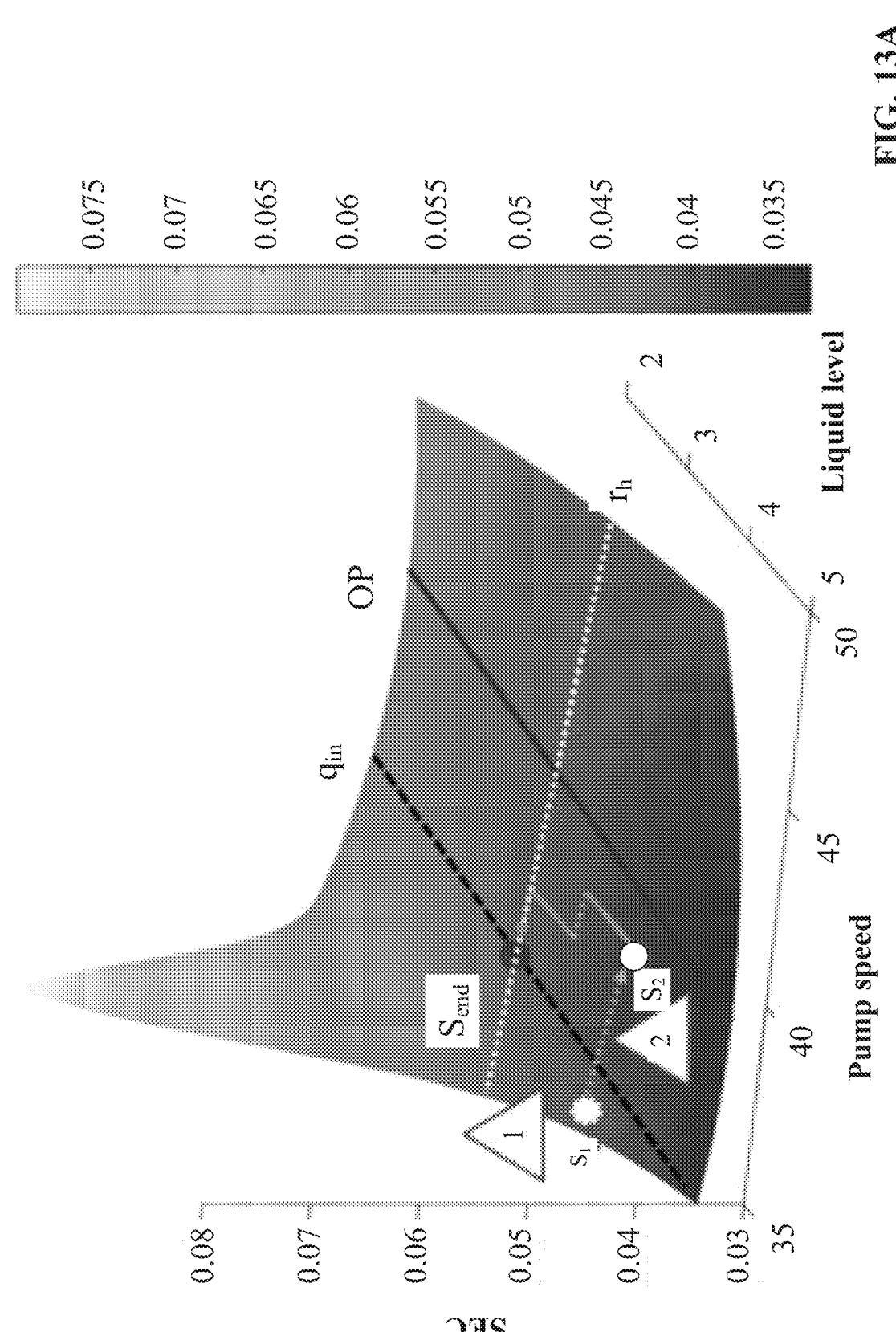
FIGS. 13A-13C are schematic diagrams illustrating examples of determining a target outflow rate in a case that an inflow rate is less than or equal to a flow rate for optimal energy consumption.
Figure 13B:
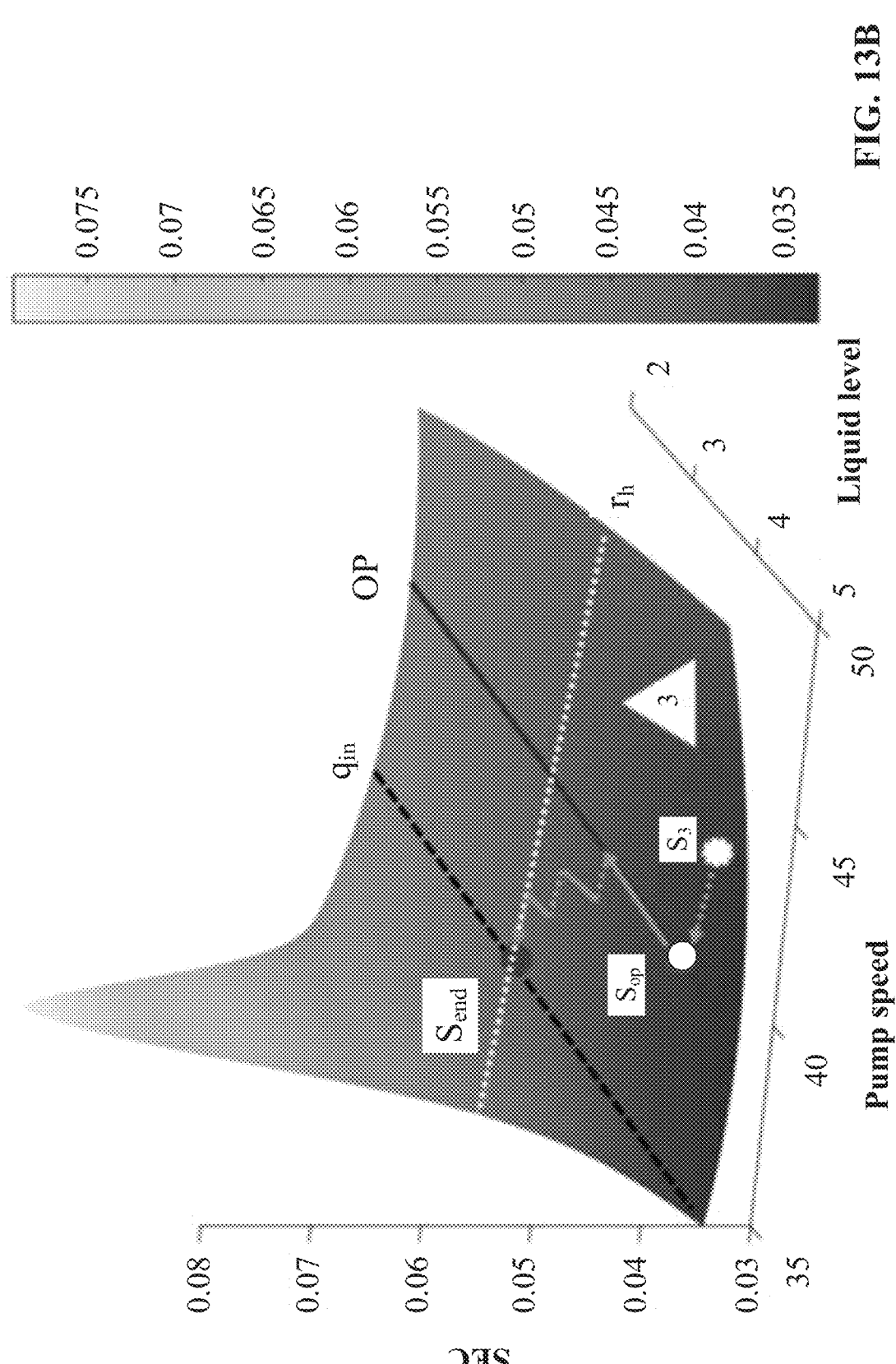
Figure 13C:
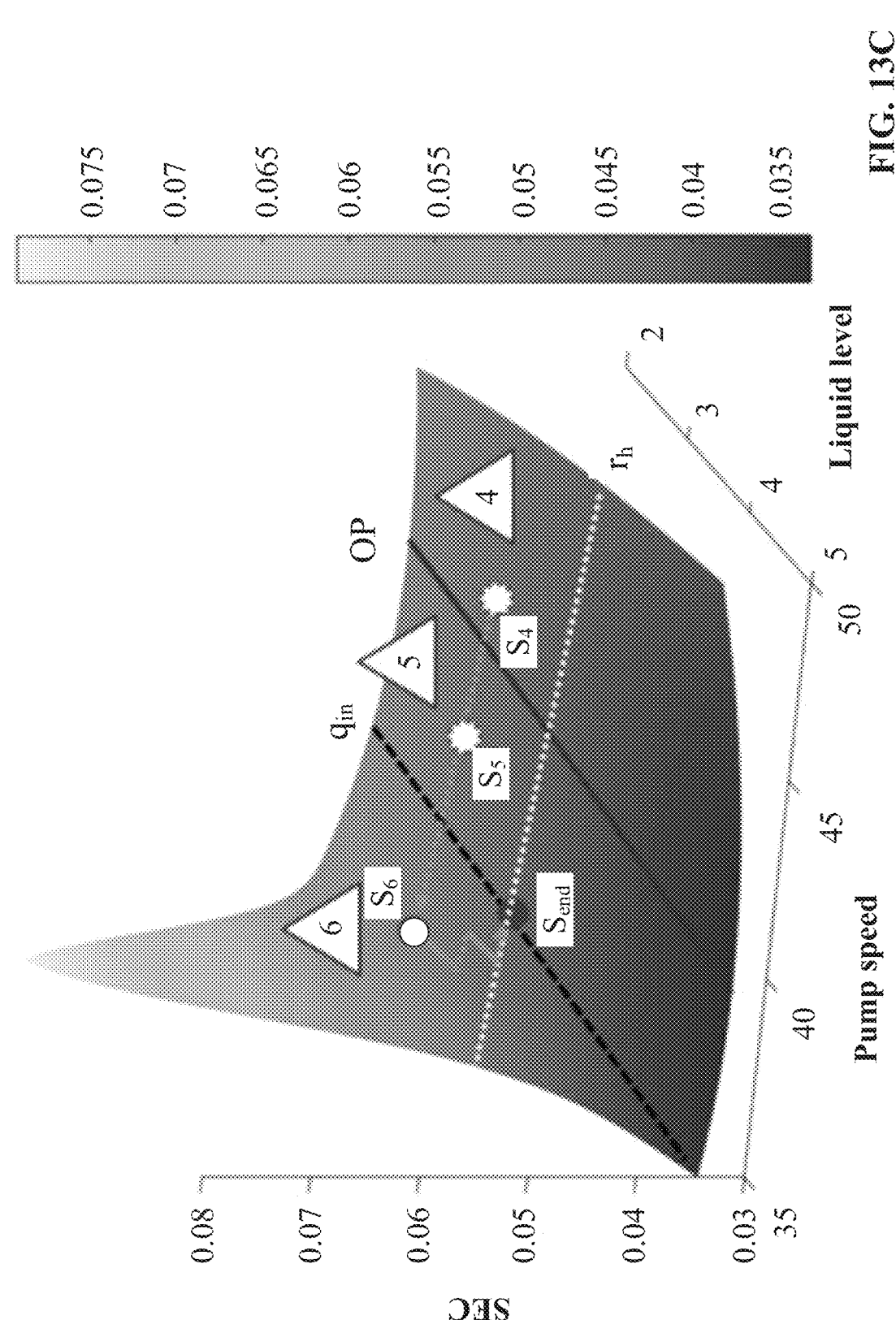

Reference is made to FIG. 13A to FIG. 13C, which are diagrams for explaining a first example of the process in FIG. 12 in a case that the inflow rate $q_{in}$ is less than or equal to the flow rate for optimal energy consumption OP. In the example, as $q_{in} \leq OP$, the first constraint for the target outflow rate of the pumping station is to be less than or equal to OP.

In FIG. 13A to FIG. 13C, a SEC response surface is partitioned into six regions, namely a first region (region 1) to a sixth region (region 6), based on an inflow rate $q_{in}$, a flow rate for optimal energy consumption OP, and a target liquid level $r_h$. Each of the regions belongs to one of the four quadrants determined based on $q_{in}$ and $r_h$, as shown in FIG. 5A to FIG. 5D, and one of the three sections determined based on $q_{in}$ and OP, as shown in FIG. 6A. In FIG. 13A to FIG. 13C, operating paths to the final target operating point $S_{end}$ determined based on the inflow flow $q_{in}$ and the target liquid level $r_h$ in cases that the current operating points $S_1$ to $S_6$ are in regions 1 to 6, respectively, are shown.

Reference is made to FIG. 13A. In a case that the current operating point $S_1$ is in a first region belonging to the third quadrant, an operating point $S_2$ corresponding to a candidate flow rate calculated by the control unit based on equation (9) is in a second region (region 2) which belongs to the fourth quadrant and indicates a flow rate less than OP. In this case, the first constraint of being less than or equal to OP is met. Therefore, the candidate flow rate may be used as the flow rate setpoint. Starting from $S_2$, the final target operating point $S_{end}$ is approached under the constant flow rate control through a zigzag path following new flow rate setpoints (new candidate flow rates less than or equal to OP) that are obtained, for example, from a regular update and/or calculation. In a case that the current operating point is $S_2$, which is in a second region within the fourth quadrant, an operating point corresponding to a candidate flow rate calculated by the control unit 110 based on equation (9) is also in the second region, and meets the first constraint of being less than or equal to OP. Then, the final target operating point $S_{end}$ can be approached through a zigzag path following new flow rate setpoints obtained, for example, from a regular update and/or calculation.

Reference is made to FIG. 13B. In a case that the current operating point $S_3$ is in a third region (region 3) belonging to the fourth quadrant, an operating point corresponding to the candidate flow rate calculated by the control unit 110 based on equation (9) may also be in the third region, so that the first constraint of being less than or equal to OP is not met. In this case, the control unit 110 may set the flow rate for optimal energy consumption OP of the pumping station as the target outflow rate of the pumping station, that is, shift or translate the operating point $S_3$ to a point $S_{OP}$ on the OP line to obtain a corresponding flow rate setpoint. Then, an operating point corresponding to a candidate flow rate calculated by the control unit 110 based on equation (9) falls within the second region belonging to the fourth quadrant, and meets the first constraint of being less than or equal to OP. Then, the final target operating point $S_{end}$ can be approached through a zigzag path following new flow rate setpoints obtained, for example, from a regular update and/or calculation.

Reference is made to FIG. 13C. In a case that the current operating point $S_4$ or $S_5$ is in a fourth or fifth region (region 4 or region 5) belonging to the first quadrant, correspondingly, an operating point $S_6$ corresponding to a candidate flow rate calculated by the control unit based on equation (9) is in a sixth region which belongs to the second quadrant and indicates a flow rate less than $q_{in}$. In this case, the first constraint of being less than or equal to OP is met. Therefore, the candidate flow rate may be used as the flow rate setpoint. Starting from $S_6$, the final target operating point $S_{end}$ is approached through a zigzag path following new flow rate setpoints (new candidate flow rates less than or equal to OP) that are obtained, for example, from a regular update and/or calculation. In a case that the current operating point is $S_6$, which is in the sixth region belonging to the second quadrant, an operating point corresponding to a candidate flow rate calculated by the control unit 110 based on equation (9) is also in the sixth region, and meets the first constraint of being less than or equal to OP. Then, the final target operating point $S_{end}$ can be approached through a zigzag path following new flow rate setpoints obtained, for example, from a regular update and/or calculation.

As shown in the examples of FIG. 13A to FIG. 13C, through the process as shown in FIG. 12, the control unit 110 can limit the operating point corresponding to the flow rate setpoint to the second region or the sixth region, i.e., section a or section b in FIG. 6A, in a case that the inflow rate is less than or equal to the flow rate for optimal energy consumption. Thereby, it is conducive to realizing constant flow rate control in these mentioned sections that is superior to the constant speed control in terms of liquid level stability or energy consumption.
Second Example of First Process (in a Case of $q_{in} > OP$)

Figure 14A:
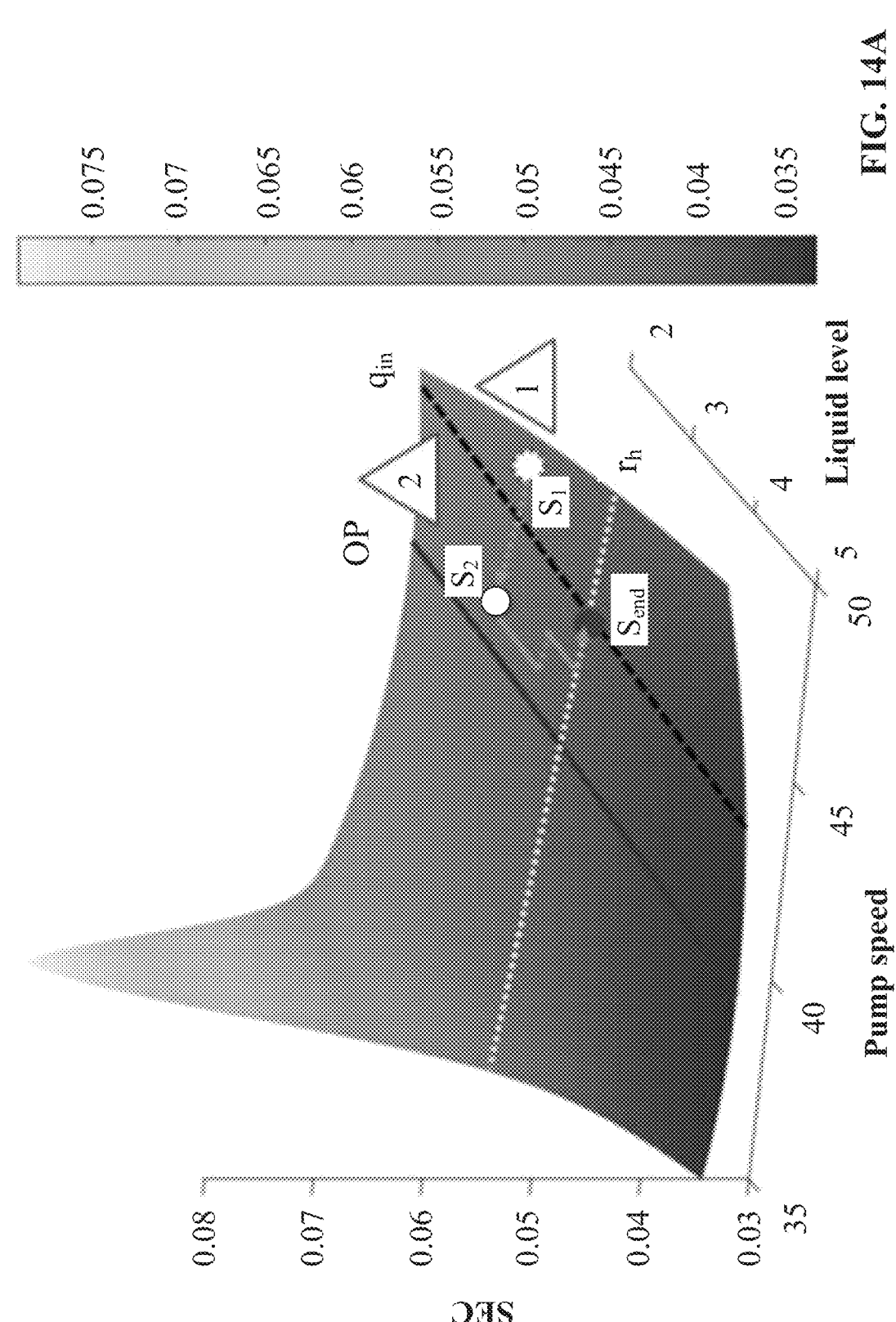
FIGS. 14A-14C are schematic diagrams illustrating examples of determining a target outflow rate in a case that an inflow rate is greater than or equal to a flow rate for optimal energy consumption.
Figure 14B:
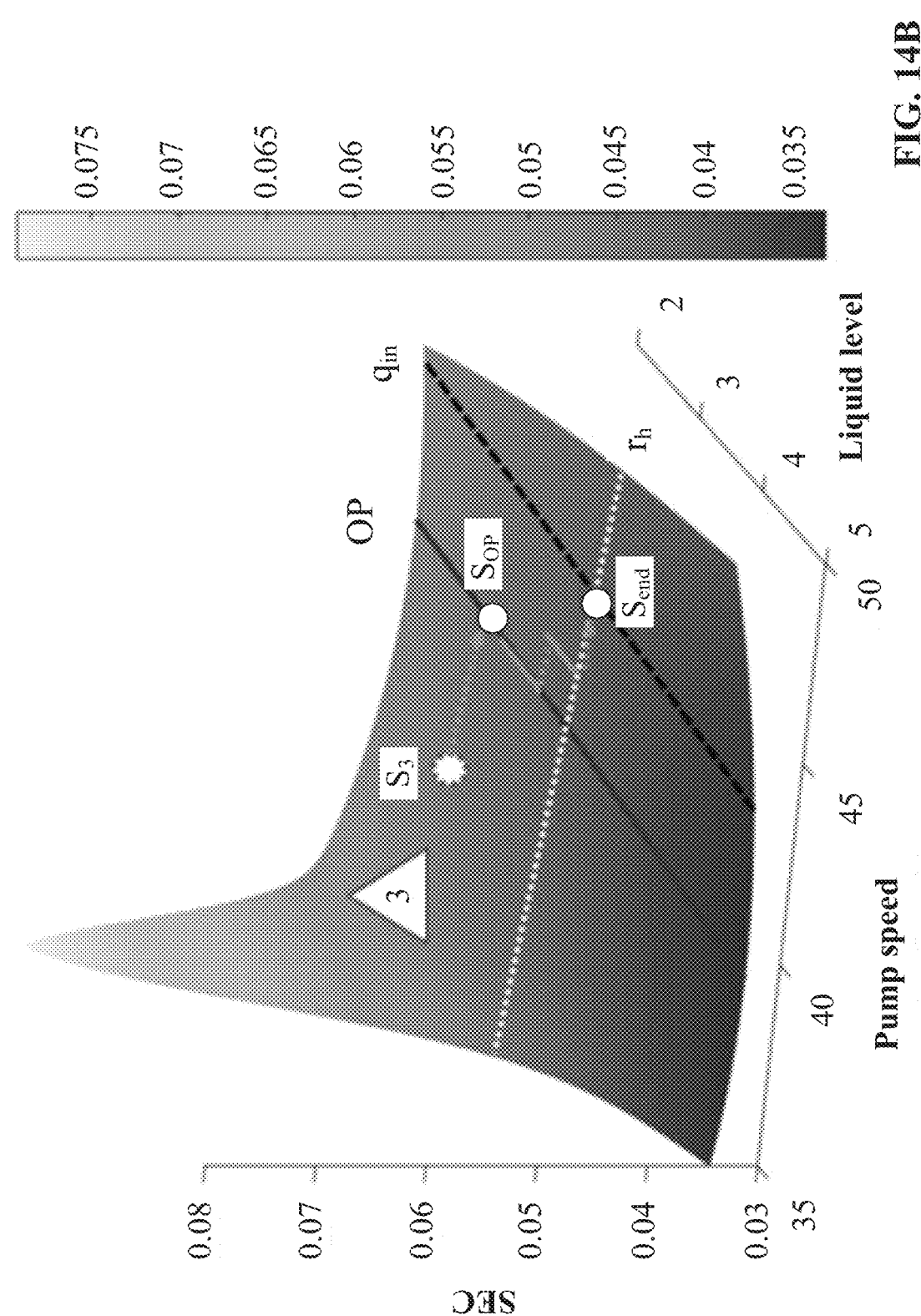
Figure 14C:
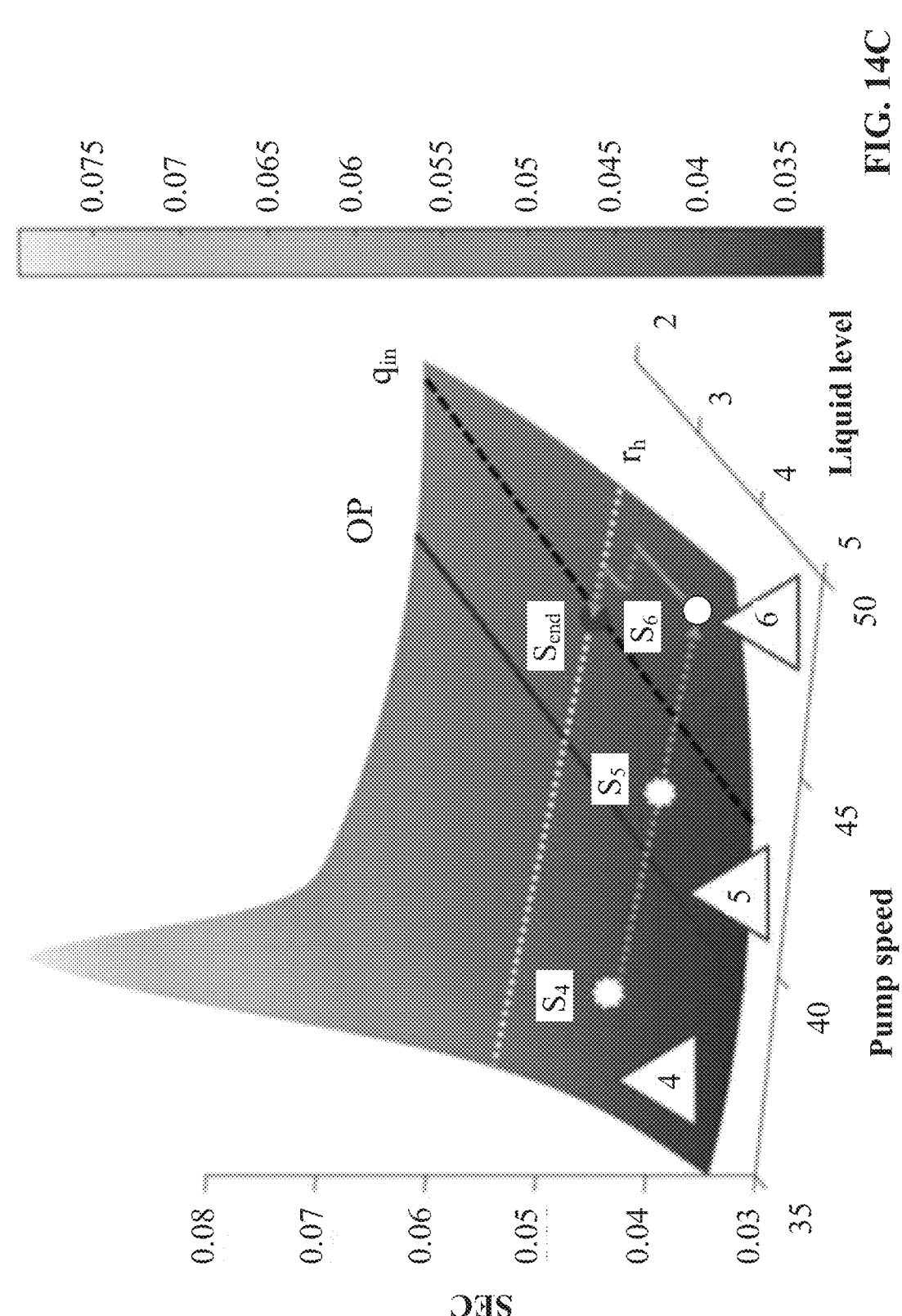

Reference is made to FIG. 14A to FIG. 14C, which are diagrams for explaining a second example of the process in FIG. 12 in a case that the inflow rate $q_{in}$ is greater than or equal to the flow rate for optimal energy consumption OP. In the example, as $q_{in} \geq OP$, the first constraint for the target outflow rate of the pumping station is to be greater than or equal to OP.

Similar to FIG. 13A to FIG. 13C, in FIG. 14A to FIG. 14C, a SEC response surface is partitioned into six regions, namely a first region (region 1) to a sixth region (region 6), based on an inflow rate $q_{in}$, a flow rate for optimal energy consumption OP, and a target liquid level $r_h$. Each of the regions belongs to one of the four quadrants determined based on $q_{in}$ and $r_h$, as shown in FIG. 5A to FIG. 5D, and one of the three sections determined based on $q_{in}$ and OP, as shown in FIG. 6C. In FIG. 14A to FIG. 14C, operation paths to the final target operating point $S_{end}$ determined based on the inflow rate $q_{in}$ and the target liquid level $r_h$ in cases that the current operating points $S_1$ to $S_c$ are in regions 1 to 6, respectively, are shown.

Reference is made to FIG. 14A. In a case that the current operating point $S_1$ is in a first region belonging to the first quadrant, an operating point $S_2$ corresponding to a candidate flow rate calculated by the control unit based on equation (9) is in a second region (region 2) which belongs to the second quadrant and indicates a flow rate larger than OP. In this case, the first constraint of being greater than or equal to OP is met. Therefore, the candidate flow rate may be used as the flow rate setpoint. Starting from $S_2$, the final target operating point $S_{end}$ is approached under the constant flow rate control through a zigzag path following new flow rate setpoints (new candidate flow rates greater than or equal to OP) that are obtained, for example, from a regular update and/or calculation. In a case that the current operating point is $S_2$, which is in a second region within the second quadrant, an operating point corresponding to a candidate flow rate calculated by the control unit 110 based on equation (9) is also in the second region, and meets the first constraint of being greater than or equal to OP. Then, the final target operating point $S_{end}$ can be approached through a zigzag path following new flow rate setpoints obtained, for example, from a regular update and/or calculation.

Reference is made to FIG. 14B. In a case that the current operating point $S_3$ is in a third region (region 3) belonging to the second quadrant, an operating point corresponding to the candidate flow rate calculated by the control unit 110 based on equation (9) may also be in third region, so that the first constraint of being greater than or equal to OP is not met. In this case, the control unit 110 may set the flow rate for optimal energy consumption OP of the pumping station as the target outflow rate of the pumping station, that is, shift or translate the operating point $S_3$ to a point $S_{OP}$ on the OP line to obtain a corresponding flow rate setpoint. Then, an operating point corresponding to a candidate flow rate calculated by the control unit 110 based on equation (9) falls within the second region belonging to the second quadrant, and meets the first constraint of being greater than or equal to OP. Then, the final target operating point $S_{end}$ can be approached through a zigzag path following new flow rate setpoints obtained, for example, from a regular update and/or calculation.

Reference is made to FIG. 14C. In a case that the current operating point $S_4$ or $S_5$ is in a fourth or fifth region (region 4 or region 5) belonging to the third quadrant, correspondingly, an operating point $S_6$ corresponding to a candidate flow rate calculated by the control unit based on equation (9) is in a sixth region which belongs to the fourth quadrant and indicates a flow rate greater than $q_{in}$. In this case, the first constraint of being greater than or equal to OP is met. Therefore, the candidate flow rate may be used as the flow rate setpoint. Starting from $S_6$, the final target operating point $S_{end}$ is approached through a zigzag path following new flow rate setpoints (new candidate flow rates greater than or equal to OP) that are obtained, for example, from a regular update and/or calculation. In a case that the current operating point is $S_6$, which is in the sixth region belonging to the fourth quadrant, an operating point corresponding to a candidate flow rate calculated by the control unit 110 based on equation (9) is also in the sixth region, and meets the first constraint of being greater than or equal to OP. Then, the final target operating point $S_{end}$ can be approached through a zigzag path following new flow rate setpoints obtained, for example, from a regular update and/or calculation.

As shown in the examples of FIG. 14A to FIG. 14C, through the process as shown in FIG. 12, the control unit 110 can limit the operating point corresponding to the flow rate setpoint to the second region or the sixth region, i.e., section b or section c in FIG. 6C, in a case that the inflow rate is greater than or equal to the flow rate for optimal energy consumption. Thereby, it is conducive to realizing constant flow rate control in the mentioned sections that is superior to the constant speed control in terms of liquid level stability or energy consumption.

Second Process of Setting Target Outflow Rate of Pumping Station

Figure 15:
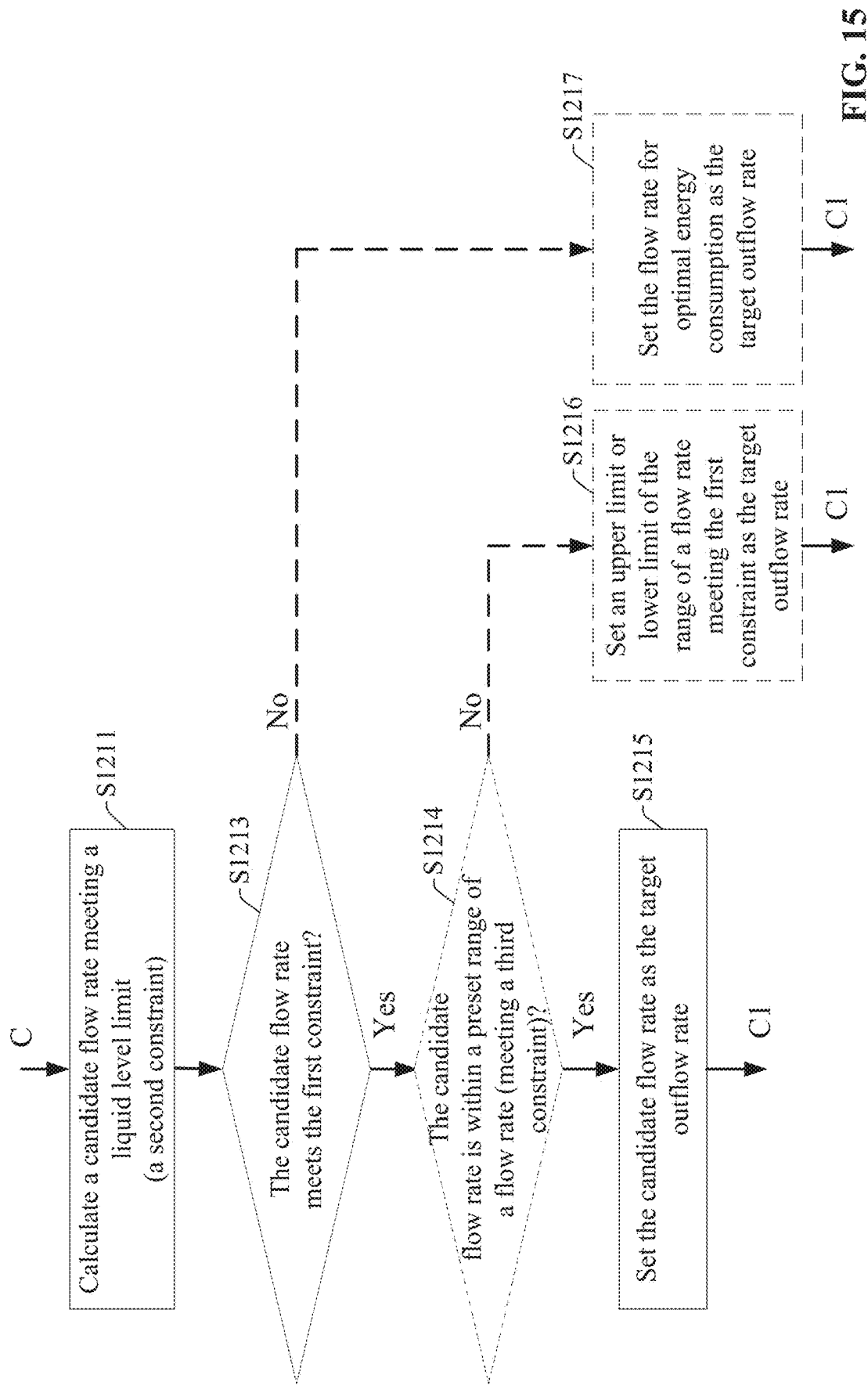
FIG. 15 is a flowchart of another exemplary process of setting a target outflow rate of a pumping station.

As an improvement of the first process shown in FIG. 12, FIG. 15 shows a second process of setting, by the control unit 110, the target outflow rate of the pumping station.

In addition to steps S1211, S1213, S1215, and S1217 as those in FIG. 12, the exemplary process in FIG. 15 further includes optional steps S1214 and S1216.

Specifically, in the exemplary process shown in FIG. 15, on determining in step S1213 that the candidate flow rate calculated based on the liquid level limit (second constraint) meets the first constraint, the control unit 110 proceeds to perform step S1214 of determining whether the candidate flow rate is within a pre-set range of a flow rate (third constraint).

On determining in step S1214 that the candidate flow rate is within the pre-set range of a flow rate, i.e. meets the third constraint, the control unit 110 proceeds to perform step S1215 of setting the candidate flow rate, which meets the first constraint as well as the second constraint and the third constraint, as the target outflow rate of the pumping station.

On determining in step S1214 that the candidate flow rate is not within the pre-set range of a flow rate, that is, does not meet the third constraint, the control unit 110 proceeds to step S1216 of setting an upper limit or lower limit of the range of a flow rate that meets the first constraint as the target outflow rate of the pumping station.

Here, the range of a flow rate corresponding to the third constraint may be a range of an outflow rate of the pumping station pre-set by an operator of the pumping station for safety and other purposes, and the range may be set around the flow rate for optimal energy consumption of the pumping station. Therefore, one of the upper limit and the lower limit of the range of a flow rate necessarily meets the first constraint, regardless of whether the first constraint indicates to be greater than or equal to the flow rate for optimal energy consumption, or to be less than or equal to the flow rate for optimal energy consumption. In this way, the control unit 110 can set a target outflow rate that meets both the first constraint and the third constraint, thereby satisfying a safety requirement of the pumping station set by the operator.

Hereinabove examples of the process of setting, by the control unit 110, the target outflow rate of the pumping station based on the first constraint and optionally the second constraint and the third constraint are described in conjunction with FIGS. 12 to 15. On the basis of the above description, those skilled in the art can implement the process of setting the target outflow rate of the pumping station through various appropriate manners, without being limited to the specific steps as shown in FIG. 12 and FIG. 15.

Figure 16A:
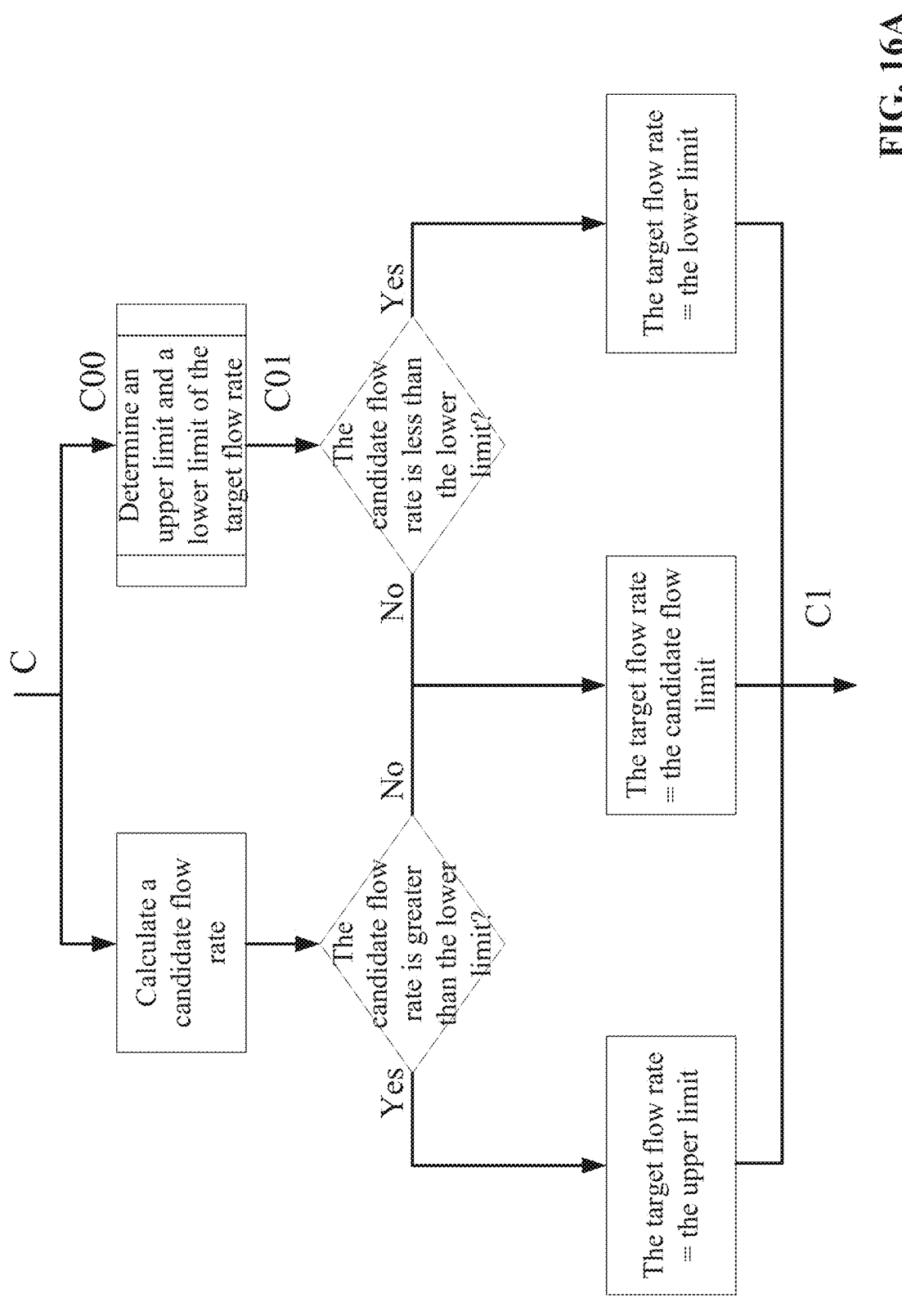
FIGS. 16A and 16B are flowcharts of an exemplary procedure of setting a target outflow rate of a pumping station.
Figure 16B:
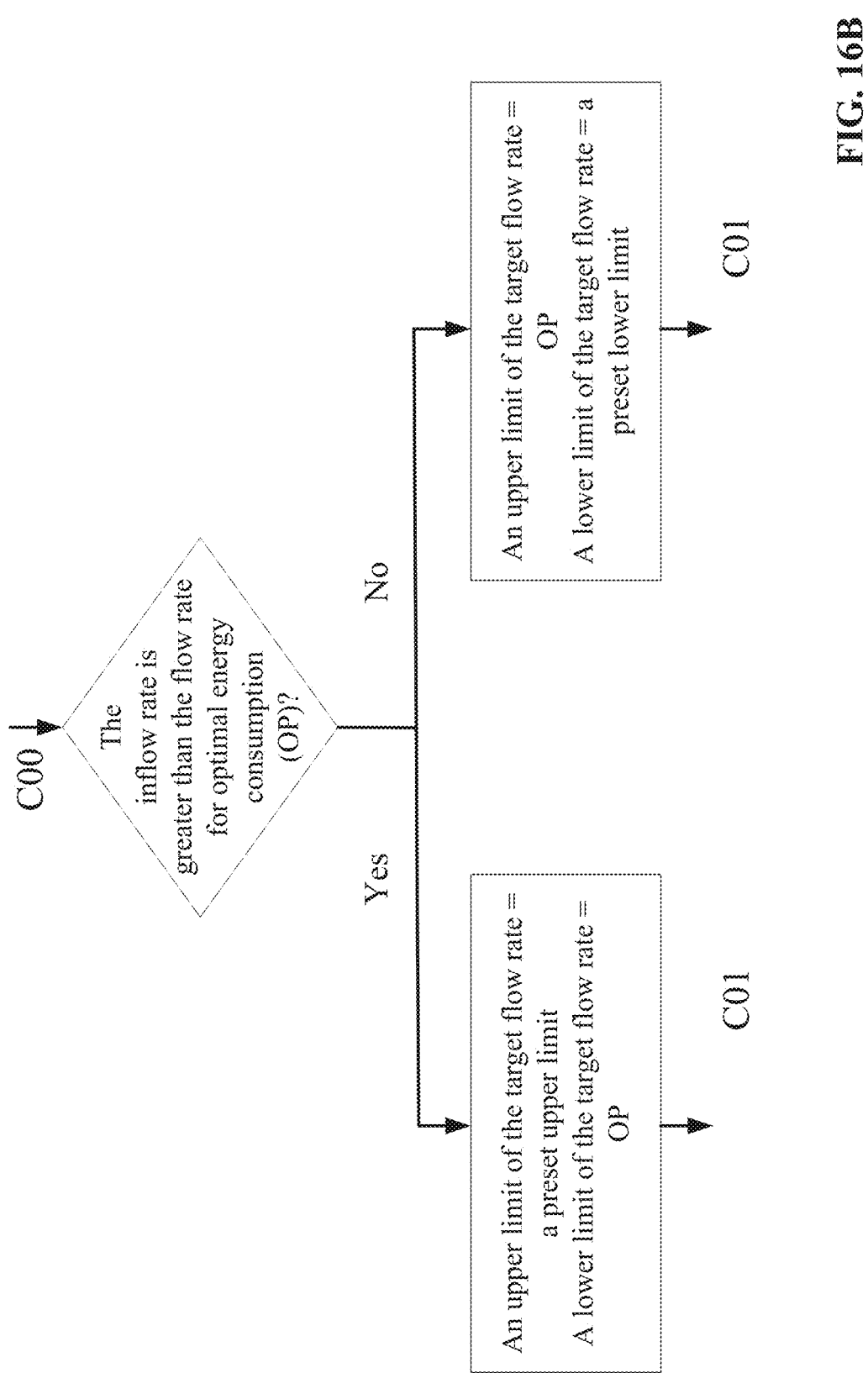

For example, as a specific implementation of the second process shown in FIG. 15, those skilled in the art can set an upper limit and a lower limit of a range of the target outflow rate of the pumping station based on both the first constraint and the third constraint (where the third constraint gives a preset range of a flow rate, i.e., a preset upper limit and lower limit of a flow rate), and compare the candidate flow rate calculated based on the second constraint (a liquid level limit) with that upper limit and that lower limit, and set the target outflow rate appropriately based on a comparison result. FIGS. 16A and 16B show a flowchart of an exemplary procedure of setting the target outflow rate of a pumping station in the above-mentioned manner. This exemplary process implements a core algorithm of the process shown in FIG. 15 through different steps, which are not further described here.

Reference is made back to FIG. 11. After a target outflow rate that meets at least the first constraint is set by the control unit 110 in step S931, for example, in any of the discussed manners, the control unit 110 proceeds to step S932 of distributing the target outflow rate among pumps of the pumping station.

A process of distributing the target outflow rate is described below.

(Process of Distributing Target Outflow Rate)

In a case where multiple pumps are included in the pumping station, especially in a case where multiple pumps are running, the control unit 110 needs to distribute the target outflow rate of the pumping station appropriately among the pumps, in order to control the overall outflow rate of the pumping station. For example, control unit 110 may be configured to distribute the target outflow rate of the pumping station among various pumps, so that a target flow rate assigned to each of the pumps satisfies a constraint for the target flow rate, and a sum of target flow rates assigned to the pumps is equal to the target outflow rate of the pumping station. For each of the pumps, the constraint for the target flow rate of each pump is a constrain that corresponds to the constraint for the target outflow rate of the pumping station (the first constraint) and indicates whether the target flow rate of the pump is to be greater than or equal to, or less than or equal to, the flow rate for optimal energy consumption of the pump.

As an example, pumps participating in the distribution may be the pumps whose flow rates for optimal energy consumption are considered when the control unit 110 determines the first constraint, for example, the pumps that are currently running in the pumping station. In addition, in a case that the first constraint indicates that the target outflow rate of the pumping station is to be greater than or equal to the flow rate for optimal energy consumption of the pumping station, the constraint for the target flow rate of each pump correspondingly indicates that the target flow rate of the pump is to be greater than or equal to the flow rate for optimal energy consumption of the pump. In a case that the first constraint indicates that the target outflow rate of the pumping station is to be less than or equal to the flow rate for optimal energy consumption of the pumping station, the constraint for the target flow rate of each pump correspondingly indicates that the target flow rate of the pump is to be less than or equal to the flow rate for optimal energy consumption of the pump.

The control unit 110 may generate control information based on the target flow rates assigned to the pumps, and send the control information to controllers of the pumps to enable the controllers to perform constant flow rate control on corresponding pumps to achieve and maintain at corresponding target flows of the pumps, thereby achieving and maintaining the target outflow rate of the pumping station.

In an example, the control unit 110 may distribute the target outflow flow so that a ratio of a difference between the target flow rate assigned to a pump and the flow rate for optimal energy consumption of the pump to a range of a flow range of the pump is identical for the pumps. A simple algorithm may be applied in this distribution to ensure that the target flow rates assigned to the pumps meet constraints for the target flow rates of the pumps, respectively. The algorithm is described in detail below.

For example, the following exemplary scenario is given. It is assumed that three pumps (such as three of pumps 30-1 to 30-4 as shown in FIG. 7) in the pumping station are running and numbered with i=1, 2, 3. The control unit 110 determines the flow rate $r_i$ for optimal energy consumption of each of the pumps through the exemplary process as shown in FIG. 10, and determines the flow rate R for optimal energy consumption of the pumping station as $$R = \sum_{i=1}^{3} r_i.$$

In addition, the control unit 110 determines a preset range [L, U] of the target outflow rate of the pumping station, for example, based on a preset range [$L_i$, $U_i$] of the flow rate of each pump. An upper limit and a lower limit of the range [L, U] are calculated based on an upper limit and a lower limit of the range [$L_i$, $U_i$] for each pump. That is, there has:

$$L = \sum_{i=1}^{3} L_i, \text{ and } U = \sum_{i=1}^{3} U_i.$$

In addition, it is assumed that a current inflow rate of the pumping station is less than the flow rate R for optimal energy consumption of the pumping station. The control unit 110 sets, through the exemplary processes of steps S1211 to S1215 as in FIG. 15, a target outflow rate X which is within the preset rang [L, U] of a flow rate of the pumping station and less than the flow rate R for optimal energy consumption of the pumping station. In this case, the control unit 110 may distribute X among the three running pumps to ensure that the flow rate $x_i$ of a pump meets equation (14), and thus can be calculated based on equation (15):

$$\frac{r_1 - x_1}{I_1} = \frac{r_2 - x_2}{I_2} = \frac{r_3 - x_3}{I_3} = \frac{(X - R)}{I} \quad (14)$$

$$x_i = r_i - \frac{(X - R)I_i}{I} \quad (15)$$

In the equations, there has $I_i = U_i - L_i$, and $$I = \sum_{i=1}^{3} I_i.$$

Figure 17:
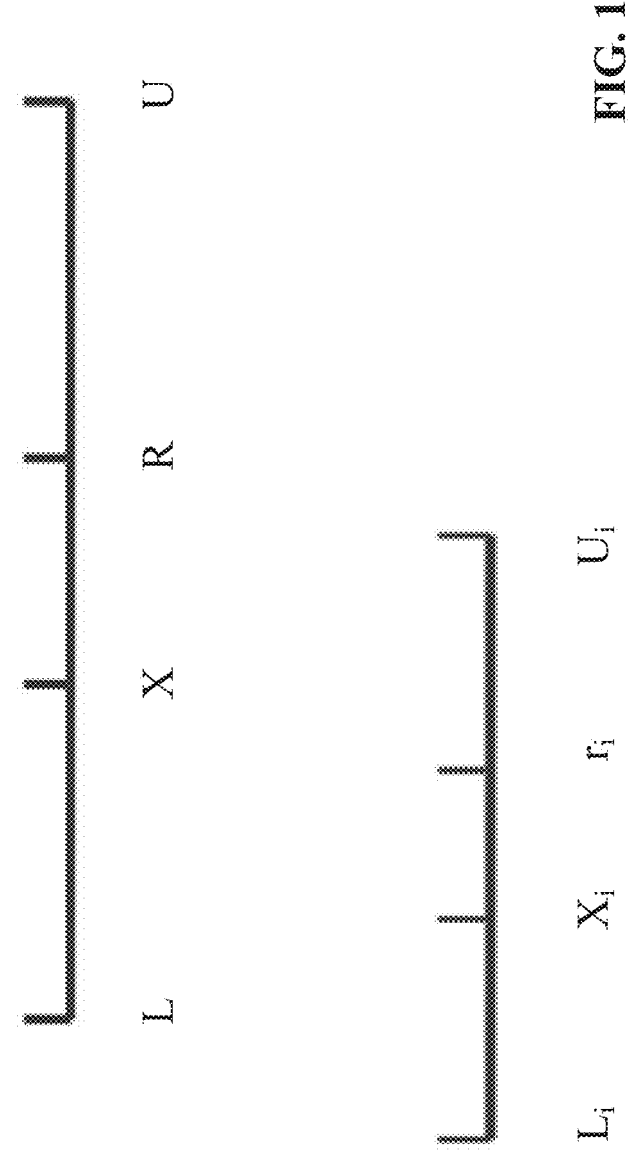
FIG. 17 is a schematic diagram illustrating an exemplary algorithm for distributing a target outflow rate of a pumping station among pumps.

In this way, the target flow rate can be distributed proportionally among the pumps based on the range of a flow rate of each pump and the flow rate for optimal energy consumption of each pump. It can ensure that a relationship between an assigned target flow rate $x_i$ and the flow rate $r_i$ for optimal energy consumption of the pump is consistent with the first constraint for the pumping station. That is, in a case of X≤R, then $x_i$≤$r_i$ is calculated through the above method, as shown in the schematic diagram in FIG. 17 illustrating distribution of the target outflow rate of the pumping station among pumps.

It is noted that the calculation of equation (15) is not only applicable to a variable-frequency pump, but also compatible with a constant-frequency pump. Here, the following situation is considered. In a variant example, assuming that a pump having a serial number 1 is a constant-frequency pump (such as pump 30-1 as shown in FIG. 7), a flow rate of the pump in a normal operation is equal to the flow rate $r_1$ for optimal energy consumption, which is also equal to the upper limit and the lower limit of its flow rate, that is, $r_1=L_1=U_1$, and $I_1=0$. Therefore, the target flow rate $x_1$ of the pump can be calculated, by using equation (15), as $x_1=r_1$. That is, for the constant-frequency pump, the target flow rate assigned to the constant-frequency pump in this exemplary control indicates that the pump can maintain a normal operation, that is, continue running.

Hereinabove described are an exemplary configuration of the electronic device 10 (for example, the electronic device 10 such as a gateway device in FIG. 7) in the control system and the exemplary processes executed through the control unit 110 of the electronic device. The processes are examples of the control method and related processes according to the first embodiment of the present disclosure as shown in FIG. 9.

It should be noted that although the energy consumption model, speed model, flow rate model of a pump, and the SEC response surface are described as a preface in the overview section, the models and the SEC response surface are proposed to explain the principles of the control scheme in the present disclosure. In a practical control system and control method, the control system can, for example, perform relevant processes through its electronic device 10 (the control unit 110) in various appropriate ways as described in this section, without actual use of the energy consumption model, speed model, or flow rate model of the pump, or actual calculation of the SEC response surface, which is not repeated here.

Hereinafter an exemplary configuration of a controller in the control system (such as the controller 20 in FIG. 7) and example processes executed jointly by the controller and the electronic device are described. The processes involve the control method according to the second embodiment of the present disclosure.

[2.2 Exemplary Configuration of Controller and Exemplary Processes Thereof]

Reference is made back to FIG. 7. Multiple examples of a configuration of the controller 20 are shown. Exemplary configurations of the controller and exemplary processes of the controller are described below in conjunction with FIG. 7.

(Exemplary Configurations of Controller)

As shown in FIG. 7, the controllers for different pumps in the pumping station may have different configurations, and may include a control switch SW, a proportional integral controllers PID, a variable-frequency driver VFD, or the like. Specific configuration of the controllers is not limited in the present disclosure, as long as the controllers can control the pump speed and/or switch of the pumps in the pumping station, for example, based on control information from the electronic device 10, so that the outflow rate of the pumping station can reach and maintain at the target outflow rate.

Figure 18:
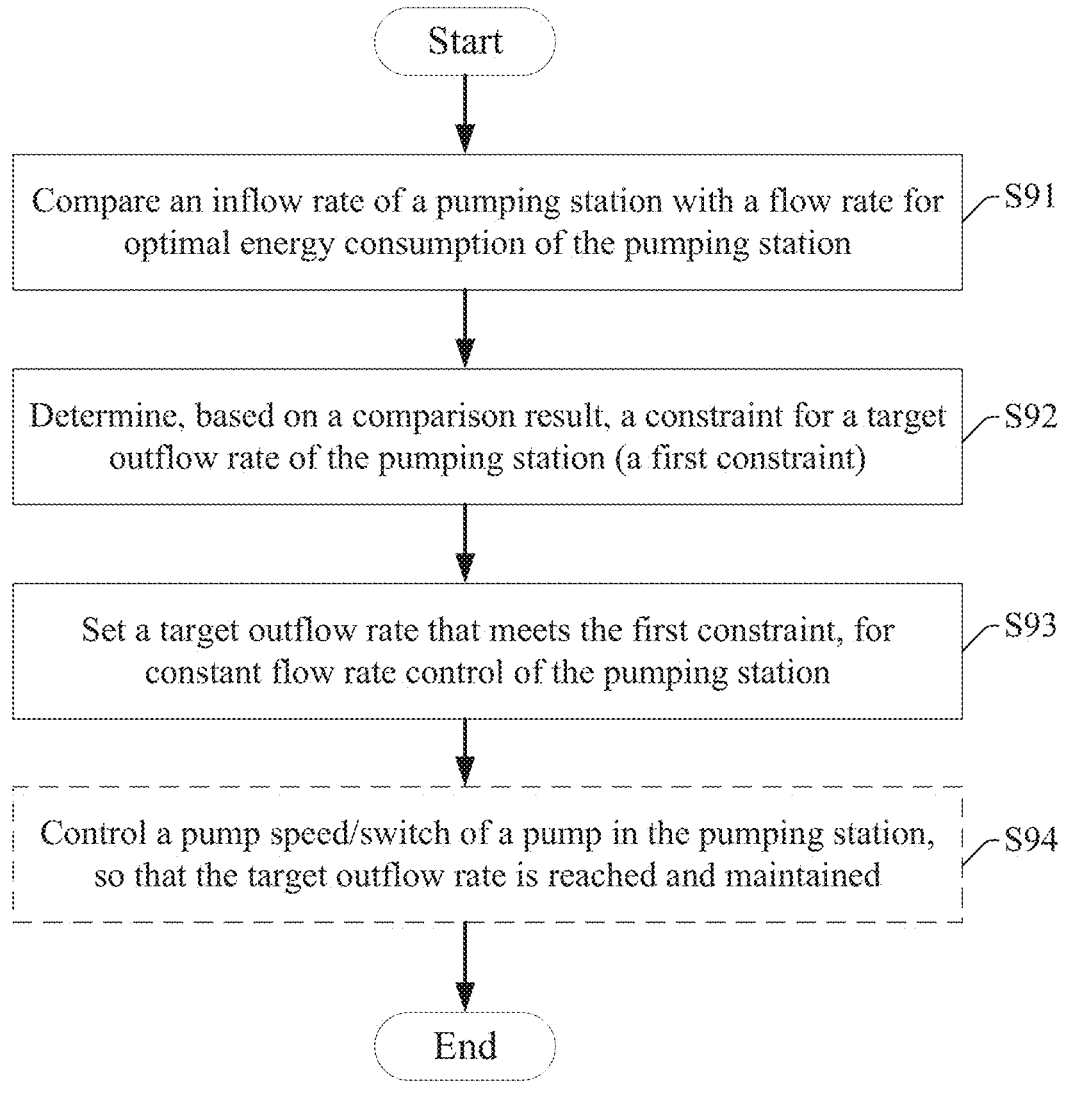
FIG. 18 is a flowchart of an exemplary process of a control method according to a second embodiment of the present disclosure.

The control method according to the second embodiment of the present disclosure, as shown in FIG. 18, can be realized through the constant flow rate control of a pump in the pumping stations by a controller. As shown in FIG. 18, the control method provides improvement based on the control method according to the first embodiment as shown in FIG. 9, and further includes step S94 of controlling, by using the controller 20, the pump speed and/or switch of the pump in the pumping station so that the outflow rate of the pumping station achieves and maintains at the target outflow rate.

As an example, as shown in FIG. 7, the controller 20-1 for a constant-speed pump (constant-frequency pump) 30-1 may include a control switch SW. The control switch SW can switch a state in response to control information from the electronic device 10 (and optionally, a switching signal from a switching rule controller SRC to be described later), to control switching of the pump 30-1.

In addition, controllers 20-2 to 20-4 for variable-speed pumps (variable-frequency pumps) 30-2 to 30-4 may each include optionally a proportional integral controller PID and a variable-frequency driver VFD in addition to the control switch SW. Similar to the controller for a constant-frequency pump, the switch in the controller for a variable-frequency pump may switch a state, for example, in response to control information from the electronic device 10 (and optionally, a switching signal from a switching rule controller SRC to be described later), to control switching of the pump. In addition, the PID in the controller of a variable-frequency pump may calculate the pump speed of the corresponding variable-frequency pump based on the target flow rate which is assigned to the variable-frequency pump and indicated by the control information from the electronic device 10 (for example, calculate the pump speed based on the proportional integral control of equation (10)). It controls the corresponding variable-frequency driver VFD at the calculated pump speed, to control the corresponding variable-frequency pump to operate at the calculated pump speed, so as to achieve and maintain at the target flow rate of the pump.

Next, an exemplary control of a pump speed and an exemplary control of a switch performed by controller 20 are described.

(Exemplary Process of Controlling Pump Speed)

As an example, the control information received by a controller 20 corresponding to a running pump from the electronic device 10 indicates, for example, the target flow rate of the pump assigned by the electronic device 10. Correspondingly, each controller 20 that receives the control information can control the pump speed of each pump, so that the flow rate of each pump achieves and maintains at the assigned target flow rate.

For example, it is assumed that a constant-frequency pump with the serial number 1 and variable-frequency pumps with the serial numbers 2 and 3 (such as pumps 30-1, 30-2, 30-3 shown in FIG. 7) are currently running in the pumping station, and the control information received by corresponding controllers 20 from the electronic device indicates the target flow rate $x_i$ of the pump calculated by the control unit 110 of the electronic device 10 based on equation (15). In this case, the constant-frequency pump with the serial number 1 may maintain its normal operation, that is, continue working, based on the target flow rate $x_1=r_1$ (flow rate for optimal energy consumption). For the variable-frequency pumps with the serial numbers 2 and 3, calculation can be performed, through the PIDs, for the pump speeds corresponding to the target flow rates $x_2$ and $x_3$, and the variable frequency driver VFDs can be controlled based on the calculated pump speeds, so that the variable-frequency pumps are controlled to operate at the calculated pump speeds, in order to achieve and maintain at the target flow rates $x_2$ and $x_3$, respectively.

(Exemplary Process of Controlling Switch of Pump)

As shown in FIG. 7, controller 20-4 for pump 30-4 among the pumps may additionally include a switching rule controller SRC. Although not shown in FIG. 7, the switching rule controller SRC can include a storage part and a control part. The storage part of the switching rule controller SRC may, for example, store multiple pre-defined switching rules. The control part may be configured to: determine a switching rule, on determining, based on sensor data or the like, that the pumping station is unable to reach the target outflow rate; and accordingly perform a switch operation on the pump(s) to increase or decrease the total flow rate, so as to reach the target outflow rate. By using the switching rule controller SRC, additional control of a switch of the pump can be achieved.

For example, the storage part of the switching rule controller SRC may store a first switching rule and/or a second switching rule which is determined for each pump state and corresponds to the pump state. The first switching rule is applicable to a situation where a flow rate of a pump is continuously less than a target flow rate of the pump. The second switching rule is applicable to a situation where a flow rate of a pump is continuously greater than a target flow rate of the pump. Each of the first switching rule and the second switching rule indicates a pump state to be switched to. Each pump state indicates operating or shutdown states of the respective pumps in the pumping station. For example, in a case that the pumping station includes m pumps, there are $2^m$ possible pump states, depending on whether each of the m pumps is running or shutdown.

FIG. 19 shows an example of the first switching rule and the second switching rule, with respect to a pump state, recorded in the storage part of the switching rule controller SRC. As shown in FIG. 19, regarding a current pump state $BS_i$, a pump state $BS_i-1$ is stored as the first switching rule, and a pump state $BS_i-2$ is stored as the second switching rule. As an example, in a case that the pumping station includes m pumps, each stored pump state has m bits, and each of the m bits has a value of 1 or 0 representing an operating state or shutdown state of the corresponding pump.

The first switching rule and the second switching rule shown in FIG. 19 are to increase and decrease the outflow rate of the pumping station (i.e., the total flow rate of running pumps in the pumping station), respectively. As an example, the first switching rule may satisfy a first total flow rate constraint. The first total flow rate constraint is that a maximum value of a total flow rate of running pumps in a pump state switched to under the switching rule is greater than a maximum value of a total flow rate of currently running pumps. The second switching rule satisfies a second total flow constraint. The second total flow rate constraint is that a minimum value of a total flow rate of running pumps in a pump state switched to under the switching rule is less than a minimum value of a total flow rate of currently running pumps.

Preferably, at least one of the first switching rule or the second switching rule is a rule that, among rules satisfying a total flow rate constraint, satisfies one or more of the following additional conditions. A first additional condition is that a difference between a range of a total flow rate of running pumps in the pump state switched to under the switching rule and a range of a total flow rate of currently running pumps is minimal. A second additional condition is that a quantity of running pumps having a variable speed in the pump state switched to under the switching rule is maximal. A third additional condition is that an energy efficiency of running pumps in the pump state switched to under the switching rule is highest. A fourth additional condition is that an accumulation running time of running pumps in the pump state switched to under the switching rule is shortest.

A switching rule determined based on the above additional conditions may have specific advantages. For example, a switching rule determined based on the first additional condition enables to switch the current pump state to a next pump state with a stable change of the flow rate; a switching rule determined based on the second additional condition enables to switch to a pump state in which the flow rate changes flexibly; a switching rule determined based on the third additional condition enables to switch to a pump state with a high energy efficiency of the pump; and a switching rule determined based on the fourth additional condition enables to switch to a pump state with a shortest accumulation running time of pumps (that is, it is beneficial to avoiding excessive accumulation running time of a pump).

Figure 20:
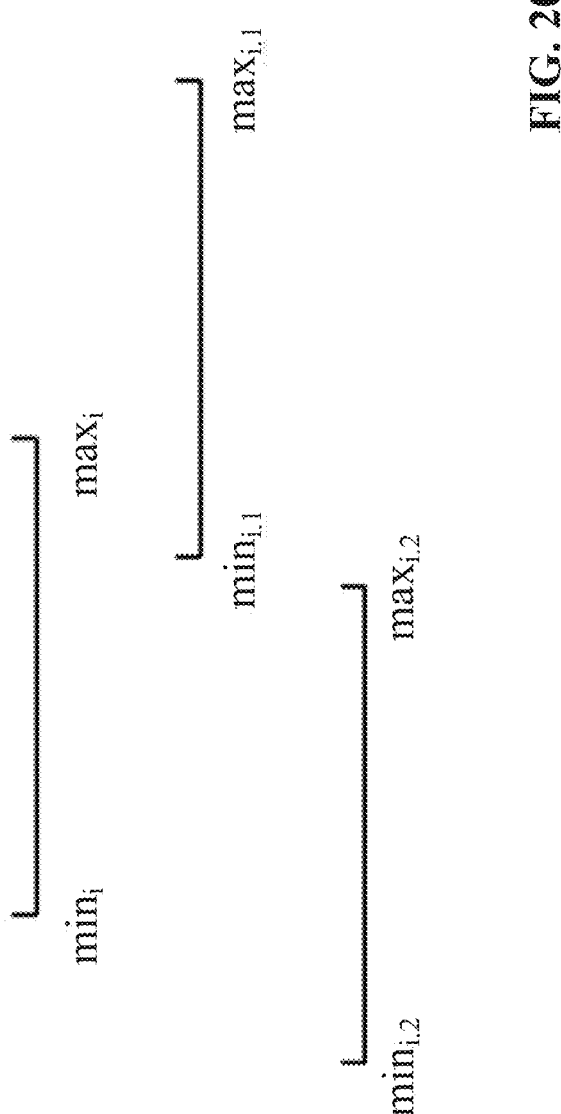
FIG. 20 is a schematic diagram showing an example of ranges of total flow rates for a current pump state, a pump state under a first switching rule, and a pump state under a second switching rule, respectively.

FIG. 20 shows examples of ranges of total flow rates of the current pump state and pump states $BS_i-1$ and $BS_i-2$ for the first and second switching rules as shown in FIG. 19, respectively. That is, the ranges of flow rates of the pump states $BS_i$, $BS_i-1$, and $BS_i-2$ are shown as $[\min_i, \max_i]$, $[\min_{i,1}, \max_{i,1}]$, $[\min_{i,2}, \max_{i,2}]$, respectively. As shown in FIG. 20, pump state $BS_i-1$ and pump state $BS_i-2$ meet a total flow constraint of increasing or decreasing a total flow rate compared to pump state $BS_i$, that is, $\max_{i,1} > \max_i$, $\min_{i,2} < \min_i$. For example, pump state $BS_i-1$ involves operation of more pumps and/or operation of pumps with a higher flow rate. Pump state $BS_i-2$ involves operation of less pumps and/or operation of pumps with a lower flow rate. In addition, each of the ranges $[\min_{i,1}, \max_{i,1}]$ and $[\min_{i,2}, \max_{i,2}]$ of pump states $BS_i-1$ and $BS_i-2$ overlaps with the range $[\min_i, \max_i]$ of the current pump state $BS_i$ ($\min_{i,1} < \max_i$, $\min_{i,2} > \min_i$), which meets the first additional condition of minimizing a difference between the ranges of the total flow rates.

In a case where the first switching rule and the second switching rule are pre-stored in the storage part of the switching rule controller SRC, the control part of the switching rule controller SRC may be configured to: control switches of pumps in the pumping station according to the first switching rule corresponding to a current pump state, on determining that a flow rate of a currently running pump is continuously less than the target flow rate of the pump, so as to switch to a pump state for increasing an outflow rate of the pumping station; or control switches of pumps in the pumping station according to the second switching rule corresponding to a current pump state, on determining that a flow rate of a currently running pump is continuously greater than the target flow rate of the pump, so as to switch to a pump state for reducing an outflow rate of the pumping station.

The control part of the switching rule controller SRC can determine, based on received sensor data, whether the flow rate of the currently running pump is continuously greater than or less than the target flow rate of the pump. The sensor data may come from a pump speed sensor for measuring a pump speed of one or more running pumps (such as pump 30-4), for example. The control part of the switching rule controller SRC may determine that a flow rate of the pump is continuously less than or greater than the target flow rate assigned to the pump, in a case that a pump speed indicated by the sensor data remains at an upper or lower limit of the pump speed for a predetermined time.

On determining that the flow rate of the pump is continuously less than the target flow rate assigned to the pump, the control part of the switching rule controller SRC may send switching signal(s) to relevant controller(s) in the pumping station based on the first switching rule corresponding to the current pump state $BS_i$, so as to control switches of the pumps (for example, to activate another one or more pumps or replace a currently running pump with a pump having a larger flow rate), so that the current pump state is switched to pump state $BS_i-1$, for example, as described above with reference to FIG. 19 and FIG. 20, thereby stably increasing the total flow rate of the pumps to achieve the target outflow rate. On determining that the flow rate of the pump is continuously greater than the target flow rate assigned to the pump, the control part may send switching signal(s) to relevant controller(s) in the pumping station based on the second switching rule corresponding to the current pump state $BS_i$, so as to control switches of the pumps (for example, shut down one or more running pumps or replace a currently running pump with a pump with a smaller flow rate), so that the current pump state is switched to pump state $BS_i-2$, for example, as described above with reference to FIG. 19 and FIG. 20, thereby stably decreasing the total flow rate of the pumps to achieve the target outflow rate.

In this way, the switching rule controller SRC can control the switches of the pumps to achieve the target outflow rate of the pumping station.

It is noted that although the switching rule controller SRC is described above as a component of the controller 20-4, the embodiments disclosed in the present disclosure are not limited thereto. In practice, the switching rule controller may be included in another part of the control system according to the present disclosure. For example, the switching rule controller may be included in the electronic device 10, or implemented as a separate control device, as long as the switching rule controller can achieve the functions and processes described above, which is not further illustrated here.

Hereinabove the preferred embodiments of the control system and control method according to the present disclosure are described with reference to the accompanying drawings. The present disclosure is not limited to the above examples. A program product that stores machine-readable instruction code is further provided in the present disclosure. The instruction code, when read and executed by a machine, causes the method according to the embodiment to be implemented. A storage medium carrying the program product having the machine-readable instruction code stored thereon is also included in the present disclosure. The storage medium includes, but is not limited to, a floppy disk, an optical disk, a magneto optical disk, a storage card, a storage rod, and the like.

Those skilled in the art may make various alternations and modifications within the scope of the claims, and it should be understood that these alternations and modifications shall naturally fall within the technical scope of the present disclosure.

For example, a unit shown by a dashed box in the functional block diagram shown in the drawings indicates that the functional unit is optional in a corresponding device, and optional functional units may be combined with each other in an appropriate manner to achieve a desired function.

For example, multiple functions included in one unit in the above embodiments may be implemented by separate devices. Alternatively, multiple functions implemented by multiple units in the above embodiments may be implemented by separate devices, respectively. In addition, one of the above functions may be implemented by multiple units. Such configuration shall also be included in the technical scope of the present disclosure.

In this specification, the steps described in the flowchart include not only processes performed in time series as the order described, but also processes performed in parallel or individually instead of having to be performed in time series. Further, even in the steps processed in time series, the order may be appropriately changed.

Embodiments, systems, and components described herein, as well as control systems and automation environments in which various aspects set forth in the subject specification can be carried out, can include computer or network components such as servers, clients, programmable logic controllers (PLCs), automation controllers, communications modules, mobile computers, on-board computers for mobile vehicles, wireless components, control components and so forth which are capable of interacting across a network. Computers and servers include one or more processors-electronic integrated circuits that perform logic operations employing electric signals-configured to execute instructions stored in media such as random access memory (RAM), read only memory (ROM), a hard drives, as well as removable memory devices, which can include memory sticks, memory cards, flash drives, external hard drives, and so on.

Similarly, the term PLC or automation controller as used herein can include functionality that can be shared across multiple components, systems, and/or networks. As an example, one or more PLCs or automation controllers can communicate and cooperate with various network devices across the network. This can include substantially any type of control, communications module, computer, Input/Output (I/O) device, sensor, actuator, and human machine interface (HMI) that communicate via the network, which includes control, automation, and/or public networks. The PLC or automation controller can also communicate to and control various other devices such as standard or safety-rated I/O modules including analog, digital, programmed/intelligent/O modules, other programmable controllers, communications modules, sensors, actuators, output devices, and the like.

The network can include public networks such as the internet, intranets, and automation networks such as control and information protocol (CIP) networks including DeviceNet, ControlNet, safety networks, and Ethernet/IP. Other networks include Ethernet, DH/DH+, Remote I/O, Fieldbus, Modbus, Profibus, CAN, wireless networks, serial protocols, and so forth. In addition, the network devices can include various possibilities (hardware and/or software components). These include components such as switches with virtual local area network (VLAN) capability, LANs, WANs, proxies, gateways, routers, firewalls, virtual private network (VPN) devices, servers, clients, computers, configuration tools, monitoring tools, and/or other devices.

Figure 21:
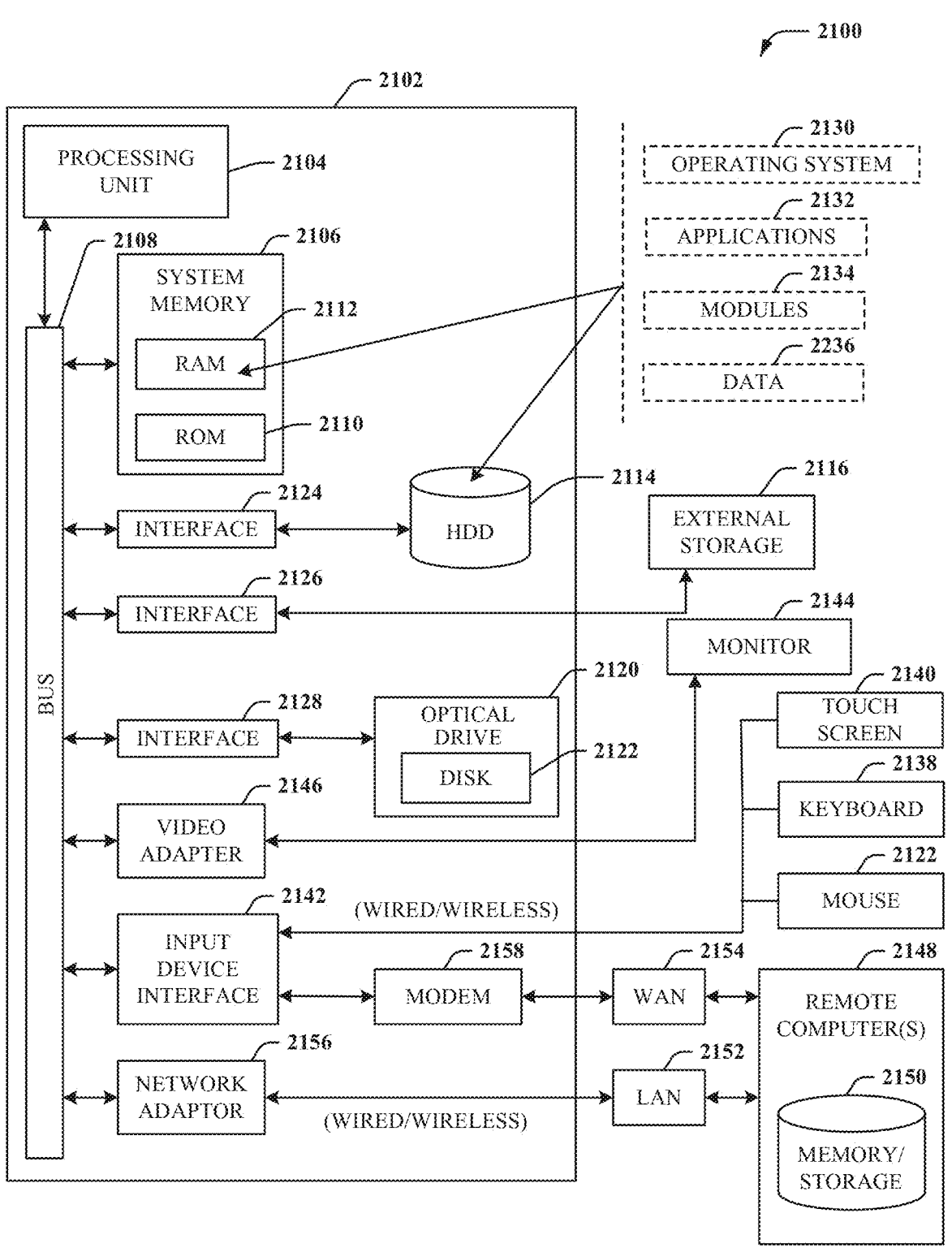
FIG. 21 is an example computing environment.
Figure 22:
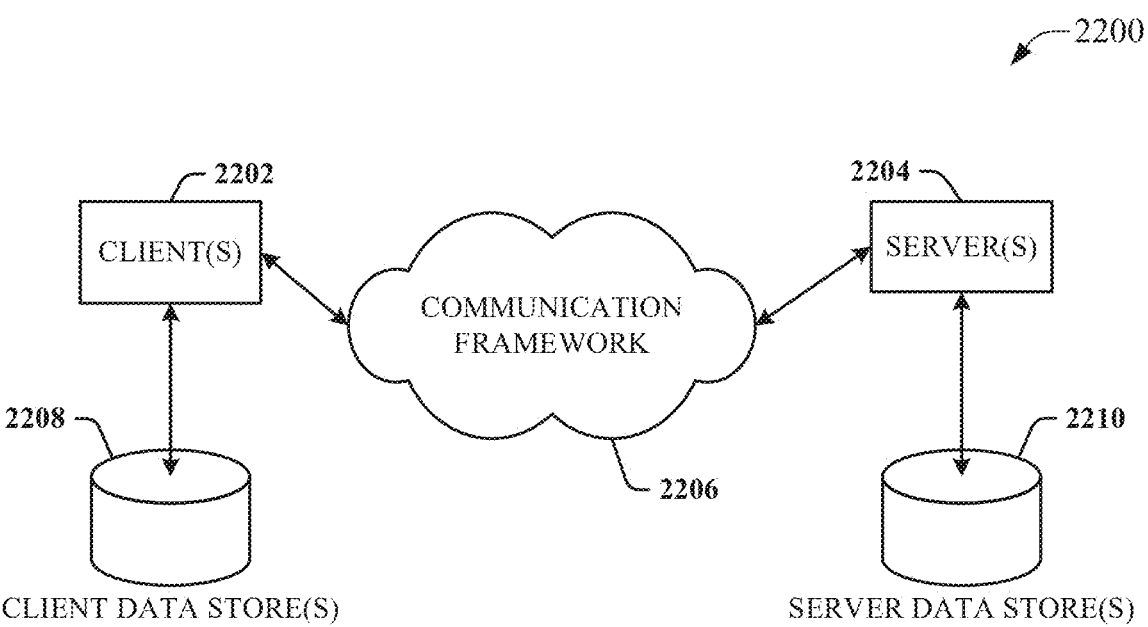
FIG. 22 is an example networking environment.

In order to provide a context for the various aspects of the disclosed subject matter, FIGS. 21 and 22 as well as the following discussion are intended to provide a brief, general description of a suitable environment in which the various aspects of the disclosed subject matter may be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 21, the example environment 2100 for implementing various embodiments of the aspects described herein includes a computer 2102, the computer 2102 including a processing unit 2104, a system memory 2106 and a system bus 2108. The system bus 2108 couples system components including, but not limited to, the system memory 2106 to the processing unit 2104. The processing unit 2104 can be any of various commercially available processors. Dual microprocessors and other multi-processor architectures can also be employed as the processing unit 2104.

The system bus 2108 can be any of several types of bus structure that can further interconnect to a memory bus (with or without a memory controller), a peripheral bus, and a local bus using any of a variety of commercially available bus architectures. The system memory 2106 includes ROM 2110 and RAM 2112. A basic input/output system (BIOS) can be stored in a non-volatile memory such as ROM, erasable programmable read only memory (EPROM), EEPROM, which BIOS contains the basic routines that help to transfer information between elements within the computer 2102, such as during startup. The RAM 2112 can also include a high-speed RAM such as static RAM for caching data.

The computer 2102 further includes an internal hard disk drive (HDD) 2114 (e.g., EIDE, SATA), one or more external storage devices 2116 (e.g., a magnetic floppy disk drive (FDD) 2116, a memory stick or flash drive reader, a memory card reader, etc.) and an optical disk drive 2120 (e.g., which can read or write from a CD-ROM disc, a DVD, a BD, etc.). While the internal HDD 2114 is illustrated as located within the computer 2102, the internal HDD 2114 can also be configured for external use in a suitable chassis (not shown). Additionally, while not shown in environment 2100, a solid state drive (SSD) could be used in addition to, or in place of, an HDD 2114. The HDD 2114, external storage device(s) 2116 and optical disk drive 2120 can be connected to the system bus 2108 by an HDD interface 2124, an external storage interface 2126 and an optical drive interface 2128, respectively. The interface 2124 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 2102, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 2112, including an operating system 2130, one or more application programs 2132, other program modules 2134 and program data 2136. All or portions of the operating system, applications, modules, and/or data can also be cached in the RAM 2112. The systems and methods described herein can be implemented utilizing various commercially available operating systems or combinations of operating systems.

Computer 2102 can optionally comprise emulation technologies. For example, a hypervisor (not shown) or other intermediary can emulate a hardware environment for operating system 2130, and the emulated hardware can optionally be different from the hardware illustrated in FIG. 21. In such an embodiment, operating system 2130 can comprise one virtual machine (VM) of multiple VMs hosted at computer 2102. Furthermore, operating system 2130 can provide runtime environments, such as the Java runtime environment or the .NET framework, for application programs 2132. Runtime environments are consistent execution environments that allow application programs 2132 to run on any operating system that includes the runtime environment. Similarly, operating system 2130 can support containers, and application programs 2132 can be in the form of containers, which are lightweight, standalone, executable packages of software that include, e.g., code, runtime, system tools, system libraries and settings for an application.

Further, computer 2102 can be enable with a security module, such as a trusted processing module (TPM). For instance with a TPM, boot components hash next in time boot components, and wait for a match of results to secured values, before loading a next boot component. This process can take place at any layer in the code execution stack of computer 2102, e.g., applied at the application execution level or at the operating system (OS) kernel level, thereby enabling security at any level of code execution.

A user can enter commands and information into the computer 2102 through one or more wired/wireless input devices, e.g., a keyboard 2138, a touch screen 2140, and a pointing device, such as a mouse 2122. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 2104 through an input device interface 2144 that can be coupled to the system bus 2108, but can be connected by other interfaces, such as a parallel port, an IEEE 1394 serial port, a game port, a USB port, an IR interface, a BLUETOOTH® interface, etc.

A monitor 2144 or other type of display device can be also connected to the system bus 2108 via an interface, such as a video adapter 2146. In addition to the monitor 2144, a computer typically includes other peripheral output devices (not shown), such as speakers, printers, etc.

The computer 2102 can operate in a networked environment using logical connections via wired and/or wireless communications to one or more remote computers, such as a remote computer(s) 2148. The remote computer(s) 2148 can be a workstation, a server computer, a router, a personal computer, portable computer, microprocessor-based entertainment appliance, a peer device or other common network node, and typically includes many or all of the elements described relative to the computer 2102, although, for purposes of brevity, only a memory/storage device 2150 is illustrated. The logical connections depicted include wired/wireless connectivity to a local area network (LAN) 2152 and/or larger networks, e.g., a wide area network (WAN) 2154. Such LAN and WAN networking environments are commonplace in offices and companies, and facilitate enterprise-wide computer networks, such as intranets, all of which can connect to a global communications network, e.g., the Internet.

When used in a LAN networking environment, the computer 2102 can be connected to the local network 2152 through a wired and/or wireless communication network interface or adapter 2156. The adapter 2156 can facilitate wired or wireless communication to the LAN 2152, which can also include a wireless access point (AP) disposed thereon for communicating with the adapter 2156 in a wireless mode.

When used in a WAN networking environment, the computer 2102 can include a modem 2158 or can be connected to a communications server on the WAN 2154 via other means for establishing communications over the WAN 2154, such as by way of the Internet. The modem 2158, which can be internal or external and a wired or wireless device, can be connected to the system bus 2108 via the input device interface 2142. In a networked environment, program modules depicted relative to the computer 2102 or portions thereof, can be stored in the remote memory/storage device 2150. It will be appreciated that the network connections shown are example and other means of establishing a communications link between the computers can be used.

When used in either a LAN or WAN networking environment, the computer 2102 can access cloud storage systems or other network-based storage systems in addition to, or in place of, external storage devices 2116 as described above. Generally, a connection between the computer 2102 and a cloud storage system can be established over a LAN 2152 or WAN 2154 e.g., by the adapter 2156 or modem 2158, respectively. Upon connecting the computer 2102 to an associated cloud storage system, the external storage interface 2126 can, with the aid of the adapter 2156 and/or modem 2158, manage storage provided by the cloud storage system as it would other types of external storage. For instance, the external storage interface 2126 can be configured to provide access to cloud storage sources as if those sources were physically connected to the computer 2102.

The computer 2102 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

FIG. 22 is a schematic block diagram of a sample computing environment 2200 with which the disclosed subject matter can interact. The sample computing environment 2200 includes one or more client(s) 2202. The client(s) 2202 can be hardware and/or software (e.g., threads, processes, computing devices). The sample computing environment 2200 also includes one or more server(s) 2204. The server(s) 2204 can also be hardware and/or software (e.g., threads, processes, computing devices). The servers 2204 can house threads to perform transformations by employing one or more embodiments as described herein, for example. One possible communication between a client 2202 and servers 2204 can be in the form of a data packet adapted to be transmitted between two or more computer processes. The sample computing environment 2200 includes a communication framework 2206 that can be employed to facilitate communications between the client(s) 2202 and the server(s) 2204. The client(s) 2202 are operably connected to one or more client data store(s) 2208 that can be employed to store information local to the client(s) 2202. Similarly, the server (s) 2204 are operably connected to one or more server data store(s) 2210 that can be employed to store information local to the servers 2204.

What has been described above includes examples of the subject innovation. It is, of course, not possible to describe every conceivable combination of components or methodologies for purposes of describing the disclosed subject matter, but one of ordinary skill in the art may recognize that many further combinations and permutations of the subject innovation are possible. Accordingly, the disclosed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the disclosed subject matter. In this regard, it will also be recognized that the disclosed subject matter includes a system as well as a computer-readable medium having computer-executable instructions for performing the acts and/or events of the various methods of the disclosed subject matter.

In addition, while a particular feature of the disclosed subject matter may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

In this application, the word "exemplary" is used to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks [e.g., compact disk (CD), digital versatile disk (DVD) . . . ], smart cards, and flash memory devices (e.g., card, stick, key drive . . . ).

What is claimed is:

1. A method, comprising:
   comparing, by a system comprising a processor, an inflow rate of a pumping station comprising one or more pumps with a flow rate for optimal energy consumption of the pumping station;
   determining, by the system based on a result of the comparing, a corresponding target outflow rate constraint that indicates whether a target outflow rate of the pumping station is to be greater than or equal to, or less than or equal to, the flow rate for optimal energy consumption of the pumping station; and
   setting, by the system, a target outflow rate of the pumping station that satisfies the target outflow rate constraint, wherein the setting comprises:
   distributing the target outflow rate among the one or more pumps such that a target flow rate assigned to a pump, of the one or more pumps, satisfies a constraint for the target flow rate of the pump, and a sum of target flow rates assigned to the one or more pumps is equal to the target outflow rate of the pumping station, wherein the constraint for the target flow rate of the pump indicates whether the target flow rate of the pump is to be greater than or equal to, or less than or equal to, a flow rate for optimal energy consumption of the pump;
   controlling a pump speed of the pump such that a flow rate of the pump reaches and maintains the target flow rate assigned to the pump; and
   in response to determining that the flow rate of the pump is continuously less than the target flow rate of the pump, controlling switches of the one or more pumps according to a first switching rule to increase an outflow rate of the pumping station, or in response to determining that the flow rate of the pump is continuously greater than the target flow rate of the pump, controlling the switches of the one or more pumps according to a second switching rule to reduce an outflow rate of the pumping station,
   wherein the first switching rule satisfies a first total flow rate constraint that a maximum value of a total flow rate of running pumps in a pump state switched to under the first switching rule is greater than a maximum value of a total flow rate of currently running pumps, of the one or more pumps, and satisfies an additional condition comprising at least one of:
   a difference between a range of the total flow rate of running pumps and a range of a total flow rate of the currently running pumps being minimal;
   a quantity of the currently running pumps having a variable speed being maximal;
   an energy efficiency of the currently running pumps being maximal; or
   an accumulation running time of the running pumps being minimal.

2. The method of claim 1, further comprising determining the flow rate for optimal energy consumption of the pumping station based on flow rates for optimal energy consumption of the one or more pumps.

3. The method of claim 2, further comprising:
   determining, by the system, a flow rate at an efficiency point for the pump determined to satisfy a criterion, and
   setting, by the system, the flow rate at the efficiency point as the flow rate for optimal energy consumption of the pump.

4. The method of claim 2, further comprising:
   determining, by the system, a pump speed for optimal energy consumption of the pump at a current liquid level using a speed model for the pump; and
   determining, by the system, the flow rate for optimal energy consumption of the pump using a flow rate model for the pump based on the current liquid level and the pump speed for optimal energy consumption of the pump, wherein the speed model for the pump estimates a pump speed for optimal energy consumption based on a liquid level, the flow rate model for the pump estimates a flow rate based on a liquid level and a pump speed, and the speed model and the flow rate model for the pump are obtained through machine learning using corresponding historical data related to the pump.

5. The method of claim 1, wherein the setting of the target outflow rate further comprises:

calculating a candidate flow rate meeting a preset liquid level limit based on a current inflow rate and a current liquid level of the pumping station;

determining whether the candidate flow rate satisfies the target outflow rate constraint; and setting the candidate flow rate that satisfies the target outflow rate constraint as the target outflow rate of the pumping station.

6. The control method according to claim 5, wherein the setting of the target outflow rate further comprises:

determining whether the candidate flow rate is within a pre-set range of a flow rate;

setting the candidate flow rate that satisfies the target outflow rate constraint as the target outflow rate of the pumping station, in a case that the candidate flow rate is within the pre-set range of a flow rate, or setting an upper limit or a lower limit of the range of a flow rate that satisfies the target outflow rate constraint as the target outflow rate of the pumping station, in a case that the candidate flow rate is not within the range of a flow rate.

7. The method of claim 1, wherein the constraint for the target flow rate of the pump corresponds to the target outflow rate constraint.

8. The method of claim 7, wherein a ratio of a difference between the target flow rate assigned to the pump and the flow rate for optimal energy consumption of the pump to a range of a flow rate of the pump is identical for the one or more pumps.

9. The method of claim 1, wherein the first switching rule and the second switching rule correspond to a current pump state of the pumping station, and the controlling of the switches comprises controlling respective operating or shutdown states of the one or more pumps.

10. The method of claim 9, wherein the first switching rule satisfies a first total flow rate constraint that a maximum value of a total flow rate of running pumps, of the one or more pumps, in a pump state switched to under the first switching rule is greater than a maximum value of a total flow rate of currently running pumps, or the second switching rule satisfies a second total flow rate constraint that a minimum value of the total flow rate of the running pumps in the pump state switched to under the second switching rule is less than a minimum value of the total flow rate of currently running pumps.

11. The method of claim 1, wherein the first switching rule and the second switching rule indicate a pump state to be switched to.

12. A system, comprising:

an electronic device comprising processing circuitry configured to:

compare an inflow rate of a pumping station comprising one or more pumps with a flow rate for optimal energy consumption of the pumping station;

determine, based on a determination of whether the inflow rate of the pumping station is greater than or equal to, or less than or equal to, the flow rate for optimal energy consumption of the pumping station, a corresponding target outflow rate constraint that indicates whether a target outflow rate of the pumping station is to be greater than or equal to, or less than or equal to, the flow rate for optimal energy consumption of the pumping station;

determine a target outflow rate of the pumping station that meets the target outflow rate constraint;

distribute the target outflow rate among the one or more pumps such that a target flow rate assigned to a pump, of the one or more pumps, satisfies a constraint for the target flow rate of the pump, and a sum of target flow rates assigned to the one or more pumps is equal to the target outflow rate of the pumping station, wherein the constraint for the target flow rate of the pump indicates whether the target flow rate of the pump is to be greater than or equal to, or less than or equal to, a flow rate for optimal energy consumption of the pump;

control a pump speed of the pump such that a flow rate of the pump reaches and maintains the target flow rate assigned to the pump; and at least one of:

in response to a determination that the flow rate of the pump is continuously less than the target flow rate of the pump, control switches of the one or more pumps according to a first switching rule to increase an outflow rate of the pumping station, or in response to a determination that the flow rate of the pump is continuously greater than the target flow rate of the pump, control the switches of the one or more pumps according to a second switching rule to reduce an outflow rate of the pumping station;

wherein the first switching rule satisfies a first total flow rate constraint that a maximum value of a total flow rate of running pumps in a pump state switched to under the first switching rule is greater than a maximum value of a total flow rate of currently running pumps, of the one or more pumps, and satisfies an additional condition comprising at least one of:

a difference between a range of the total flow rate of running pumps and a range of a total flow rate of the currently running pumps being minimal, a quantity of the currently running pumps having a variable speed being maximal, an energy efficiency of the currently running pumps being maximal, or an accumulation running time of the running pumps being minimal.

13. The system of claim 12, wherein the processing circuitry is further configured to:

calculate a candidate flow rate meeting a preset liquid level limit based on a current inflow rate and a current liquid level of the pumping station;

determine whether the candidate flow rate satisfies the target outflow rate constraint; and set the candidate flow rate that satisfies the target outflow rate constraint as the target outflow rate of the pumping station.

14. The system of claim 12, further comprising:

a controller configured to control at least one of the pump speed or a switch of the pump such that the outflow rate of the pumping station reaches and maintains the target outflow rate.

15. The system of claim 14, wherein the first switching rule and the second switching rule corresponds to a current pump state of the pumping station and the controller is configured to control at least one of the pump speed or the switch of the pump to control respective operating or shutdown states of the one or more pumps.

16. The system of claim 12, wherein the constraint for a target flow rate of the pump is a constraint that corresponds to the target outflow rate constraint.

17. A non-transient computer-readable storage medium storing executable instructions, wherein the executable instructions, in response to execution by a processor, cause the processor to execute a control method for a pumping station comprising one or more pumps, wherein the control method comprises:

comparing an inflow rate of the pumping station with a flow rate for optimal energy consumption of the pumping station;

determining, based on a result of the comparing, a corresponding target outflow rate constraint that indicates whether a target outflow rate of the pumping station is to be greater than or equal to, or less than or equal to, the flow rate for optimal energy consumption of the pumping station; and setting a target outflow rate of the pumping station that meets the target outflow rate constraint, wherein the setting comprises:

distributing the target outflow rate among the one or more pumps such that a target flow rate assigned to a pump of the one or more pumps satisfies a constraint for the target flow rate of the pump, and a sum of target flow rates assigned to the one or more pumps is equal to the target outflow rate of the pumping station, wherein the constraint for the target flow rate of the pump indicates whether the target flow rate of the pump is to be greater than or equal to, or less than or equal to, a flow rate for optimal energy consumption of the pump;

controlling a pump speed of the pump such that a flow rate of the pump reaches and maintains the target flow rate assigned to the pump; and at least one of:

in response to determining that the flow rate of the pump is continuously less than the target flow rate of the pump, controlling switches of the one or more pumps according to a first switching rule to increase an outflow rate of the pumping station, or in response to determining that the flow rate of the pump is continuously greater than the target flow rate of the pump, controlling the switches of the one or more pumps according to a second switching rule to reduce an outflow rate of the pumping station;

wherein the first switching rule satisfies a first total flow rate constraint that a maximum value of a total flow rate of running pumps in a pump state switched to under the first switching rule is greater than a maximum value of a total flow rate of currently running pumps, of the one or more pumps, and satisfies an additional condition comprising at least one of:

a difference between a range of the total flow rate of running pumps and a range of a total flow rate of the currently running pumps being minimal, a quantity of the currently running pumps having a variable speed being maximal, an energy efficiency of the currently running pumps being maximal, or an accumulation running time of the running pumps being minimal.

18. The non-transient computer-readable storage medium of claim 17, wherein the control method further comprises determining the flow rate for optimal energy consumption of the pumping station based on flow rates for optimal energy consumption of the one or more pumps.

19. The non-transient computer-readable storage medium of claim 18, wherein the control method further comprises:

determining a pump speed for optimal energy consumption of the pump at a current liquid level using a speed model for the pump; and determining the flow rate for optimal energy consumption of the pump using a flow rate model for the pump based on the current liquid level and the pump speed for optimal energy consumption of the pump, wherein the speed model for the pump estimates a pump speed for optimal energy consumption based on a liquid level, the flow rate model for the pump estimates a flow rate based on a liquid level and a pump speed, and the speed model and the flow rate model for the pump are obtained through machine learning using corresponding historical data related to the pump.

20. The non-transient computer-readable storage medium of claim 17, wherein the control method further comprises:

determining a flow rate at an efficiency point for the pump determined to satisfy a criterion, and setting the flow rate at the efficiency point as the flow rate for optimal energy consumption of the pump.

* * * * *